US009649558B2

(12) United States Patent
Stafford et al.

(10) Patent No.: US 9,649,558 B2
(45) Date of Patent: May 16, 2017

(54) GAMING DEVICE WITH ROTATABLY PLACED CAMERAS

(71) Applicant: Sony Interactive Entertainment Inc., Tokyo (JP)

(72) Inventors: Jeffrey Roger Stafford, Redwood City, CA (US); Todd Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 212 days.

(21) Appl. No.: 14/633,415

(22) Filed: Feb. 27, 2015

(65) Prior Publication Data

US 2015/0258431 A1 Sep. 17, 2015

Related U.S. Application Data

(60) Provisional application No. 61/953,732, filed on Mar. 14, 2014.

(51) Int. Cl.
*G06F 3/01* (2006.01)
*A63F 13/213* (2014.01)
(Continued)

(52) U.S. Cl.
CPC .......... *A63F 13/213* (2014.09); *A63F 13/211* (2014.09); *A63F 13/212* (2014.09);
(Continued)

(58) Field of Classification Search
None
See application file for complete search history.

(56) References Cited

U.S. PATENT DOCUMENTS 6,921,332 B2   7/2005   Fukunaga et al.
7,082,570 B1 *   7/2006   von Wiegand ......... A63F 13/06
                                                        345/156

(Continued)

FOREIGN PATENT DOCUMENTS

WO   2014055240 A2   4/2014
WO   2014169390 A2   10/2014
WO   2015006196 A1   1/2015

OTHER PUBLICATIONS

David Kim et al: "Digits: Freehand 3D Interactions Anywhere Using a Wrist-worn Gloveless Sensor", Proceedings of the 25th Annual ACM Symposium on User Interface Software and Technology, UIST '12, Oct. 7, 2012 (Oct. 7, 2012), pp. 167-176 (10 pages).

(Continued)

*Primary Examiner* — Jason Yen
(74) *Attorney, Agent, or Firm* — Martine Penilla Group, LLP

(57) ABSTRACT

A method to identify positions of fingers of a hand is described. The method includes capturing images of a first hand using a plurality of cameras that are part of a wearable device. The wearable device is attached to a wrist of a second hand and the plurality of cameras of the wearable device is disposed around the wearable device. The method includes repeating capturing of additional images of the first hand, the images and the additional images captured to produce a stream of captured image data during a session of presenting the virtual environment in a head mounted display (HMD). The method includes sending the stream of captured image data to a computing device that is interfaced with the HMD. The computing device is configured to process the captured image data to identify changes in positions of the fingers of the first hand.

29 Claims, 26 Drawing Sheets

(51) Int. Cl.
*A63F 13/212* (2014.01)
*A63F 13/211* (2014.01)
*A63F 13/5255* (2014.01)
*G06K 9/00* (2006.01)

(52) U.S. Cl.
CPC .......... *A63F 13/5255* (2014.09); *G06F 3/014* (2013.01); *G06K 9/00382* (2013.01); *A63F 2300/1012* (2013.01); *A63F 2300/1031* (2013.01); *A63F 2300/301* (2013.01); *A63F 2300/308* (2013.01); *A63F 2300/538* (2013.01); *G06F 3/011* (2013.01)

(56) References Cited

U.S. PATENT DOCUMENTS

| | | | |
|---|---|---|---|
| 7,674,184 B2 | 3/2010 | Briggs et al. | |
| 7,771,271 B2 | 8/2010 | Walker et al. | |
| 7,931,535 B2 | 4/2011 | Ikeda et al. | |
| 7,942,745 B2 | 5/2011 | Ikeda et al. | |
| 8,170,656 B2 | 5/2012 | Tan et al. | |
| 8,289,162 B2 | 10/2012 | Mooring et al. | |
| 8,313,379 B2 | 11/2012 | Ikeda et al. | |
| 8,319,601 B2 | 11/2012 | Gelman et al. | |
| 8,550,915 B2 | 10/2013 | Ashida et al. | |
| 8,581,721 B2 | 11/2013 | Asher et al. | |
| 8,651,961 B2 | 2/2014 | Muller | |
| 8,814,754 B2 | 8/2014 | Weast et al. | |
| 8,858,332 B2 | 10/2014 | Arezina et al. | |
| 9,412,001 B2 * | 8/2016 | Lee | G06F 3/011 |
| 2007/0279852 A1 | 12/2007 | Daniel et al. | |
| 2008/0300055 A1 * | 12/2008 | Lutnick | G07F 17/3209 |
| | | | 463/39 |
| 2008/0318679 A1 | 12/2008 | Tran et al. | |
| 2009/0048070 A1 | 2/2009 | Vincent et al. | |
| 2009/0262967 A1 | 10/2009 | Bryan | |
| 2009/0322673 A1 | 12/2009 | Cherradi El Fadili | |
| 2011/0009193 A1 | 1/2011 | Bond et al. | |
| 2011/0021273 A1 | 1/2011 | Buckley et al. | |
| 2011/0128347 A1 | 6/2011 | Theobald | |
| 2011/0142353 A1 * | 6/2011 | Hoshino | G06K 9/628 |
| | | | 382/203 |
| 2012/0327194 A1 | 12/2012 | Shiratori et al. | |
| 2013/0187789 A1 | 7/2013 | Lowe | |
| 2013/0188322 A1 | 7/2013 | Lowe | |
| 2013/0288761 A1 | 10/2013 | Santos Paiva Ferraz Conceicao | |
| 2014/0028546 A1 | 1/2014 | Jeon et al. | |
| 2014/0055352 A1 * | 2/2014 | Davis | G06F 3/017 |
| | | | 345/156 |
| 2014/0198035 A1 * | 7/2014 | Bailey | G06F 3/014 |
| | | | 345/156 |
| 2014/0235348 A1 | 8/2014 | Liang et al. | |
| 2015/0049657 A1 | 2/2015 | Cheng et al. | |

OTHER PUBLICATIONS

PCT/US2015/019704, PCT International Search Report and Written Opinion, Jun. 18, 2015, 15 pages.

Takuya Maekawa et al: "WristSense: Wrist-worn Sensor Device With Camera for Daily Activity Recognition", Pervasive Computing and Communications Workshops (PERCOM Workshops), 2012 IEEE International Conference on, IEEE, Mar. 19, 2012 (Mar. 19, 2012), pp. 510-512 (3 pages).

* cited by examiner

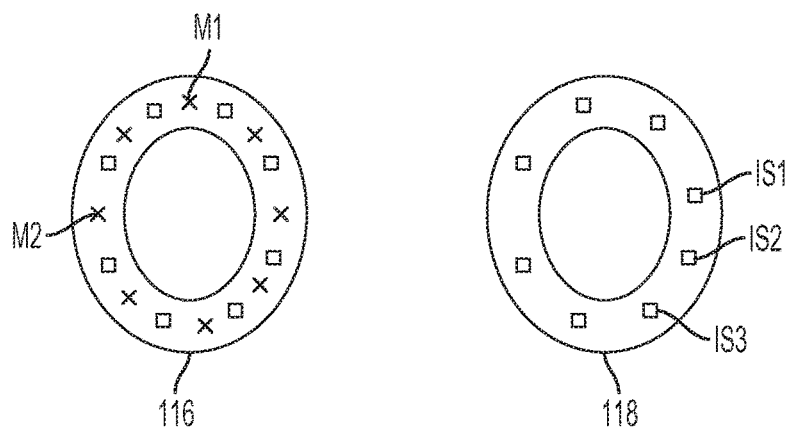
FIG. 7A
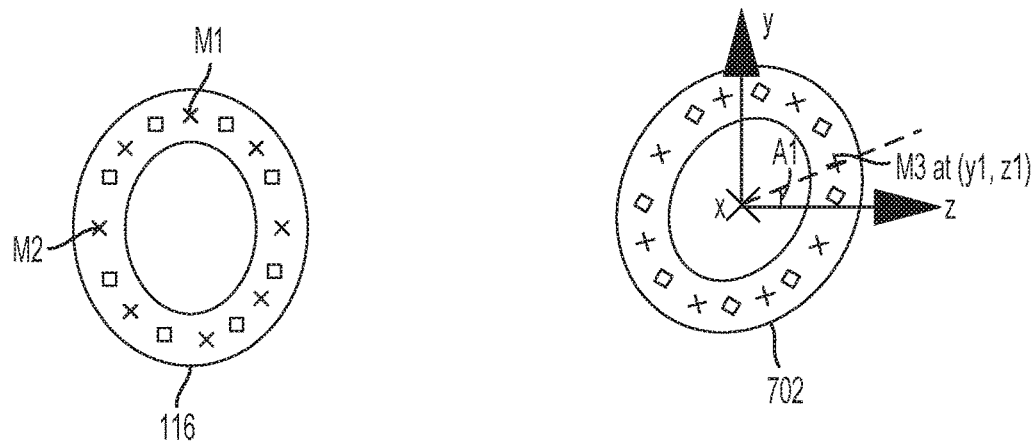
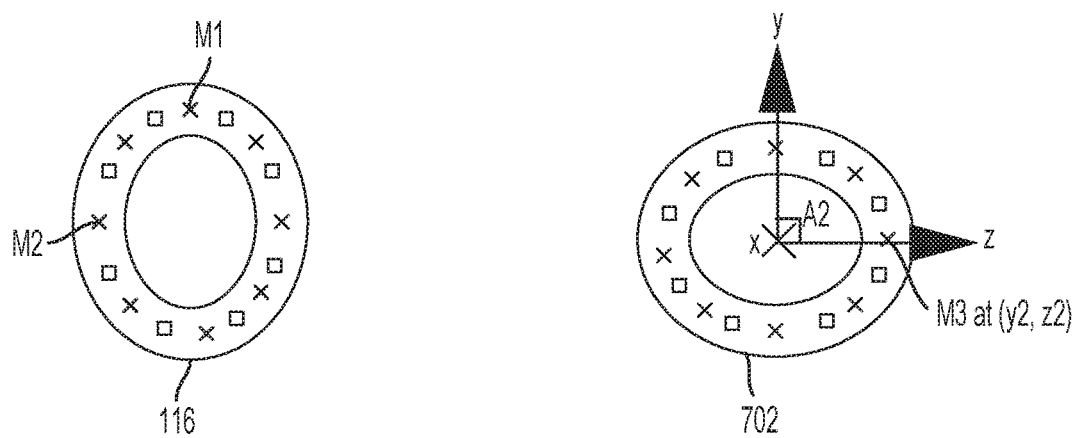
FIG. 7B

GAMING DEVICE WITH ROTATABLY PLACED CAMERAS

CLAIM OF PRIORITY

This application claims the benefit of and priority to, under 35 U.S.C. §119(e), to U.S. Provisional Patent Application No. 61/953,732, filed on Mar. 14, 2014, and titled "Gaming Device With Rotatably Placed Cameras", which is hereby incorporated by reference in its entirety.

FIELD

The present invention relates to methods and systems for using rotatably placed cameras with a gaming device.

BACKGROUND

In current systems that track a user's hands, a user usually holds a controller or wears a special glove so that the user views his/her hands represented in a virtual or an augmented space. The user holding a controller has a limited range of hand and finger movements; otherwise he/she may drop the controller. The user wearing a tracking glove also undergoes inconvenience of wearing and removing the glove each time he/she wishes to see his/her hands, and also experiences reduced hygiene occurring by placement of his/her fingers inside the glove.

It is in this context that embodiments of the invention arise.

SUMMARY

Embodiments described in the present disclosure provide systems and methods for using rotatably placed cameras with a gaming device.

In one embodiment, a user wears a rotatable device on his/her wrists. For example, one wearable device is worn on a wrist of the user and another wearable device is worn on another wrist of the user. A camera is embedded within each wearable device. The camera of the wearable device worn on the left wrist captures image data associated with a right hand of the user. For example, the camera captures image data of fingers of the right hand, or of the right hand, or of the wearable device worn on the right wrist, or of a portion of the right arm, etc. Similarly, the camera of the wearable device worn on the right wrist captures image data associated with the left hand of the user. The image data is transferred to a game console or another computer system, e.g., another computing device, etc., for determining a position and orientation of at least a portion of the right arm and determining a position and orientation of at least a portion of the left arm. The position and orientation of the portion of the left arm and/or the position and orientation of the portion of the right arm is used to determine a state, e.g., color, texture, position, orientation, shade, shape, etc., of a virtual object to be displayed on a head-mounted display (HMD).

In some embodiments, a user wears a wearable device to manipulate, e.g., grab, move, push, pull, etc., a virtual object in a virtual reality (VR) or an augmented reality (AR) scene, which is displayed on an HMD or on a display device, e.g., a television, a computer, etc. A virtual hand within a game moves when the user moves his/her hand while wearing the wearable device. Moreover, fingers of a virtual hand in the game move when the user moves his/her fingers while wearing the wearable device. Position and/or orientation of the fingers are determined from image data captured using the cameras described above to generate the movement of fingers of the virtual hand.

For virtual reality or augmented reality, a certain number of applications increase immersion or closely replicate reality if a position and/or orientation of a body part, e.g., a hand, a foot, a finger, a thumb, a combination of the hand and the finger, a combination of the hand and the thumb, etc., of the user is determined.

In some embodiments, a number of wearable bands, e.g., a pair of wrist bands, a pair of ankle bands, a pair of finger bands, a pair of thumb bands, etc., are provided with cameras to generate image data regarding a position and/or orientation of a body part. For example, a wearable band that is integrated with a camera and worn on a finger of the left hand of the user generates image data of the right hand of the user. In an embodiment, a wearable band is integrated with a wearable device, e.g., a wrist watch, a bracelet, etc.

In an embodiment, each wearable band has at least one camera that is able to track the other wearable band and/or the other body part. Images that are captured by the wearable band of the other wearable band and/or the other body part are used by a processor, e.g., a processor of an HMD, a processor of a game console, etc., to detect position and/or orientation of the user's body parts. For example, a relative position and/or a relative orientation of wrists of the user are determined from the images. The relative position and/or the relative orientation are used by a processor to determine a next game state of a game. For example, the relative position and/or the relative orientation of a body part is used to determine whether the user moves a game piece, e.g., a virtual tennis ball, a virtual weapon, etc., in a VR or an AR image.

In various embodiments, each wearable band includes a number of cameras, e.g., one camera, two cameras, four cameras, etc., so that the cameras are able to point toward the other body part depending on an orientation of the body part and position of the body part. For example, when a ventral part of the left arm faces a ventral part of the right arm, cameras placed around a left wrist of the user face a right wrist of the user to obtain images of the right wrist and/or of the right hand and cameras placed around the right wrist of the user face the left wrist to obtain images of the left wrist and/or of the left hand.

In several embodiments, cameras of wearable bands have wide angle lens for a wide field of view, so fewer cameras on each wearable band are used.

In some embodiments, wearable bands are connected via a medium, e.g., a wired medium, a wireless medium, etc., with each other, to the HMD and/or to a computing device, e.g., the game console, a desktop computer, a laptop computer, a tablet computer, a cell phone, etc. Examples of the medium include Bluetooth, Wi-Fi, universal serial bus (USB), a parallel transfer medium, a serial transfer medium, and Ethernet. The wearable bands communicate via the medium with each other, with the HMD and/or with the game console. For example, the wearable bands communicate with each other to exchange synchronization information with each other. Examples of the synchronization information include frame rate of a camera of a wearable device, a rate at which light emitters of the wearable device are pulsed, etc.

In various embodiments, a wearable band includes inertial sensors, to detect movement and/or orientation of the body part. The inertial sensors generate resistance indicating signals based on a movement of the body part on which the wearable band is worn and provide the signals to a processor. The processor analyzes the signals to determine a position and/or an orientation of the body part with respect to an xyz co-ordinate system, which is located on a camera of the wearable device.

In several embodiments, at least one camera on each wrist band is directed at the other wrist, so that each wrist band tracks the other wrist and movements of the other hand or fingers of the other hand.

In some embodiments, each wearable band includes markers, e.g., flashing light emitting diodes (LEDs), or quick response (QR) codes, or reflectors, or patterns, or visible lights, or infrared (IR) lights, or a combination thereof, etc., to enable identification of a location of the other body part. For example, the markers and cameras of a wearable band are interspersed with each other to provide an alternate arrangement of the markers and the cameras. The camera on the wearable band generates images of markers on the other wearable band and provides the images to a processor to determine a position and/or an orientation of the other body part.

In various embodiments, a color of a first wearable band is different from a color of a second wearable band to distinguish a first body part on which the first wearable band is worn from a second body part on which the second wearable band is worn. A processor is pre-programmed to associate a color with the first body part and another color with the second body part to separate movements of the two body parts.

In several embodiments, each wearable band includes a light emitter, e.g., a fiber optic light emitter, a diffused fiber optic light emitter, etc., so that each wearable band emits a color. The color is detected by a camera of the other wearable band and/or of an HMD and/or of the game console and/or of a display device, e.g., a television, a computing device monitor, etc., to enable a processor to determine and position and/or an orientation of the body part. As an example, a fiber optic cable is looped around a wearable band or defines a pattern of light emitters that is viewed by a camera integrated in a wearable band that is worn on the other body part. The pattern is embodied within image data that is provided by the camera via the medium to the processor. The processor, based on the pattern embodied within the image data, determines a position and/or an orientation of the body part (e.g., fingers, wrist, etc.) as viewed by the camera on the other wearable device and/or a camera on the HMD and/or a camera connected to the game console. In this example, the fiber optic cable has openings for escape of light and each opening acts as a light emitter. As another example, light emitters that emit light are placed around a wearable band.

In some embodiments, the user wears colored wearable bands, and the colored wearable bands do not include any electronics or cameras. The user places his/her hands or wrists over a surface, e.g., a white surface, a white mat, a white board, etc., and a camera of an HMD or a camera of the game console generates image data including positions and orientations of the colored body part bands and portions of the arms of the user and the image data is used to identify position and/or orientation of the hands or wrists of the user.

In various embodiments, the user places his/her wrists and/or hands over a pad device, e.g., a mat, a surface, a board, etc., that is colored (e.g., green screen, blue screen, etc.), and a camera can track the wrists and/or hands. Examples of the pad device include a mat that is flexible and is rolled.

In various embodiments, a camera is an IR camera. In various embodiments, some cameras on a wearable band are IR cameras and the remaining cameras are visible light cameras.

In an embodiment, a method to identify positions of fingers of a hand is described. The positions are used to render a virtual hand to be displayed in a head mounted display (HMD) when presenting a virtual environment in the HMD. The method includes capturing images of a first hand using a plurality of cameras that are part of a wearable device. The wearable device is attached to a wrist of a second hand and the plurality of cameras of the wearable device are disposed around the wearable device so that the plurality of cameras are distributed around the wrist of the second hand. The method includes repeating capturing of additional images of the first hand, the images and the additional images captured to produce a stream of captured image data during a session of presenting the virtual environment in the HMD. The method includes sending the stream of captured image data to a computing device that is interfaced with the HMD. The computing device is configured to process the captured image data to identify changes in positions of the fingers of the first hand for rendering the virtual hand in the HMD corresponding to the changes in the positions of the fingers of the first hand.

In one embodiment, a method for identifying positions of hands of a user interacting with a virtual environment displayed in an HMD is described. The method includes capturing images of a first hand of the user using a plurality of cameras that are part of a first wearable device, which is attachable to a wrist of the first hand. The plurality of cameras of the first wearable device is disposed at angular positions around the first wearable device. The method includes capturing images of a second hand of the user using a plurality of cameras that are part of a second wearable device. The second wearable device is attachable to a wrist of the second hand. The plurality of cameras of the second wearable device is disposed at angular positions around the second wearable device. The method includes continuing the capturing of the images from the plurality of cameras of the first and second wearable devices during a session of interactivity with the virtual environment displayed in the HMD. The images captured by the first wearable device include images of the second wearable device and images captured by the second wearable device include images of the first wearable device. The method includes capturing additional images of the first wearable device and the second wearable device using a reference camera. The method includes sending the images from the first wearable device, the images from the second wearable device, and the additional images from the reference camera to a computing device that is interfaced with the HMD. The computing device is configured to process the images from the first wearable device to identify positions of the second hand and process the images from the second wearable device to identify positions of the first hand, and the computing device uses the reference camera to provide a reference for the positions of the first and second hands.

In an embodiment, a system includes a first wearable device for wearing on a wrist of a first hand of a user. The first wearable device includes a camera for capturing image data of a second hand of the user. The first wearable device includes a communication device for communicating the image data captured using the first wearable device. The system includes a game console coupled to the first wearable device. The game console has a console communication device coupled to the communication device of the wearable device for receiving the image data from the communication device of the wearable device. The game console includes a game processor coupled to the console communication device for identifying a position of the second hand of the user from the image data captured using the first wearable device. The game processor is configured to determine data regarding a state of a virtual object in a virtual environment based on the position of the second hand. The console communication device sends the data regarding the state of the virtual object. The system includes an HMD coupled to the game console. The HMD includes an HMD communication device coupled to the console communication device for receiving the data regarding the state of the virtual object from the console communication device. The HMD further includes a processing unit coupled to the HMD communication device for displaying the virtual object having the state on a display screen of the HMD.

Some advantages of the herein described embodiments include providing a close-up view of a portion of an arm of a user. The close-up view is captured by a camera that is integrated within a wearable device. The close-up view provides an accurate position and/or orientation of the portion of the arm. The accurate position and/or orientation are used to determine a state, e.g., color, texture, shade, shape, position, orientation, etc., of a virtual object in an image.

Also, further advantages of the herein described embodiments include using a wearable device that is more hygienic and easier to use than a glove. For example, the wearable device is attached to a wrist of a user and there is no enclosure that surrounds fingers and hand of the user. The lack of enclosure improves hygiene for the user. Moreover, there is a lesser risk of a wearable device falling off when a user makes a gesture in which his/her fingers are pointing to a floor on which the user is standing or sitting. The wearable device is fastened to an arm of the user.

Other aspects described in the present disclosure will become apparent from the following detailed description, taken in conjunction with the accompanying drawings, illustrating by way of example the principles described in the present disclosure.

BRIEF DESCRIPTION OF THE DRAWINGS

Various embodiments of the present disclosure are best understood by reference to the following description taken in conjunction with the accompanying drawings in which:

FIG. 7A is a diagram of a wearable device that includes a number of markers, in accordance with one embodiment of the present disclosure.

FIG. 7B is a diagram to illustrate use of a position of a wearable device to determine an orientation of the wearable device with respect to another wearable device, in accordance with one embodiment of the present disclosure.

DETAILED DESCRIPTION

Systems and methods for using rotatably placed cameras with a gaming device are described. It should be noted that various embodiments described in the present disclosure may be practiced without some or all of these specific details. In other instances, well known process operations have not been described in detail in order not to unnecessarily obscure various embodiments described in the present disclosure.

Figure 1A:
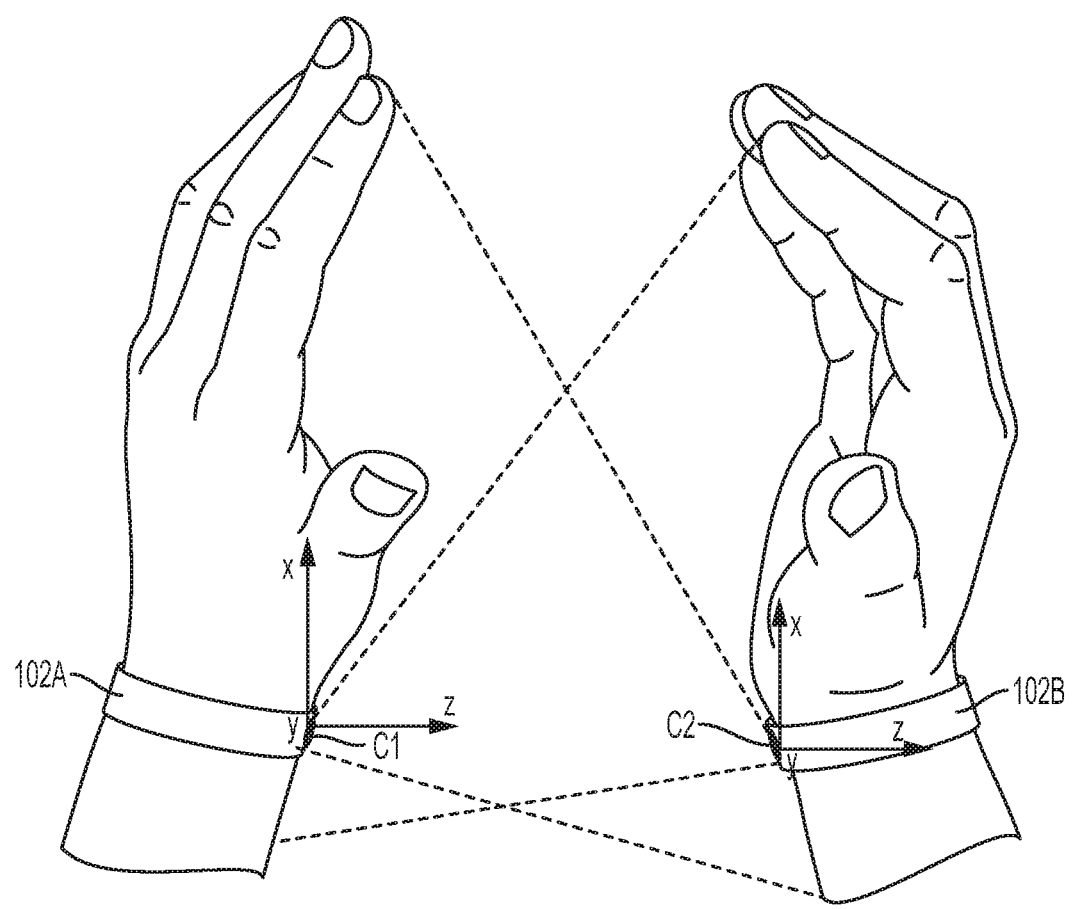
FIG. 1A is a diagram of a system to illustrate use of wearable devices to generate images of the opposite wearable devices and/or opposite hands and/or fingers of the opposite hands of a user, in accordance with one embodiment of the present disclosure.

FIG. 1A is a diagram of an embodiment of a system to illustrate use of wearable devices 102A and 102B to generate images of the opposite wearable devices 102A and 102B and/or opposite hands and/or fingers of the opposite hands of a user. Each wearable device is worn around the corresponding wrist of the user. For example, a wearable device is a wrist band, a watch, a bracelet, a flexible band, a rubber band, etc. In one embodiment, a wearable device is made of a solid material, e.g., a metal, etc. In another embodiment, a wearable device is made of a flexible material, e.g., fabric, plastic, rubber, etc. The wearable device 102A is worn on a left wrist of the user and the wearable device 102B is worn on a right wrist of the user.

Each wearable device 102A and 102B includes one or more cameras, e.g., C1 and C2, etc. The cameras C1 and C2 face each other. For example, the camera C1 faces a lens of the camera C2 and/or the right hand of the user. As another example, the camera C2 faces a lens of the camera C1 and/or the left hand of the user. As yet another example, the wearable device 102A is worn on a wrist of the user so that the camera C1 of the wearable device 102A is located on a ventral side of the left hand. As another example, the wearable device 102B is worn on a wrist of the user so that the camera C2 of the wearable device 102B is located on ventral side of the right hand. Examples of a camera include a depth camera, a wide field-of-view camera, a digital camera, an infrared camera, etc.

While the user is wearing wearable devices, the user is making gestures with his/her body part, e.g., a wrist, a hand, a forearm, a leg, an ankle, a knee, a finger, a foot, an arm, a finger joint, etc. For example, the user moves his/her hand up or down in a real-world environment, e.g., a room in which the user is located, an open space in which the user is located, etc. As another example, the user moves his/her hand left or right or diagonally. As yet another example, the user moves his/her hand to traverse a virtual environment, e.g., an augmented reality environment, a virtual reality environment, a game environment, an environment generated from data accessed via a computer network, etc. As another example, the user moves his/her hand to change a position and/or orientation of a virtual object in a virtual environment. To illustrate, the user makes a triggering gesture with his/her index finger to press a virtual trigger of a virtual gun in a game. As another illustration, the user makes a side hand motion by extending his/her fingers and moving his/her palm from right to left to push aside a virtual object. Other examples of a virtual object include a virtual vehicle, a virtual hand of the user, a virtual user, a virtual sword, an avatar of the user, a virtual finger, a virtual finger joint, a virtual tree, a virtual flower, etc.

The camera C1 of the wearable device 102A generates images of the right wrist of the user and/or of the right hand of the user, and/or of the wearable device 102B, and/or of fingers of the right hand of the user and/or of finger joints of one or more fingers of the right hand of the user. Similarly, the camera C2 of the wearable device 102B generates image data of the left wrist of the user and/or of the left hand of the user, and/or of the wearable device 102A, and/or of fingers of the left hand of the user and/or of finger joints of one or more fingers of the left hand of the user. The image data generated by the cameras C1 and C2 is communicated via a medium, e.g., a wired medium, a wireless medium, etc., to a head mounted display (HMD) or to a game console.

A processor of the HMD or a processor of the game console analyzes the image data to determine a position of the right wrist with respect to the camera C1 worn on the left wrist, and/or a position of fingers of the right hand with respect to the camera C1 worn on the left wrist, and/or a position of the right hand with respect to the camera C1 worn on the left wrist, and/or an orientation of the right wrist with respect to the camera C1 worn on the left wrist, and/or an orientation of fingers of the right hand with respect to the camera C1 worn on the left wrist, and/or an orientation of the right hand with respect to the camera C1 worn on the left wrist.

A processor of the HMD or a processor of the game console analyzes the image data to determine a position of the left wrist with respect to the camera C2 worn on the right wrist, and/or a position of fingers of the left hand with respect to the camera C2 worn on the right wrist, and/or a position of the left hand with respect to the camera C2 worn on the right wrist, and/or an orientation of the left wrist with respect to the camera C2 worn on the right wrist, and/or an orientation of fingers of the left hand with respect to the camera C2 worn on the right wrist, and/or an orientation of the left hand with respect to the camera C2 worn on the right wrist.

Examples of a processor include an application specific integrated circuit (ASIC), a programmable logic device (PLD), a microprocessor, a controller, a central processing unit, etc.

In some embodiments, a lower number of cameras are used on a wearable device if each camera is a wide field of view camera than if each camera is a narrow field of view camera.

In various embodiments, a camera is integrated within a wearable device. In some embodiments, a camera is placed on top of the wearable device.

In an embodiment, a camera is programmed to capture an image of a wearable device at regular intervals. For example, a camera is coupled to a processor, e.g., a game processor, a processor of an HMD, etc., which sends a signal to the camera periodically via one or more communication devices. Upon receiving the signal, the camera captures an image of a wearable device.

In one embodiment, a camera includes a processor that is pre-programmed to send a signal to a switch to periodically capture an image of a wearable device. The switch controls the camera to capture image data.

In one embodiment, a power source provides power to electronics, e.g., a camera, a processor, a light sensor, a light emitter, etc., within a wearable device. The power source is located within the wearable device.

In an embodiment, a camera is embedded within a wearable device and a lens of the camera extends outside a surface of the wearable device to facilitate capturing images of another wearable device. For example, a wearable device when worn has an inside surface that abuts the body part of the user and has an outside surface that does not abut the body part. The lens is located on the outside surface when the wearable device is worn. As another example, a wearable device when worn on an arm of the user has a camera having a lens that faces the other hand of the user.

It should be noted that the camera C1 captures image data of an item, e.g., the right hand of the user, fingers of the right hand of the user, finger joints of the right hand of the user, palm of the right hand of the user, the wearable device 102B, ventral side of the right hand, dorsal side of the right hand, etc. The image data is used to determine a position and/or orientation of an item from a reference point, e.g., an origin (0, 0, 0), etc., of an xyz co-ordinate system and the reference point is on the camera C1. Similarly, the camera C2 captures image data of an item, e.g., the left hand of the user, fingers of the left hand of the user, finger joints of the left hand of the user, palm of the left hand of the user, the wearable device 102A, dorsal side of the left hand, ventral side of the left hand, etc. The image data is used to determine a position and/or orientation of an item from a reference point, e.g., an origin (0, 0, 0), etc., of the xyz co-ordinate system and the reference point is located on the camera C2.

In an embodiment, an orientation of a limb of a user includes an angle formed by an axis that passes through a length of the limb with respect to an x-axis of the xyz co-ordinate system, an angle formed by the axis that passes through the length of the limb with respect to a y-axis of the xyz co-ordinate system, and an angle formed by the axis that passes through the length of the limb with respect to a z-axis of the xyz co-ordinate system.

In one embodiment, each wearable device, described herein, includes one or more inertial sensors to generate a position and/or an orientation of the wearable device. For example, the wearable device 102A includes a number of magnetometers, a number of accelerometers, and/or a number of gyroscopes to generate a position and/or orientation of the wearable device 102A. The position and/or orientation are communicated to the game console. The game console uses the position and/or orientation to identify a state, e.g., color, texture, shape, position, orientation, shade, etc., of a virtual object corresponding to the position and/or orientation of the wearable device 102A.

In one embodiment, the wearable device 102A is worn in a manner similar to wearing a wrist watch. For example, the wearable device 102A has straps that wrap around each other to surround a wrist of the user. The straps wrap around each other using an engagement mechanism, e.g., magnets situated within each strap, a hook and engage mechanism in which a hook is attached to one strap and a hole is formed in another strap to engage with the hook, etc.

In an embodiment, the wearable device 102A is worn around a wrist of the user to fit surround the wrist in a manner similar to wearing a wrist band. For example, the wearable device 102A is made of a flexible material that stretches when a hand is inserted within an opening formed between inside surfaces of the wearable device 102A to fit the wearable device around a wrist of the user.

In one embodiment, the wearable device 102A has two arms and is worn in a manner similar to wearing a bracelet. For example, one of the two arms hinges on and with respect to the other arm. A hook and engage mechanism is opened to allow the wearable device 102A to wrap around a wrist of the user. Once the wearable device wraps around the wrist of the user, a hook of one arm is engaged to a hole formed within the other arm to engage the hook with the hole to fit the wearable device 102A to the wrist.

In an embodiment, a wrist is a portion of an arm of a user between an elbow and a hand of the arm. In one embodiment, a wrist is a portion of an arm of a user between an elbow and a hand of the arm and portion is closer to the hand than to the elbow.

Figure 1B:
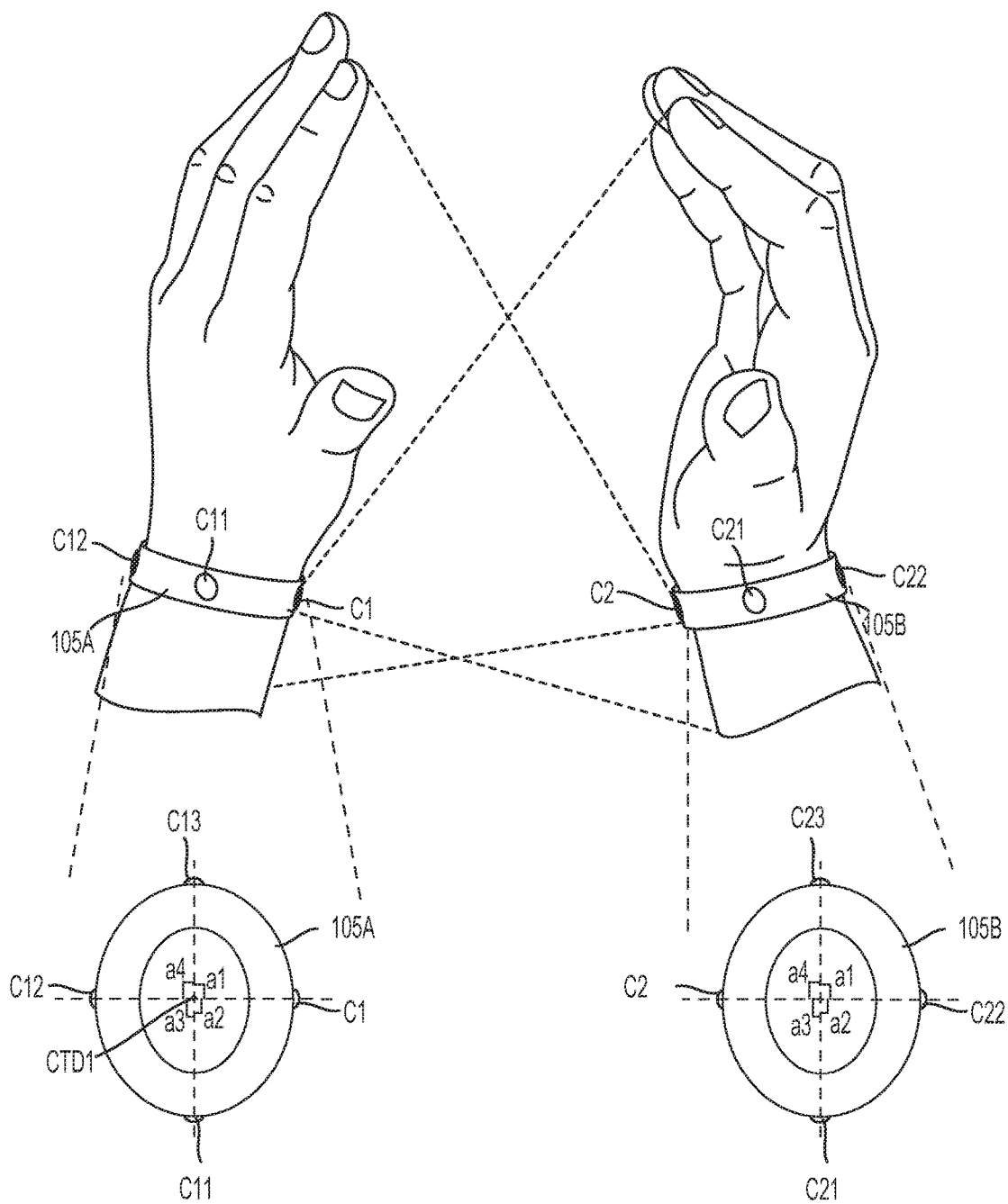
FIG. 1B is a diagram to illustrate use of multiple cameras to captures images of left and right hands of the user, in accordance with one embodiment of the present disclosure.

FIG. 1B is a diagram to illustrate use of multiple cameras to captures images of left and right hands of the user. A wearable device 105A is attached to, e.g., worn around, fitted around, etc., a wrist of the left hand of the user and another wearable device 105B is attached to a wrist of the right hand of the user. The wearable device 105A is an example of the wearable device 102A (FIG. 1A) and the wearable device 105B is an example of the wearable device 102B (FIG. 1A). The wearable device 105 has integrated therein cameras C1, C11, C12, and C13. Similarly, the wearable device 105B has integrated therein cameras C2, C21, C22, and C23.

The cameras C1, C11, C12, and C13 are distributed around the wrist of the left hand to be located at angular positions of a1, a2, a3, and a4, and the cameras C2, C21, C22, and C23 are distributed around the wrist of the right hand to be located at the angular positions of a1, a2, a3, and a4. For example, the cameras C1, C11, C12, and C13 are spaced apart from each other at equal angular positions. To further illustrate, the camera C1 is located at an angle of 90 degrees with respect to the camera C11, the camera C11 is located at an angle of 90 degrees with respect to the camera C12, the camera C12 is located at an angle of 90 degrees with respect to the camera C13, and the camera C13 is located at an angle of 90 degrees with respect to the camera C1. As another example, the cameras C1, C11, C12, and C13 are spaced apart from each other at unequal angular positions. For example, the angle a1 is unequal to one or more of the angles a2, a3, and a4. As another example, the cameras C2, C21, C22, and C23 are spaced apart from each other at equal angular positions. To further illustrate, the camera C2 is located at an angle of 90 degrees with respect to the camera C21, the camera C21 is located at an angle of 90 degrees with respect to the camera C22, the camera C22 is located at an angle of 90 degrees with respect to the camera C23, and the camera C23 is located at an angle of 90 degrees with respect to the camera C2. As another example, the cameras C2, C21, C22, and C23 are spaced apart from each other at unequal angular positions.

Angular positions of cameras of a wearable device are formed with respect to lines that pass through a centroid of the wearable device. For example, the angle a1 is formed with respect to a horizontal dashed line that passes through a centroid CTD1 of the wearable device 105A, the angle a2 is formed with respect to a vertical line that passes through the centroid CTD1, the angle a3 is formed with respect to the horizontal line, and the angle a4 is formed with respect to the vertical line.

The cameras C1, C11, C12, and C13 capture image data of the right hand of the user and the cameras C2, C21, C22, and C23 capture image data of the left hand of the user. For example, when the wearable device 105B is worn by the user on the wrist of his/her right hand, the camera C2 captures image data of the left hand of the user. When the wearable device 105B turns, e.g., rotates, etc., with respect to the wrist of the right hand of the user during interaction of the user with a virtual environment, the camera C21 instead of the camera C2 faces the left hand of the user and captures image data of the left hand. As another example, when the wearable device 105A is worn by the user on the wrist of his/her left hand, the camera C1 captures image data of the right hand of the user. When the wearable device 105A turns with respect to the wrist of the left hand of the user during interaction of the user with the virtual environment, the camera C11 instead of the camera C1 faces the right hand of the user and captures image data of the right hand.

In one embodiment, instead of a wearable device, e.g., the wearable device 105B, the wearable device 105A, etc., turning with respect to a wrist of a hand on which the wearable device is worn, the wearable device is fitted, e.g., by pressing, by using a wrap-around belt, by using a hook and engage mechanism, by using a strap, etc., to the wrist to reduce chances of the wearable device turning with respect to the wrist of the right hand of the user. For example, before the wrist of the right hand is turned, the camera C2 captures image data of the left hand of the user and after the wrist is turned, e.g., clockwise, etc., the camera C23 captures image data of the left hand of the user. As another example, before the wrist of the left hand is turned, the camera C1 captures image data of the right hand of the user and after the wrist is turned, e.g., counterclockwise, etc., the camera C13 captures image data of the right hand of the user.

It should be noted that although each wearable device is shown as including four cameras, in one embodiment, each wearable device includes more or less than four cameras. For example, the wearable device 105A includes six cameras that are equally or unequally spaced apart.

In an embodiment, the wearable device 105A includes a different number of cameras than that included within the wearable device 105B.

In an embodiment, a wearable device includes a processor that is connected a camera of the wearable device to receive image data that is captured by the camera. The processor of the wearable device is embedded within the wearable device, e.g., is located within a hollow space within a housing of the wearable device, etc. The processor of the wearable device determines whether a hand of the user is visible in image data that is received from the camera. For example, the processor of the wearable device determines whether pixel data that is a part of the image data includes a shape of a hand, or a texture of the hand, or a color of the hand, or a combination of two or more thereof. Upon determining that the pixel data includes the shape or the texture or the color or the combination of two or more thereof, the processor determines that the image data includes an image of the hand. On the other hand, upon determining that the pixel data does not include the shape, the texture, and/or the color, the processor determines that the image data does not include the image of the hand. The processor is connected to a switch, e.g., a transistor, a group of transistors, etc., that connects the camera to a power supply, e.g., a battery, etc., that is also embedded within the hollow space of the wearable device. Upon determining that the image data does not include the image of the hand, the processor turns off the switch to remove power from being supplied from the power supply to the camera to turn off the camera. On the other hand, upon determining that the image data includes the image of the hand, the processor continues to maintain the switch in an on position to continue a supply of power from the power supply to the camera to continue capturing of image data by the camera.

In an embodiment, instead of turning off a camera upon determining that the image data does not include an image of a hand of a user, a processor of a wearable device sends a signal to the camera of the wearable device to reduce a frame rate with which images are captured by the camera and/or to reduce a resolution of images captured by the camera. Upon determining that image data captured by the camera includes the image of the hand after sending the signal to reduce the resolution, the processor sends another signal to the camera to increase the resolution of images to a pre-determined amount. Similarly, upon determining that image data captured by the camera includes the image of the hand after sending the signal to reduce the frame rate, the processor sends another signal to the camera to increase the frame rate to a pre-determined level.

In one embodiment, instead of the processor being located in the wearable device to determine whether to turn on or off a camera and/or to decrease the frame rate and/or to decrease the resolution based on whether image data includes an image of a hand, the processor is located in a game console. Image data that is captured by the camera of the wearable device is provided via a communication device of the wearable device and a communication device of the game console to a game processor of the game console. The game processor makes the same determination as that described above as being made the processor of the wearable device and provides the determination to the wearable device to control a switch that is located in the wearable device via communication devices of the game console and of the wearable device.

In one embodiment, a processor determines from image data captured using a camera of a wearable device that the camera remain on to capture further image data and determines from image data captured using another camera of the wearable device that the other camera be turned off. For example, upon determining from image data captured using the camera C1 of the wearable device 105A that the camera C1 is oriented to face the right hand of the user and upon determining from image data captured using the camera C12 of the wearable device 105A that the camera C12 is oriented to face away from the right hand of the user, a processor of the wearable device or of a game console determines that the camera C1 remain on and that the camera C12 be turned off. To illustrate, a game processor determines that the camera C1 is oriented to face the right hand of the user when image data generated by the camera C1 includes an image of the right hand. Such turning on and off of cameras saves power and also reduces image data that is generated by the cameras to reduce changes of information overload for analysis.

Figure 1C:
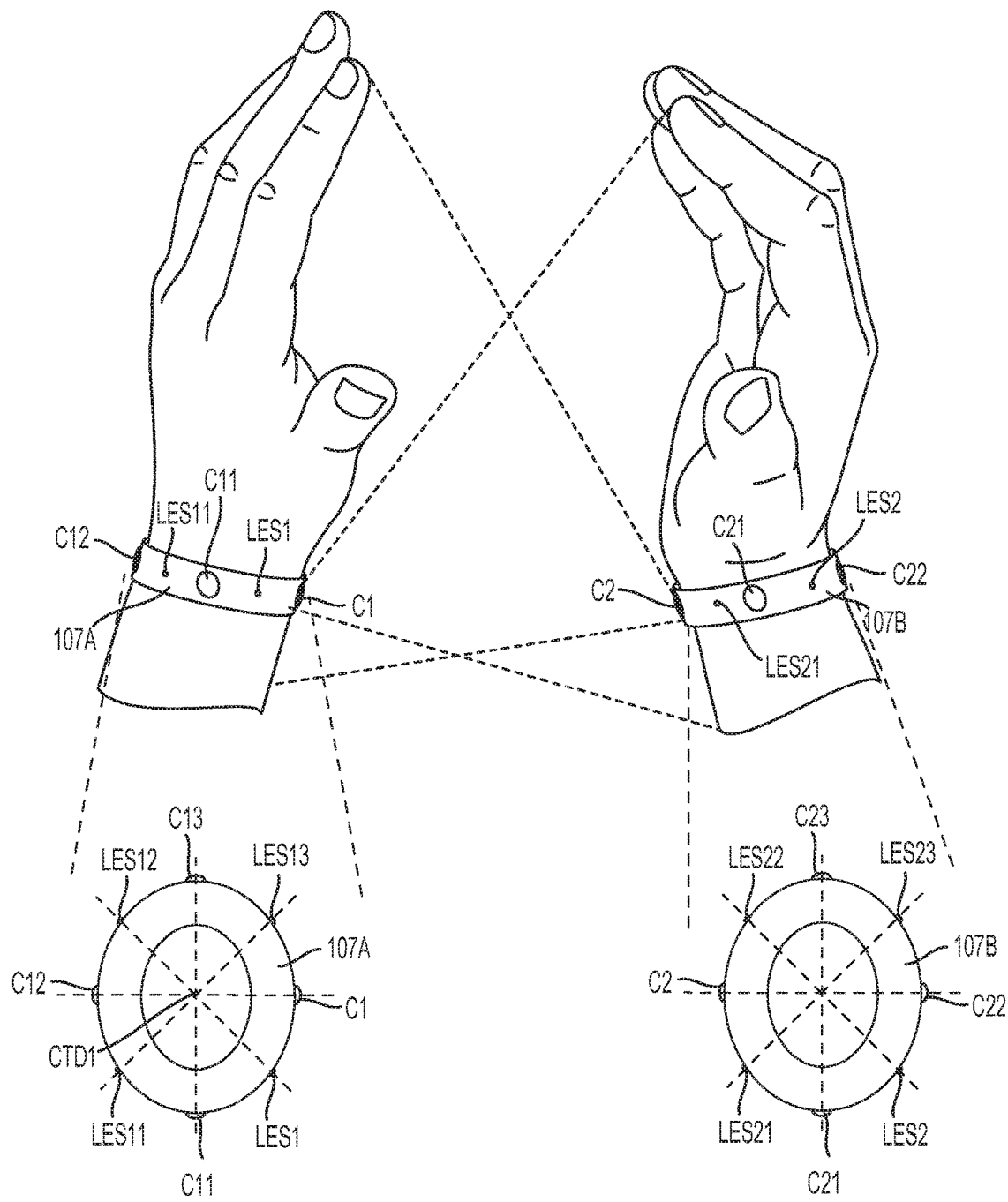
FIG. 1C is a diagram used to illustrate capturing of image data when wearable devices include multiple light emitters, in accordance with one embodiment of the present disclosure.

FIG. 1C is a diagram used to illustrate capturing of image data when wearable devices 107A and 107B include multiple light emitters. For example, the wearable device 107A includes light emitters LES1, LES11, LES12, and LES13 distributed on a surface of the wearable device 107A. The light emitters LES1, LES11, LES12, and LES13 are distributed on the same surface on which the cameras C1, C11, C12, and C13 are distributed. As another example, the wearable device 107B includes light emitters LES2, LES21, LES22, and LES23 distributed on a surface of the wearable device 107B. The light emitters LES2, LES21, LES22, and LES23 are distributed on the same surface on which the cameras C2, C21, C22, and C23 are distributed. The wearable device 107A is an example of the wearable device 102A (FIG. 1A) and the wearable device 107B is an example of the wearable device 102B (FIG. 1A). The wearable device 107A is attached to, e.g., worn on, surrounds, fitted to, etc., the left wrist of the user and the wearable device 107B is attached to the right wrist of the user.

Light emitters of a wearable device are equally or unequally spaced apart on a surface of the wearable device. For example, the light emitter LES1 forms an angle with respect to the light emitter LES13 and the light emitter LES13 forms the same angle with respect to the light emitter LES12. Also, in this example, the light emitter LES11 forms the same angle with respect to the light emitter LES12 and the light emitter LES1. As another example, the light emitter LES1 forms a first angle with respect to the light emitter LES13 and the light emitter LES13 forms a second angle with respect to the light emitter LES12. Also, in this example, the light emitter LES11 forms a third angle with respect to the light emitter LES12 and a fourth angle with respect to the light emitter LES1. In this example, the first angle is different from at least one of the second, third, and fourth angles.

Light emitters of a wearable device are interleaved, e.g., interspersed, etc., with cameras of the wearable device. For example, the light emitter LES1 is located between the cameras C1 and C11, the light emitter LES11 is located between the cameras C11 and C12, the light emitter LES12 is located between the cameras C12 and C13, and the light emitter LES13 is located between the cameras C13 and C1. Similarly, the camera C1 is located between the light emitters LES1 and LES13, the camera C11 is located between the light emitters LES1 and LES11, the camera C12 is located between the light emitters LES11 and LES12, and the camera C13 is located between the light emitters LES12 and LES13. As another example, the light emitter LES2 is located between the cameras C21 and C22, the light emitter LES21 is located between the cameras C21 and C2, the light emitter LES22 is located between the cameras C2 and C23, and the light emitter LES23 is located between the cameras C22 and C23. Similarly, the camera C2 is located between the light emitters LES21 and LES22, the camera C23 is located between the light emitters LES22 and LES23, the camera C22 is located between the light emitters LES23 and LES2, and the camera C21 is located between the light emitters LES2 and LES21.

Any of cameras C2, C21, C22, and C23 detect light emitted by one or more of the light emitters LES1, LES11, LES12, and LES13 that are within a field-of-view of the camera to capture image data that includes positions and orientations of the wearable device 107A. For example, when the light emitter LES1 is oriented with respect to the left wrist of the user to direct light towards the camera C2 while the camera C2 is oriented on the right wrist of the user to face the LES1, the camera C2 captures light emitted by the light emitter LES1. Similarly, any of cameras C1, C11, C12, and C13 detect light emitted by one or more of the light emitters LES2, LES21, LES22, and LES23 that are within a field-of-view of the camera to capture image data that includes positions and orientations of the wearable device 107B. For example, when the light emitter LES2 is oriented with respect to the right wrist of the user to direct light towards the camera C1 while the camera C1 is oriented on the left wrist of the user to face the light emitter LES2, the camera C1 captures light emitted by the light emitter LES2.

In one embodiment, an LES of a first wearable device is oriented with respect to a wrist of the user to direct light towards a camera of a second wearable device worn on another wrist of the user after the first wearable device turns, e.g., rotates clockwise, rotates counterclockwise, etc., with respect to the wrist on which the first wearable device is worn.

In an embodiment, an LES of a first wearable device is oriented with respect to the a first wrist of the user to direct light towards a camera of a second wearable device worn on a second wrist of the user after the first wrist and/or the second wrist is turned. In this embodiment, a position of the LES of the first wearable device with respect to the first wrist is constant is substantially constant and a position of the LES of the second wearable device with respect to the second wrist is constant or is substantially constant. A position of a wearable device with respect to a wrist is constant when the wearable device is fitted to the wrist.

In an embodiment, a light emitter and/or a camera are attached, e.g., integrated within, fitted within, glued to, soldered to, embedded within, etc., to a wearable device.

In one embodiment, a wearable device includes more or less than four light emitters.

In one embodiment, a light emitter of a wearable device is constantly emitting light.

In one embodiment, a light emitter of a wearable device is emitting light at a frequency, e.g., is strobing, is pulsing, is flashing, etc. For example, light emitters of a wearable device emit light in a round-robin fashion. To illustrate, the light emitter LES1 pulses once to emit light first, the light emitter LES13 then pulses once to emit light second, the light emitter LES12 then pulses once to emit light third, the light emitter LES11 pulses once to emit light fourth, and the light emitter LES1 pulses once to emit light to continue the round-robin fashion, e.g., a counterclockwise fashion, etc., of light emission. In this illustration, when a light emitter of the wearable device 107A is turned on, all remaining light emitters of the wearable device 107A are turned off. As another illustration, the light emitters LES1, LES11, LES12, and LES13 emit light in a clock-wise round-robin fashion.

In an embodiment, a light emitter of a wearable device emits light of a different color than another light emitter of the wearable device. For example, the light emitter LES1 emits light of a blue color, the light emitter LES11 emits light of a green color, the light emitter LES12 emits light of a red color, and the light emitter LES13 emits light of a white color. Moreover, in this embodiment, the wearable device is fitted to a hand of the user so as to not be disoriented during movement of the hand. For example, the light emitter LES13 is positioned to be on a ventral side of the left hand of the user, the light emitter LES11 is positioned to be on a dorsal side of the left hand, the light emitter LES1 is positioned to be on a first lateral side of the left hand, and the light emitter LES12 is positioned to be on a second lateral side of the left hand. The difference in colors facilitates an identification of an orientation of a hand of the user on which a wearable device emitting the different colors is worn. For example, a game processor of a game console determines from image data captured by a camera that a hand of the user is oriented so that a ventral side of the hand faces the camera. The image data includes a white color of light that is emitted by the light emitter LES13. As another example, a game processor of a game console determines from image data captured by a camera that a hand of the user is oriented so that a dorsal side of the hand faces the camera. The image data includes a green color of light that is emitted by the light emitter LES11.

In one embodiment, a device, e.g., a light emitter, a camera, is positioned on a side, e.g., dorsal side, lateral side, ventral side, etc., of an arm when the device is located over or under the side or to one side of the side and also is adjacent to the side of the arm. For example, a light emitter is located on a dorsal side of a wrist that is turned to be upside-down when the light emitter is located under the dorsal side and is located adjacent to the dorsal side. As another example, a light emitter is located on a dorsal side of a wrist that is turned to a lateral-side-up position when the light emitter is located to a side of the dorsal side and is located adjacent to the dorsal side.

In an embodiment, some light emitters of a wearable device are constantly emitting light and the remaining light emitters of the wearable device are emitting light at a frequency.

In one embodiment, the wearable devices 107A and 107B exchange synchronization information. For example, the wearable device 107A includes a processor that controls a frame rate with which one or more cameras of the wearable device 107A captures images and sends the frame rate via a communication device of the wearable device 107A to a communication device of the wearable device 107B using a wired or a wireless communication protocol. A processor of the wearable device 107B receives the frame rate and controls one or more cameras of the wearable device 107B to achieve the frame rate. As another example, a processor of the wearable device 107A controls a frequency of emission of light by the light emitters of the wearable device 107A. A communication device of the wearable device 107A is coupled to the processor and sends the frequency to a communication device of the wearable device 107B using a wired or a wireless communication protocol. Upon receiving the frequency, a processor of the wearable device 107B controls light emitters of the wearable device 107B to emit light at the frequency.

Figure 2A:
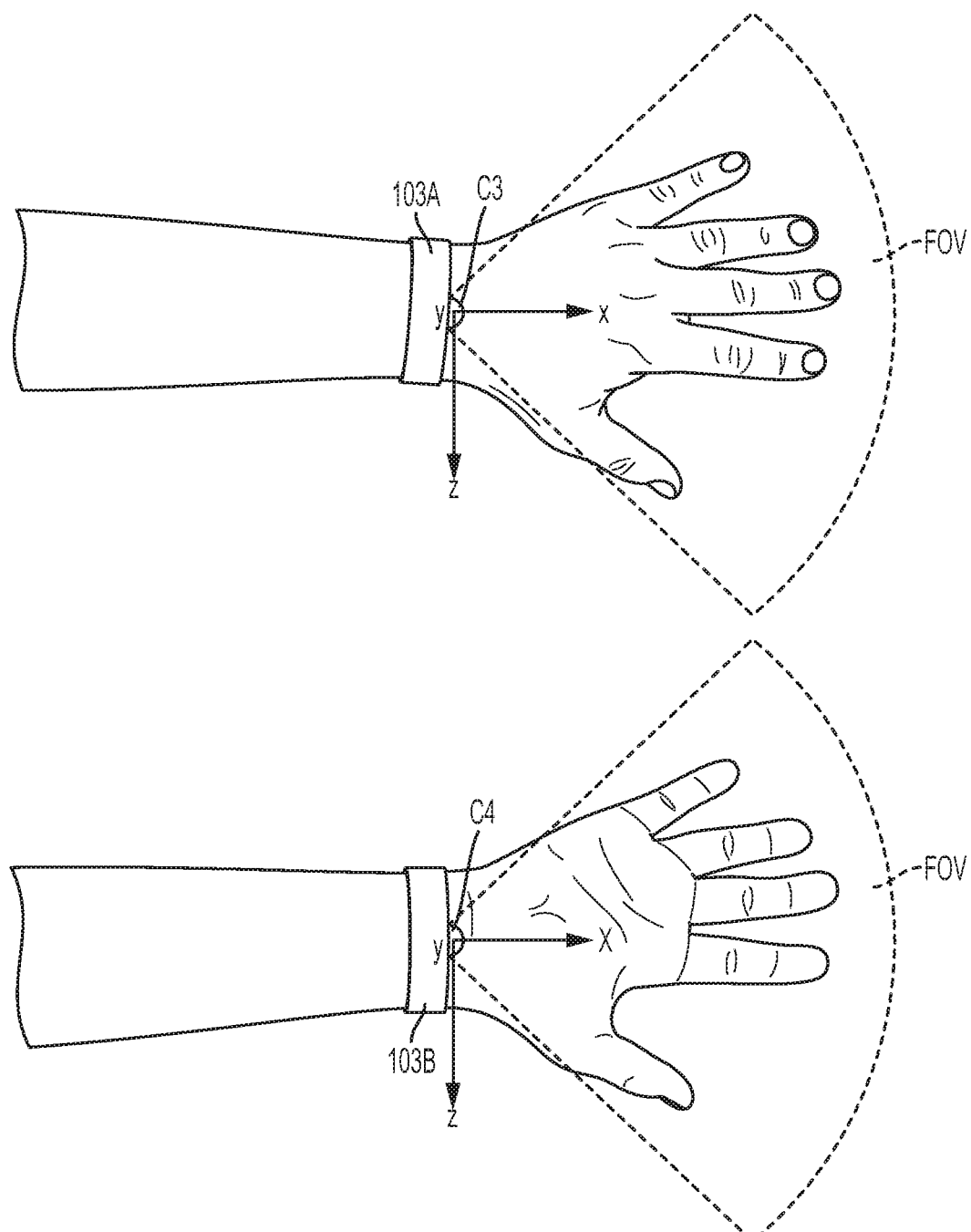
FIG. 2A is a diagram of a camera within a wearable device, in accordance with one embodiment of the present disclosure.

FIG. 2A is a diagram of an embodiment of a camera C3 within a wearable device 103A to illustrate capture of image data of a dorsal side or a ventral side of a hand of the user. The camera C3 is attached to, e.g., soldered to, glued to, etc., an edge of the wearable device 103A to obtain a view of a dorsal portion of a hand of the user. Moreover, in FIG. 2A, another camera C4 within the wearable device 103B is attached to an edge of the wearable device 103B to obtain a view of a bottom, e.g., ventral portion, palm, etc., of the hand of the user.

It should be noted that the camera C3 has a field-of-view (FOV) to facilitate capturing image data of an item, e.g., the left hand of the user, fingers of the left hand of the user, finger joints of the left hand, dorsal part of the left hand of the user, etc. The image data captured by the camera C3 is used to determine a position and/or orientation of an item from a reference point, e.g., an origin (0, 0, 0), etc., of the xyz co-ordinate system and the reference point is on the camera C3. Similarly, the camera C4 has an FOV to facilitate capturing image data of an item, e.g., the right hand of the user, fingers of the right hand of the user, finger joints of fingers of the right hand, palm of the right hand of the user, etc. The image data captured by the camera C4 is used to determine a position and/or orientation of an item from a reference point, e.g., an origin (0, 0, 0), etc., of the xyz co-ordinate system and the reference point is located on the camera C4.

Figure 2B:
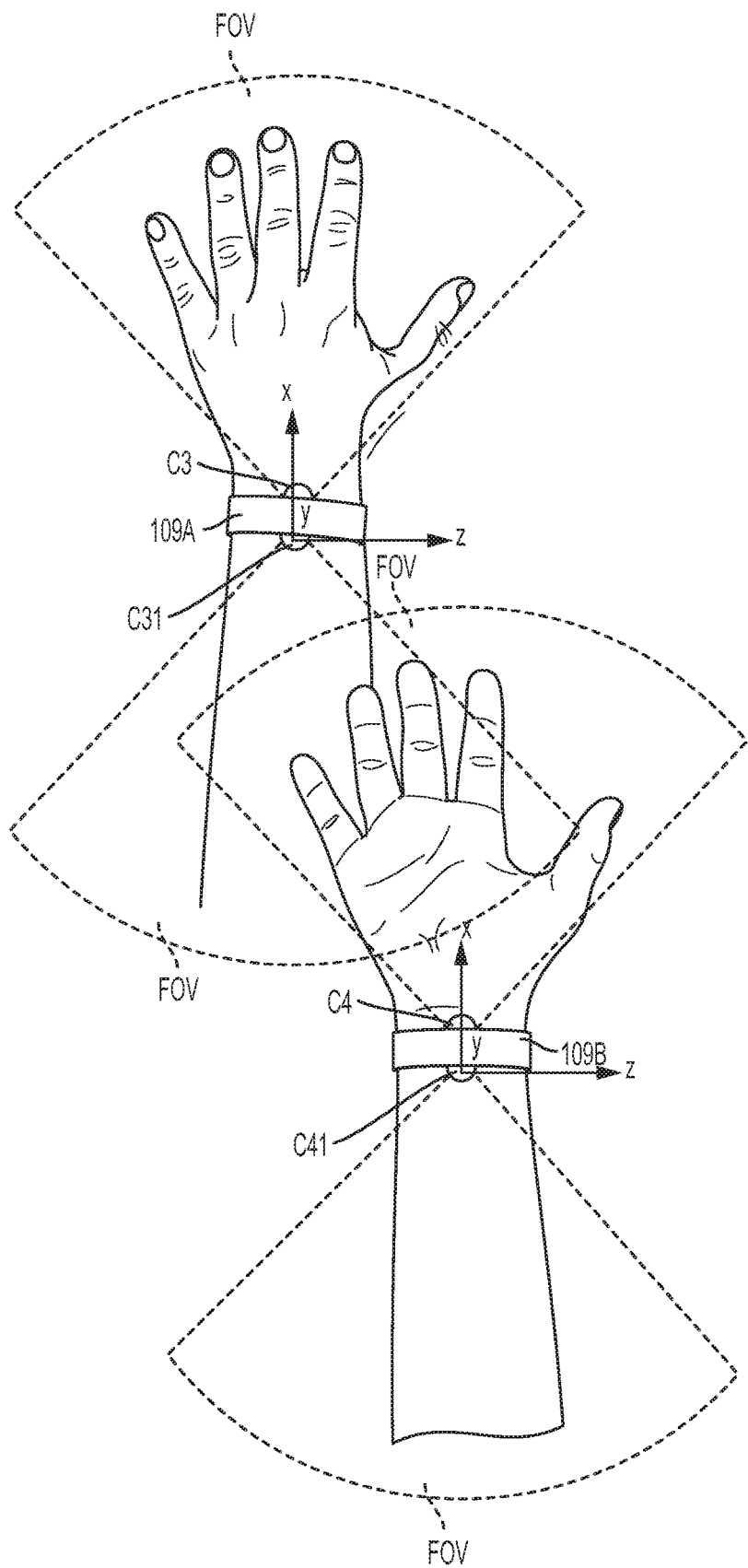
FIG. 2B is a diagram of wearable devices to illustrate cameras that capture image data when one hand is behind the other hand of the user, in accordance with one embodiment of the present disclosure.

FIG. 2B is a diagram of an embodiment of wearable devices 109A and 109B to illustrate cameras C31 and C41 that capture image data when one hand is behind the other hand of a user. For example, a field-of-view of the camera C31 is behind the left hand of the user to capture image data of the right hand when the right hand is behind the left hand. As another example, a field-of-view of the camera C41 is behind the right hand of the user to capture image data of the left hand when the left hand is behind the right hand. It should be noted that the camera C31 is located on a dorsal side of the left hand of the user and the camera C41 is located on a ventral side of the right hand of the user. The wearable device 109A is an example of the wearable device 103A (FIG. 2A) and the wearable device 109B is an example of the wearable device 103B (FIG. 2A).

It should be noted that the camera C31 is located on an edge of the wearable device 109A that is opposite to an edge on which the camera C3 is located. For example, the camera C3 is located on a front edge of the wearable device 109A and the camera C31 is located on a back edge of the wearable device 109A. As another example, the camera C3 has a field-of-view in a direction opposite to a direction of field-of-view of the camera C31. Similarly, the camera C41 is located on an edge of the wearable device 109B that is opposite to an edge on which the camera C4 is located.

In one embodiment, the wearable device 109A includes any number of cameras located at edges of the wearable device 109A. For example, the wearable device 109A includes cameras that are located at the back edge of the wearable device 109A and that are adjacent to lateral sides of the left arm of the user. Similarly, the wearable device 109B includes any number of cameras located at edges of the wearable device 109B.

The image data captured by the camera C31 is used to determine a position and/or orientation of an item from a reference point, e.g., an origin (0, 0, 0), etc., of the xyz co-ordinate system and the reference point is located on the camera C31. Similarly, the image data captured by the camera C41 is used to determine a position and/or orientation of an item from a reference point, e.g., an origin (0, 0, 0), etc., of the xyz co-ordinate system and the reference point is located on the camera C41.

Figure 3:
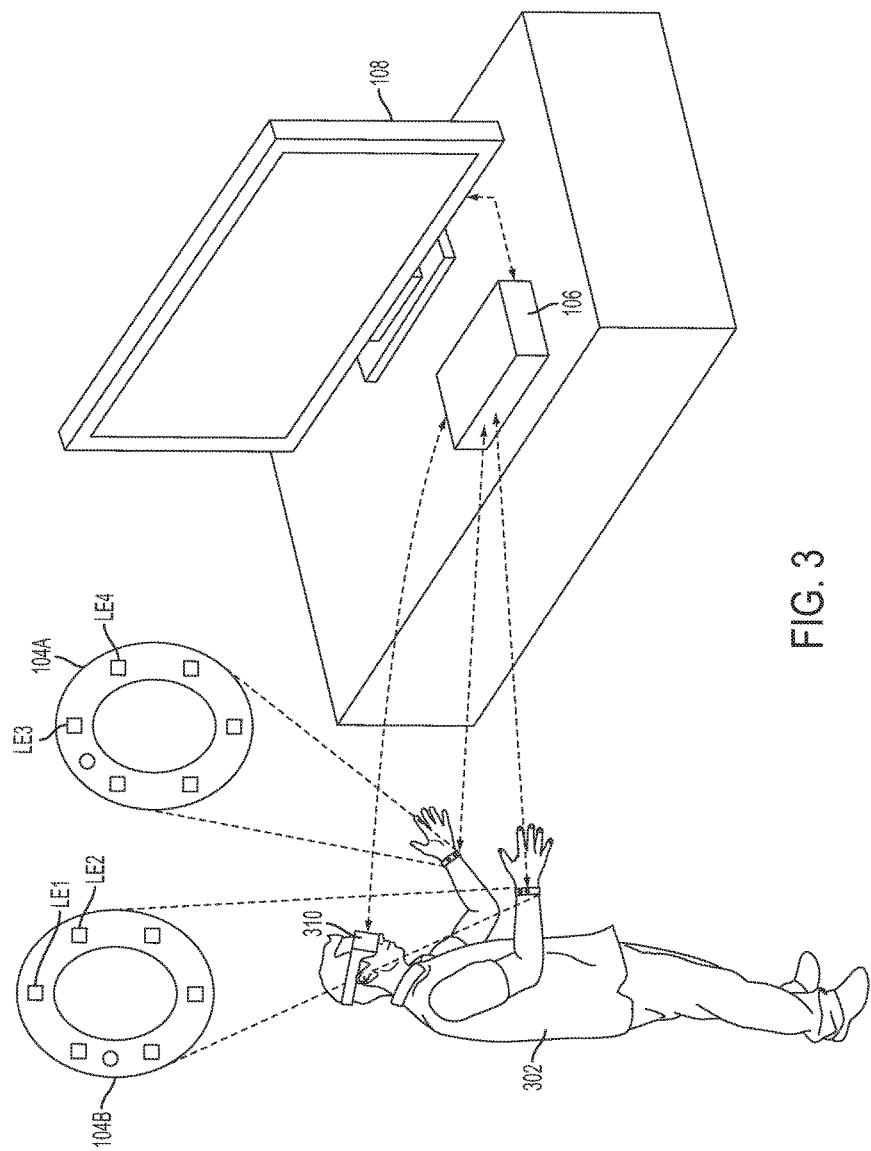
FIG. 3 is a diagram of a system to illustrate wearable devices that include cameras and emitters, in accordance with one embodiment of the present disclosure.

FIG. 3 is a diagram of an embodiment of a system to illustrate wearable devices 104A and 104B that include cameras and emitters. The wearable device 104A is an example of the wearable device 102A and the wearable device 102A is an example of the wearable device 104B.

Each wearable device 104A and 104B includes an arrangement of cameras and light emitters, e.g., light emitting diodes, infrared light emitter, incandescent lamps, gas discharging lamps, etc. For example, the wearable device 104B has an embedded light emitter LE1 and another embedded light emitter LE2. As another example, the wearable device 104A has an embedded light emitter LE3 and another embedded light emitter LE4. The wearable device 104A and 104B are connected via a wired or a wireless medium, e.g., a conductor, a cord, radio frequency signals, etc., to a game console 106.

A light emitter of a wearable device, e.g., the wearable device 104A, etc., emits light, e.g., visible light, infrared light, etc., towards a camera of another wearable device, the wearable device 104B, etc. A camera of the wearable device 104A generates image data based on the light that is reflected from the right hand of the user on which the wearable device 104B is worn. The image data is transferred via a medium to the game processor of the game console 106. Based on the image data, the game processor of the game console 106 determines a relative orientation and/or relative position of the right hand of a user 302 with respect to the left hand of the user 302 and uses the relative orientation and/or the relative position to determine a gesture made by the user 302. The light emitted from a light emitter of a wearable device that is worn on an arm of the user 302 facilitates identification by the game processor of the game console 106 of a position and/or orientation of the hand of the user 302. A state of a virtual environment that is displayed on a television 108 or on an HMD 310 is changed to correspond to the gesture and the change in the state is transferred from the game console 106 to the television 108 and/or to the HMD 310. A processor of the television 108 renders a virtual environment on a display screen of the television and/or a processor of the HMD 310 renders the virtual environment on a display screen of the HMD 310 based on the change in the game state.

In various embodiments, image data generated by a camera is transferred via a medium to the HMD 310 or the game console 106. Based on the image data, the processor of the HMD 310 or the game processor of the game console 106 determines a relative orientation and/or relative position of the left hand of the user 302 with respect to a camera on the right hand of the user and uses the relative orientation and/or the relative position to determine a gesture made by the user 302. The gesture is used by the game processor of the processor of the HMD 310 to identify a state of a virtual object. The state of the virtual object is communicated from the game console 106 to the HMD 310 via a wired or a wireless medium. The state of the virtual object is used to change a change of the virtual object that is displayed on the HMD.

In one embodiment, a wearable device includes any number of light emitters.

In an embodiment, a light emitter is an example of a marker.

Figure 4:
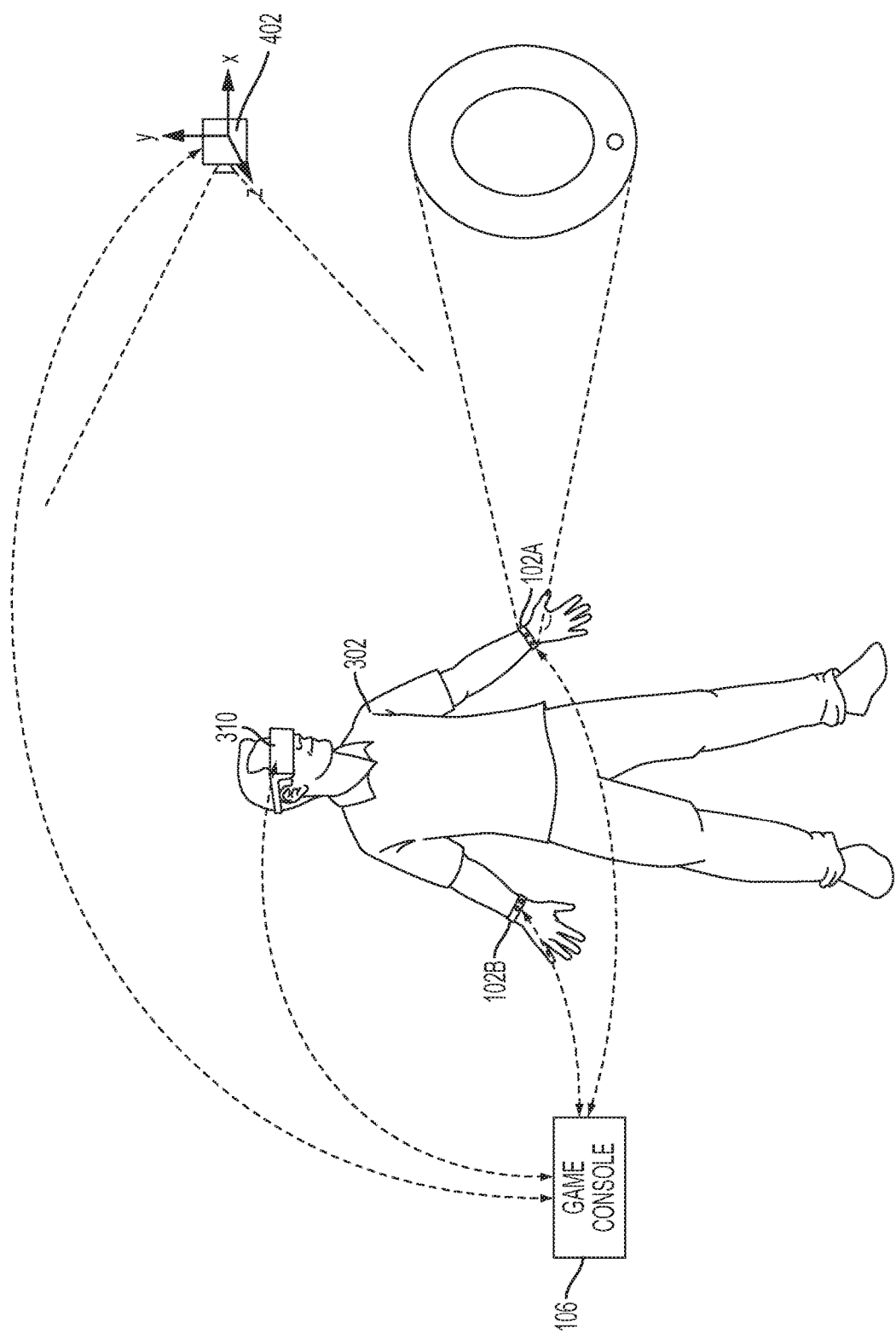
FIG. 4 is a diagram of a system in which a wearable device communicates with a computer, which further communicates with an HMD, in accordance with one embodiment of the present disclosure.

FIG. 4 is a diagram of an embodiment of a system in which a wearable device communicates with the game console 106, which further communicates with the HMD 310. Each wearable device 102A and 102B is connected via a medium, e.g., an Ethernet medium, a Wi-Fi medium, a wireless connection, a wired connection, a Bluetooth connection, a universal serial bus (USB) connection, etc., to the game console 106. Image data of the right hand is transferred from the wearable device 102A via a medium to the game console 106 and image of the left hand is transferred from the wearable device 102B via a medium to the game console 106. The game console 106 includes the game processor that processes the image data to determine positions and/or orientations of the hands of the user 302 with respect to each other. The positions and/or the orientations are used to identify a gesture and a manner in which the gesture affects a state of a virtual object in a virtual environment, e.g., video conferencing environment, game environment, augmented reality image, virtual reality image, etc. Data regarding the state is sent to the HMD 310 for display of a virtual object having the state on a display screen of the HMD 310.

In various embodiments, a camera 402 views the HMD 310 and the wearable devices 102A and 102B to generate image data of the HMD 310 and the wearable devices 102A and 102B. The image data is provided to the game console 106 for determining the positions and/or orientations of the hands of the user 302 and for determining a position and/or an orientation of the HMD 310. The image data that includes positions and the orientations of the hands of the user 302 and that includes the position and/or orientation of the HMD 310 is sent via a communication device of the camera 402 and a communication device of the game console 106 to the game processor of the game console 106. The game processor of the game console 106 processes the image data to obtain the positions and orientations of the hands of the user 302 and to obtain the position and orientation of the HMD 310. The game processor identifies from the positions and orientations of the hands a gesture performed by the user 302, and further identifies from the gesture a state of a virtual object. Moreover, the game processor identifies from the position and orientation of the HMD 310 and the positions and orientations of the hands of the user 302, relative positions and relative orientations between the hands of the user 302 and the HMD 310. The relative positions and the relative orientations are used by the game processor to identify a state of a virtual object. Data regarding the state of the virtual object is sent by the game processor via a communication device of the game console 106 and a communication device of the HMD 310 to a processor of the HMD 310. The processor of the HMD 310 displays the virtual object having a state on a display screen of the HMD 310.

It should be noted that image data generated by the camera 402 is from a reference point, e.g., origin (0, 0, 0), etc., of the xyz co-ordinate system, and the reference point is located at a point on the camera 402, e.g., a point on a lens of the camera 402, etc.

In one embodiment, a position and orientation of an item of the user 302 determined from image data captured using the camera 402 is used by the game processor of the game console 106 to confirm or deny an accuracy of a position and orientation of the item determined from image data captured using a camera of a wearable device. For example, the game processor converts image data captured using the camera of the wearable device to be relative to the xyz co-ordinate system located at the camera 402 instead of being relative to the xyz co-ordinate system located at the camera of the wearable device. To illustrate, the game processor adds respective x, y, and z distances between the xyz co-ordinate system located at the camera 402 and the xyz co-ordinate system located at the camera of the wearable device to x, y, and z distances of the item as viewed by the camera of the wearable device to generate converted positions. As another illustration, the game processor adds angles formed between the respective x, y, and z axes of the xyz co-ordinate system located at the camera 402 and respective x, y, and z axes of the xyz co-ordinate system located at the camera of the wearable device to angles formed by respective axes of the item as viewed by the camera of the wearable device to generate converted orientations.

Upon determining that the converted position and converted orientation of the item of the user 302 determined from image data captured using the camera of the wearable device is accurate, the game processor 106 identifies from the position and orientation determined from the image data captured using the camera 402 or from the image data captured using the camera of a wearable device, a state of a virtual object. On the other hand, upon determining that the converted position and converted orientation of the item of the user 302 determined from image data captured using the camera of the wearable device is not accurate, the game processor of the game console 106 waits for additional image data from the wearable device and additional image data from the camera 402 to determine whether a converted position and converted orientation of an item of the user 302 determined from the additional image data captured by the wearable device is accurate compared to a position and orientation of the item determined from the additional image data captured by the camera 402.

In one embodiment, upon determining that the converted position and converted orientation of the item of the user 302 is not accurate, the game processor of the game console 104 identifies a state of a virtual object from a correspondence, e.g., mapping, association, link, etc., between the state and a position and orientation of the item determined from image data captured using the camera 402.

Figure 5:
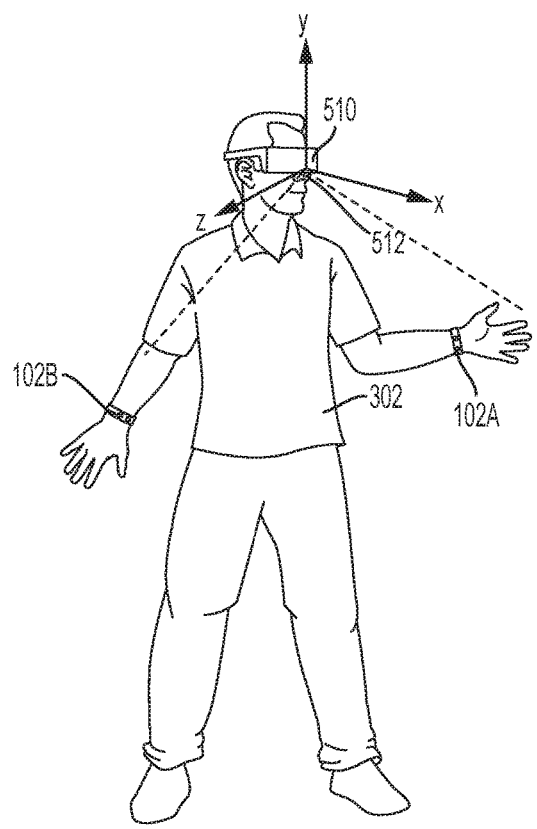
FIG. 5 is a diagram of an HMD that includes a camera, in accordance with one embodiment of the present disclosure.

FIG. 5 is a diagram of an embodiment of an HMD 510 that includes a camera 512. For example, the camera 512 is integrated, e.g., embedded into, fitted within, situated within, etc., a compartment within the HMD 510 so that a lens of the camera 512 can view a portion of the real-world environment that is in front of the camera 512. In an embodiment, the HMD 510 is an example of the HMD 310 (FIG. 4). The camera 512 of the HMD 510 generates image data of an item, e.g., the hands of the user 302 including the wrists of the user and/or fingers of the user, palms of the user 302, wearable devices 102A and 102B worn by the user 302, etc.

A communication device of the HMD 510 communicates, using a wired or a wireless communication protocol, the image data to the game processor of the game console 106. The game processor of the game console 106 determines a position and orientation of an item from a position and orientation of the item in the image data.

In an embodiment, a position and orientation of the item determined from image data captured using the camera 512 of the HMD 510 is used to confirm or deny an accuracy of a position and orientation of the item determined from image data captured using a camera of a wearable device. For example, upon determining that a converted position of an item that is determined from image data received from a camera of the wearable device 102A is within a pre-determined distance, e.g., (x, y, z) co-ordinate, etc., of a position of the item that is determined from image data received from the camera 512 of the HMD 510, the game processor of the game console 106 confirms an accuracy of the position of the item determined from the image data captured using the camera of the wearable device 102A. As another example, upon determining that a converted orientation of an item that is determined from image data received from a camera of the wearable device 102A is within pre-determined ranges, e.g., an angle with respect to the x-axis, an angle with respect to the y-axis, and an angle with respect to the z-axis, etc., of orientation of the item that is determined from image data received from the camera 512 of the HMD 510, the game processor of the game console 106 confirms an accuracy of the orientation of the item determined from the image data captured using the camera of the wearable device 102A. As another example, upon determining that a converted position of an item determined from image data received from a camera of the wearable device 102A is not within a pre-determined distance, e.g., (x, y, z) co-ordinate, etc., of a position of the item that is determined from image data received from the camera 512 of the HMD 510, the game processor of the game console 106 determines that the position of the item determined from the image data captured using the camera of the wearable device 102A is inaccurate. As another example, upon determining that a converted orientation of an item that is determined from image data received from a camera of the wearable device 102A is not within a pre-determined range, e.g., an angle with respect to the x-axis, an angle with respect to the y-axis, or an angle with respect to the z-axis, etc., of orientation of the item that is determined from image data received from the camera 512 of the HMD 510, the game processor of the game console 106 determines that the orientation of the item determined from the image data captured using the camera of the wearable device 102A is not accurate.

It should be noted that a converted position and a converted orientation is determined from image data captured using a camera of a wearable device in a manner similar to that described above. For example, the game processor converts image data captured using the camera of the wearable device to be relative to the xyz co-ordinate system located at the camera 512 instead of being relative to the xyz co-ordinate system located at the camera of the wearable device. To illustrate, the game processor adds respective x, y, and z distances between the xyz co-ordinate system located at the camera 512 and the xyz co-ordinate system located at the camera of the wearable device to x, y, and z distances of the item as viewed by the camera of the wearable device to generate converted positions. As another illustration, the game processor adds angles formed between the respective x, y, and z axes of the xyz co-ordinate system located at the camera 512 and respective x, y, and z axes of the xyz co-ordinate system located at the camera of the wearable device to angles formed by respective axes of the item as viewed by the camera of the wearable device to generate converted orientations.

Upon confirming the accuracy, the game processor of the game console 106 identifies from the position and/or orientation of an item determined from image data captured using the HMD 510 or using a camera of a wearable device data regarding a state of a virtual object, e.g., a virtual football, a virtual vehicle, a virtual weapon, a virtual tree, etc., to be displayed on a display screen of the HMD 510. The game processor sends via a communication device of the game console 106 and a communication device of the HMD 510, data regarding the state of a virtual object to the HMD 510. The processor of the HMD 510 receives the data regarding the state of the virtual object and renders the data to display the virtual object on a display screen of the HMD 510.

Upon determining that a position and/or orientation of the item determined from the image data captured using the camera of the wearable device 102A is not accurate, the game processor of the game processor 106 waits until the position and/or orientation is determined to be accurate from additional image data that is captured using a camera of a wearable device and from additional image data that is captured using the camera 512 of the HMD 510.

In one embodiment, upon determining that a position and/or orientation of the item determined from the image data captured using the camera of the wearable device 102A is not accurate, instead of using a position and/or orientation of an item determined from image data captured using a camera of a wearable device, the game processor of the game console 106 uses a position and/or orientation of an item determined from image data captured using the camera 512 of the HMD 510 to identify data regarding a state of a virtual object. The data regarding identified state is provided to the HMD 510 to display a virtual object having the state on the HMD 510.

In one embodiment, a game processor applies a statistical calculation, e.g., calculating average value, etc., to a position determined from converted image data that is generated from image data captured using a camera of a wearable device and a position determined from image data captured using another camera, e.g., a camera of another wearable device, a camera of an HMD, a camera of a television, an independently-located camera, a camera of a game console, etc. The converted image data is generated by the game processor by converting image data received from the camera of the wearable device to be positioned with respect to the other camera in a manner described herein. The statistical calculation is performed to generate a statistical value of a position and the statistical value is used by the game processor to identify a state of a virtual object.

In an embodiment, a game processor applies a statistical calculation, e.g., calculating average value, etc., to an orientation determined from converted image data that is generated from image data captured using a camera of a wearable device and an orientation determined from image data captured using another camera, e.g., a camera of a another wearable device, a camera of an HMD, a camera of a television, an independently-located camera, a camera of a game console, etc. The converted image data is generated by the game processor by converting image data received from the camera of the wearable device to be oriented with respect to the other camera in a manner described herein. The statistical calculation is performed to generate a statistical value of an orientation and the statistical value is used by the game processor to identify a state of a virtual object.

In an embodiment, the HMD 510 includes a light emitter, e.g., a visible light emitter, an infrared light emitter, etc., that emits light towards the wearable devices 102A and 102B. Light that is reflected from the wearable devices 102A and 102B is sensed by a sensor, e.g., visible light sensor, infrared light sensor, etc., of the HMD 510 to generate image data including positions and orientations of the hands of the user. The image data is communicated from a communication device of the HMD 510 to a communication device of the game console 106. The game processor parses the image data to obtain relative positions and relative orientations of the head of the user with respect to each hand of the user 302. It should be noted that in this embodiment, a position of the hand of an arm of the user 302 is the same as a position of a wearable device that is worn on the arm and an orientation of the arm is the same as an orientation of the wearable device.

It should be noted that image data generated by the camera 512 is from a reference point, e.g., origin (0, 0, 0), etc., of the xyz co-ordinate system, and the reference point is located at a point on the HMD 510, e.g., a point on a lens of the camera 512, etc.

In one embodiment, the camera 512 is an infrared camera that detects infrared light. Moreover, each wearable device 102A and 102B includes infrared light emitters. The infrared light emitters of the wearable device 102A emit light towards a hand on which the wearable device 102B is worn and the infrared light emitters of the wearable device 102B emit light towards a hand on which the wearable device 102A is worn. The light is reflected from hands of the user to be detected by the infrared camera. The camera 512 generates image data that includes infrared images.

In an embodiment, an infrared light emitter of a wearable device is directed towards the hand on which the wearable device is worn to emit light at the hand instead of being directed towards the other hand of a user.

In one embodiment, infrared light emitters of a wearable device worn on a first arm of a user are pulsed to emit light at a frequency and infrared light emitter of a wearable device worn on a second arm of the user are not pulsed, e.g., emit light continuously, etc. A game processor of a game console identifies from image data that includes images of pulsed infrared light emitters that the wearable device having the pulsed emitters provides a position and/or orientation of the first arm and identifies from image data that includes images of a non-pulsed, e.g., continuously emitting light, etc., that the wearable device having the non-pulsed emitters provide a position and/or orientation of the second arm.

In an embodiment, instead of distinguishing between pulsed and non-pulsed infrared light emitters, the game processor identifies whether a wearable device is attached to the left arm or the right arm from a frequency of emission of light by infrared light emitters. In this embodiment, the infrared light emitters of the wearable device attached to the first arm emit light at a different frequency than a frequency of emission of light by the infrared light emitter of the wearable device attached to the second arm.

In one embodiment, the HMD 510 includes any number of cameras, e.g., one camera for detecting infrared light, another camera for detecting visible light, all cameras detecting the same type of light, etc.

In an embodiment, a game console or a television includes any number of cameras, e.g., one camera for detecting infrared light, another camera for detecting visible light, all cameras detecting the same type of light, etc.

In one embodiment, instead of one independently-located, any number of independently-located cameras is used. For example, one independently-located camera detects visible light and another independently located camera detects infrared light. As another example, both independently-located cameras detect the same type of light, e.g., light having the same wavelength, etc.

Figure 6:
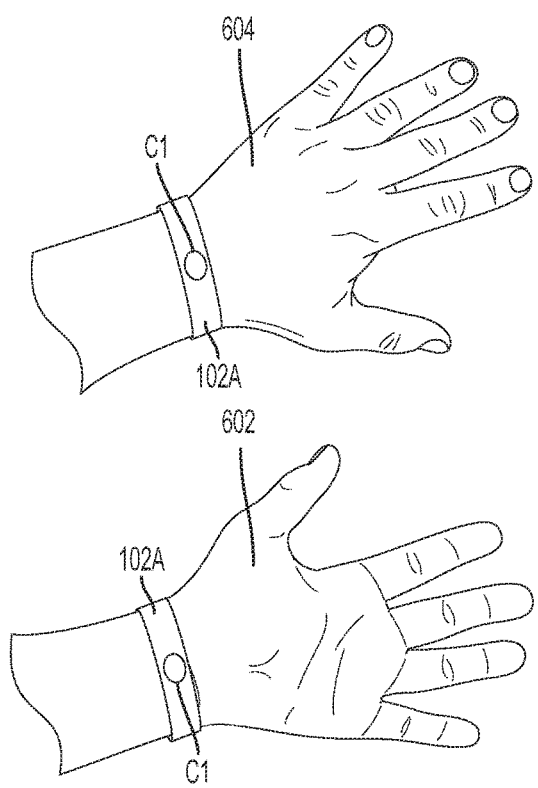
FIG. 6 is a diagram of a camera system to illustrate periodically turning off and on of a camera of a wearable device based on a position of the camera with respect to a wrist of a user, in accordance with one embodiment of the present disclosure.

FIG. 6 is a diagram of an embodiment of a camera system to illustrate periodically turning off and on of the camera C1 of the wearable device 102A based on a position of the camera C1 with respect to a side of a wrist of the user 302. For example, when the camera C1 of the wearable device 102A is located on a ventral side 602 of the left hand of the user 302, the camera C1 is turned on. A determination whether the camera C1 of the wearable device 102A is located on a ventral side of the left hand of the user 302 is made by the game processor of the game console 106 based on image data that is captured by the camera C2 of the wearable device 102B, which is worn on the right wrist of the user 302. Upon determining that the camera C1 is adjacent to the ventral side of the left hand of the user 302, the game processor sends a signal via a communication device of the game console 106 and a communication device of the wearable device 102A to a switch, e.g., a transistor, a group of transistors, a toggle switch, etc., of the wearable device 102A. The switch connects a power supply, e.g., a battery, etc., of the wearable device 102A to the camera C1. The signal is used to close the switch to facilitate provision of power from the power supply to the camera of the wearable device 102A to facilitate capturing images of an item.

As another example, when the camera C1 of the wearable device 102A is located on a non-viewing side of the left hand of the user 302, e.g., on a dorsal side 604 of the left hand of the user 302, on a lateral side of the left hand, etc., so as to not have a field-of-view of the right hand of the user 302, the camera C1 is turned off. To illustrate, the camera C1 is located on a viewing side of the left hand when the camera C1 is located on a ventral side of the left hand of the user 302, as illustrated in FIG. 1A. A determination whether the camera C1 of the wearable device 102A is located on the non-viewing side of the left hand of the user 302 is made by the game processor of the game console 106 based on image data that is captured by the camera C2 of the wearable device 102B. Upon determining that the camera C1 is located on the non-viewing side of the left hand of the user 302, the game processor sends a signal via a communication device of the game console 106 and a communication device of the wearable device 102A to the switch of the wearable device 102A to turn off, e.g., open, etc., the switch. The signal is used to open the switch to facilitate removing a supply of power from the power supply to the camera of the wearable device 102A to prevent the camera C1 from capturing images of an item.

Similarly, a camera of the wearable device 102B is turned off or on by determining whether the camera is located on a dorsal side or a ventral side of the right arm of the user 302.

In one embodiment, instead of using a camera of a wearable device to determine whether a camera of the other wearable device, e.g., wearable device worn on the other arm of the user 302, etc., is on a dorsal or a ventral side of a wrist of the user 302, another camera, e.g., a camera of the game console 106, the camera 402 (FIG. 4), a camera of the HMD 510 (FIG. 5), a camera of a television, etc., is used to capture image data of position and orientation of a camera of a wearable device with respect to a wrist of the user 302.

In an embodiment, inertial sensors of a wearable device worn on an arm of a user are used to turn off a camera of the wearable device when the wearable device is at a pre-determined position and/or pre-determined orientation. In this example, another camera, e.g., a camera of the game console 106, the camera 402 (FIG. 4), a camera of the HMD 510 (FIG. 5), a camera of a television, etc., is used to capture image data of a position and orientation of another wearable device worn on another arm of the user.

In one embodiment, a power supply and a communication device of a wearable device are located within, e.g., embedded within, located inside, attached to, etc., the wearable device.

In an embodiment, a power supply of a wearable device stores and provides power to electrical components, e.g., a communication device, a light emitter, a camera, etc., of the wearable device.

FIG. 7A is a diagram of an embodiment of a wearable device 116 that includes a number of markers, e.g., a pattern code, or reflectors, or retroreflectors, or light emitting diodes, or quick response (QR) codes, or a combination thereof, etc. In an embodiment, the wearable device 116 is made of a reflective fabric or metal. The wearable device 116 is an example of the wearable device 102A or 102B (FIG. 1A). The markers indicate a position of the wearable device 116 to a camera, e.g., a camera of the game console 106, the camera 402 (FIG. 4), a camera of the HMD 510 (FIG. 5), a camera of a television, a camera of the other wearable device, which is worn on a wrist other than a wrist on which the wearable device 116 is worn, etc. Image data of the markers is generated by a camera and the image data is provided to the game processor of the game console or to the processor of the HMD to determine a position and orientation of an arm of the user 302 on which the wearable device 116 is worn with respect to a reference point of the xyz co-ordinate system. The reference point is located on the camera that captures the image data of the markers.

Another wearable device 118 includes a number of inertial sensors, e.g., IS1, IS2, IS3, etc., that sense movement of the wearable device 118. Examples of inertial sensors include a magnetometer, an accelerometer, a gyroscope, etc. The wearable device 118 is an example of the wearable device 102A or 102B (FIG. 1A). The inertial sensors generate signals indicating movement, e.g., acceleration, orientation with respect to the x, y, and z axis, position with respect to the x, y, and z axis, etc., of the wearable device 118 and provide the signals to the processor of the HMD or of the game console. The processor of the HMD or of the game console uses the position and orientation to identify data regarding a state of a virtual object.

In some embodiments, a wearable device includes markers, and/or cameras, and/or emitters, and/or inertial sensors.

FIG. 7B is a diagram to illustrate that a position of a marker M3 on a wearable device 702 is used to determine an orientation of the wearable device 702 with respect to an orientation of the wearable device 116. The game processor of the game console 106 determines from image data positions (y1, z1) and (y2, z2) of the marker M3 with respect to an origin of the xyz co-ordinate system. The origin of the xyz co-ordinate system is located at a camera that captures the image data of the marker M3. A position and orientation of the wearable device 116 does not change substantially or does not change with respect to a wrist on which the wearable device is worn.

The game processor of the game console 106 identifies the orientation of the wearable device 702 with respect to the wearable device 116 from a correspondence, e.g., link, relationship, mapping, etc., between the orientation of the wearable device 702 and a position of the wearable device 702. For example, when the position of the wearable device 702 is (y1, z1) with respect to the origin of the xyz co-ordinate system, the game processor identifies that an orientation of the wearable device 702 forms an angle A1 with respect to the z-axis. As another example, when the position of the wearable device 702 is (y2, z2) with respect to the origin of the xyz co-ordinate system, the game processor identifies that an orientation of the wearable device 702 forms an angle A2 with respect to the z-axis.

In one embodiment, an orientation of a wearable device is the same as an orientation of an arm on which the wearable device is worn. For example, the game processor identifies an orientation of an arm as an orientation of a wearable device that is worn on the arm.

Figure 8:
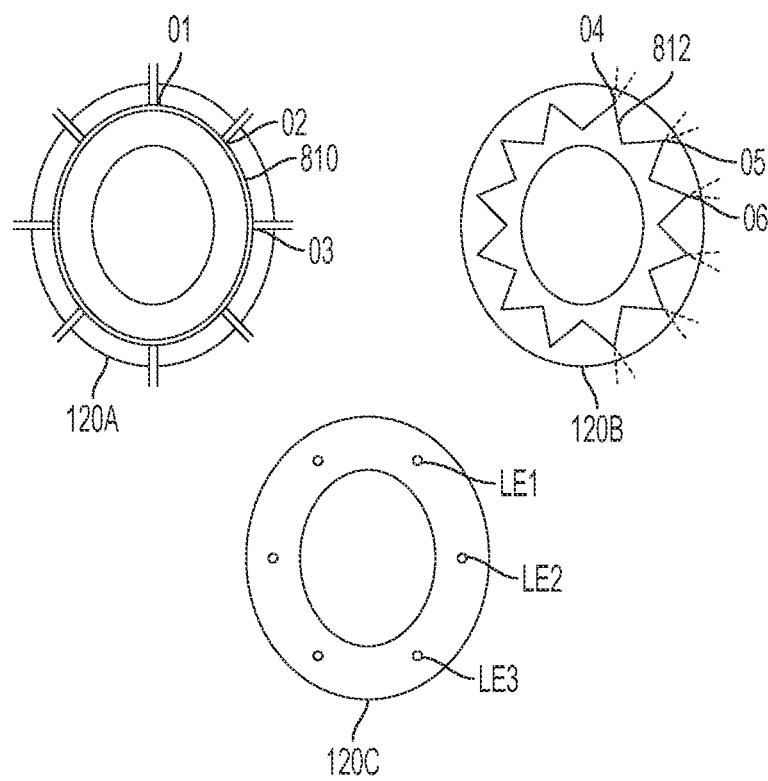
FIG. 8 is a diagram of multiple wearable devices to illustrate use of fiber optic cables and light emitters in wearable devices, in accordance with one embodiment of the present disclosure.

FIG. 8 is a diagram of embodiments of multiple wearable devices 120A, 120B, and 120C to illustrate use of fiber optic cables and light emitters in wearable devices. Each wearable device 120A, 120B, and 120C is an example of the wearable device 102A or 102B (FIG. 1A). The wearable device 120A includes a fiber optic cable 810 in a circular pattern to generate diffused fiber optics. For example, the fiber optic cable 810 is opened or torn or cut at various places, e.g., intervals, etc., to generate multiple openings, e.g., an opening O1, an opening O2, an opening O3, etc., to further diffuse light generated by a light emitter attached to, e.g., soldered to, glued to, etc., an end of the fiber optic cable. Each opening acts as a marker for a camera that captures image data of the wearable device 120A.

The wearable device 120B includes a fiber optic cable 812 in a star-shaped pattern to generate diffused fiber optics. At vertices of the star-shaped pattern, one or more openings, e.g., an opening O4, an opening O5, an opening O6, etc., are formed by tearing or cutting the fiber optic cable 812. Light that is emitted by a light emitter travels through the fiber optical cable and is emitted at each opening of the fiber optical cable 812. The light emitter is attached, e.g., glued to, soldered to, etc., to an end of the fiber optic cable 812. Each opening of the fiber optic cable 812 acts as a marker for facilitating a capture of image data of the wearable device 120B.

In an embodiment, a wearable device includes a fiber optic cable embedded therein. The fiber optic cable is made of a medium, e.g., a transparent medium, a translucent medium, etc., which transfers light that is emitted by a light source that is attached to the fiber optic cable. When light passes through the fiber optic cable, the cable illuminates and the illumination is captured by a camera, e.g., a camera of another wearable device, a camera of an HMD, a camera of a game console, an independently-located camera, camera of a television, etc.

The wearable device 120C includes light emitters, e.g., a light emitter LEE a light emitter LE2, a light emitter LE3, etc., to generate light that is emitted at various points, e.g., intervals, etc., along the wearable device 120C. Each light emitter acts as a marker to facilitate capture of image data by a camera. The light emitters are embedded within an outside surface of the wearable device 120C. The outside surface of the wearable device 120C is not adjacent to a wrist of the user 302 when the wearable device 120C is worn by the user 302.

In one embodiment, a wearable device includes any number of openings for emission of light or any number of light emitters.

In one embodiment, the fiber optic cable 810 or the fiber optic cable 812 has another shape, e.g. polygonal, oval, curved, etc.

It should be noted that in one embodiment, each wearable device 120A, 120B, and 120C is made of a transparent material, e.g., a transparent plastic, a transparent flexible material, etc., or a semi-transparent material to facilitate light emitted by a light emitter within the wearable device to emit light.

In an embodiment, a first pattern formed by light emitters of a first wearable device or formed by openings in a fiber optic cable located within the first wearable device is different than a second pattern formed by light emitters of a second wearable device or formed by openings in a fiber optic cable located within the second wearable device. For example, the first pattern is a star-shaped pattern and the second pattern is a circular-shaped pattern. The first wearable device is worn on the left arm of a user and the second wearable pattern is worn on the right arm of the user. The difference in the patterns facilitates a game processor of a game console to distinguish positions and/or orientations of the left hand from positions and/or orientations of the right hand. For example, in image data of an image that includes both the patterns, the game processor identifies a position of the left hand as being a position of the star-shaped pattern and identifies a position of the right hand as being a position of the circular-shaped pattern.

In one embodiment, a first color of light emitted by light emitters of a first wearable device or emitted through openings in a fiber optic cable of the first wearable device is different than a second color of light emitted by light emitters of a second wearable device or of light that is emitted through openings in a fiber optic cable of the second wearable device. For example, the first color is green and the second color is red. The first wearable device is worn on the left arm of a user and the second wearable pattern is worn on the right arm of the user. The difference in the colors facilitates a game processor of a game console to distinguish positions and/or orientations of the left hand from positions and/or orientations of the right hand. For example, in image data of an image that includes both the colors, the game processor identifies a position of the left hand as being a position of the green color and identifies a position of the right hand as being a position of the red color.

In one embodiment, a wearable device that is worn on one hand of the user includes one or more light emitters that emit light of a first wavelength, e.g., infrared light, etc., and another wearable device that is worn on another hand of the user includes one or more light emitters that emit light of a second wavelength, e.g., visible light, etc.

Figure 9:
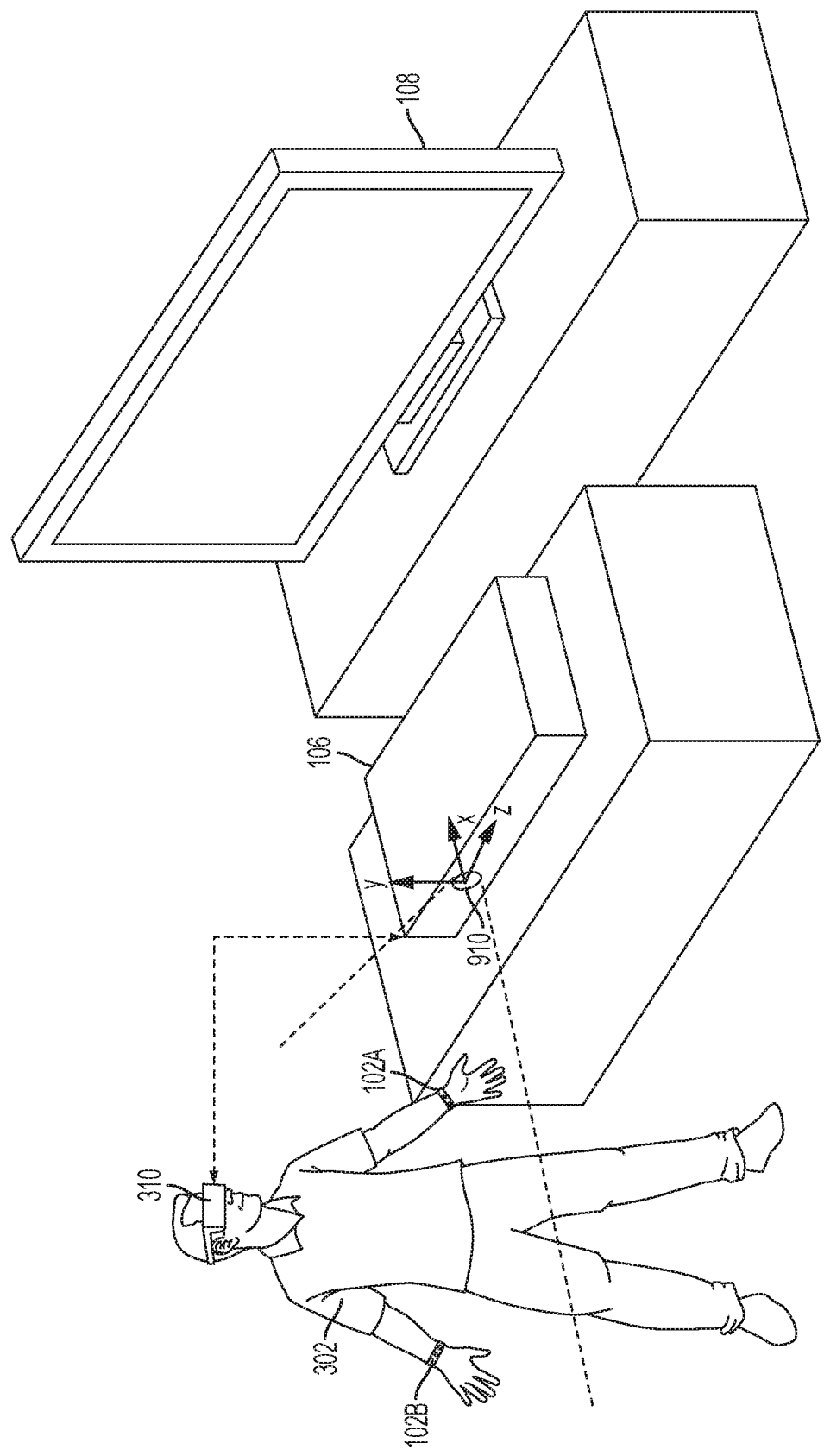
FIG. 9 is a diagram of a system for illustrating a number of cameras within a game console to determine a relative position and/or orientation of hands of a user, in accordance with one embodiment of the present disclosure.

FIG. 9 is a diagram of an embodiment of a system for illustrating a number of cameras, e.g., a camera 910, etc., within the game console 106 to determine a relative position and/or orientation of hands of the user with respect to each other. The camera 910 is integrated within, e.g., attached to, fitted within, etc., a compartment within the game console 106 so that a lens of the camera 910 has a view of the real-world environment in front of the game console 106. The camera 910 of the game console 106 generates image data of an item, e.g., the wearable devices 102A and 102B, fingers of hands of the user 302, hands of the user 302, palms of the user 302, etc., and the image data is provided by the camera 910 to the game processor of the game console 106. The game processor of the game console 106 determines a position and orientation of an item that is displayed in the image data with respect to a reference co-ordinate of the xyz co-ordinate system and the reference co-ordinate is located a location of the camera 910. The game processor further identifies data regarding a state, e.g., position, orientation, texture, color, shape, etc., of a virtual object from the position and orientation of an item, and provides data regarding the state to the HMD 310 for display on a display screen of the HMD 310.

The data regarding a state of a virtual object is sent via a medium, e.g., a wireless medium, a wired medium, etc., from the game processor of the game console 106 via a communication device of the game console 106 and a communication device of the HMD 310 to the processor of the HMD 310. The processor of the HMD 310 renders the data regarding a state of a virtual object to display the virtual object on a display screen of the HMD 310.

In an embodiment, a position and orientation of an item that is determined from image data captured using the camera 910 of the game console 106 is used to confirm or deny an accuracy of a position and orientation of an item that is determined from image data captured using a camera of a wearable device in a manner similar to that described above in which image data captured using the camera 512 (FIG. 5) of the HMD 510 (FIG. 5) is used to confirm or deny an accuracy of a position and orientation of the item determined from image data captured using the camera of the wearable device. Upon confirming the accuracy, the game processor of the game console 106 identifies from the position and/or orientation of an item determined from image data captured using the camera 910 of the game console 106 or using a camera of a wearable device data regarding a state of a virtual object, e.g., a virtual football, a virtual vehicle, a virtual weapon, a virtual tree, etc., to be displayed on a display screen of the HMD 310. The game processor sends via a communication device of the game console 106 and a communication device of the HMD 310, data regarding the state of a virtual object to the HMD 310 for display.

Upon determining that a position and/or orientation of the item determined from the image data captured using the camera of the wearable device 102A is not accurate, the game processor of the game console 106 waits until the position and/or orientation is determined to be accurate from additional image data that is captured using a camera of a wearable device and from additional image data that is captured using the camera 910 of the game console 106.

In one embodiment, upon determining that a position and/or orientation of the item determined from the image data captured using the camera of the wearable device 102A is not accurate, instead of using a position and/or orientation of an item determined from image data captured using a camera of a wearable device, the game processor of the game console 106 uses a position and/or orientation of an item determined from image data captured using the camera 910 of the game console 106 to identify data regarding a state of a virtual object. The data regarding identified state is provided to the HMD 310 to display a virtual object having the state on the HMD 310.

It should be noted that image data generated by the camera 910 is from a reference point, e.g., origin (0, 0, 0), etc., of the xyz co-ordinate system, and the reference point is located at a point on the camera 910 of the game console 106, e.g., a point on a lens of the camera 910, etc.

Figure 10:
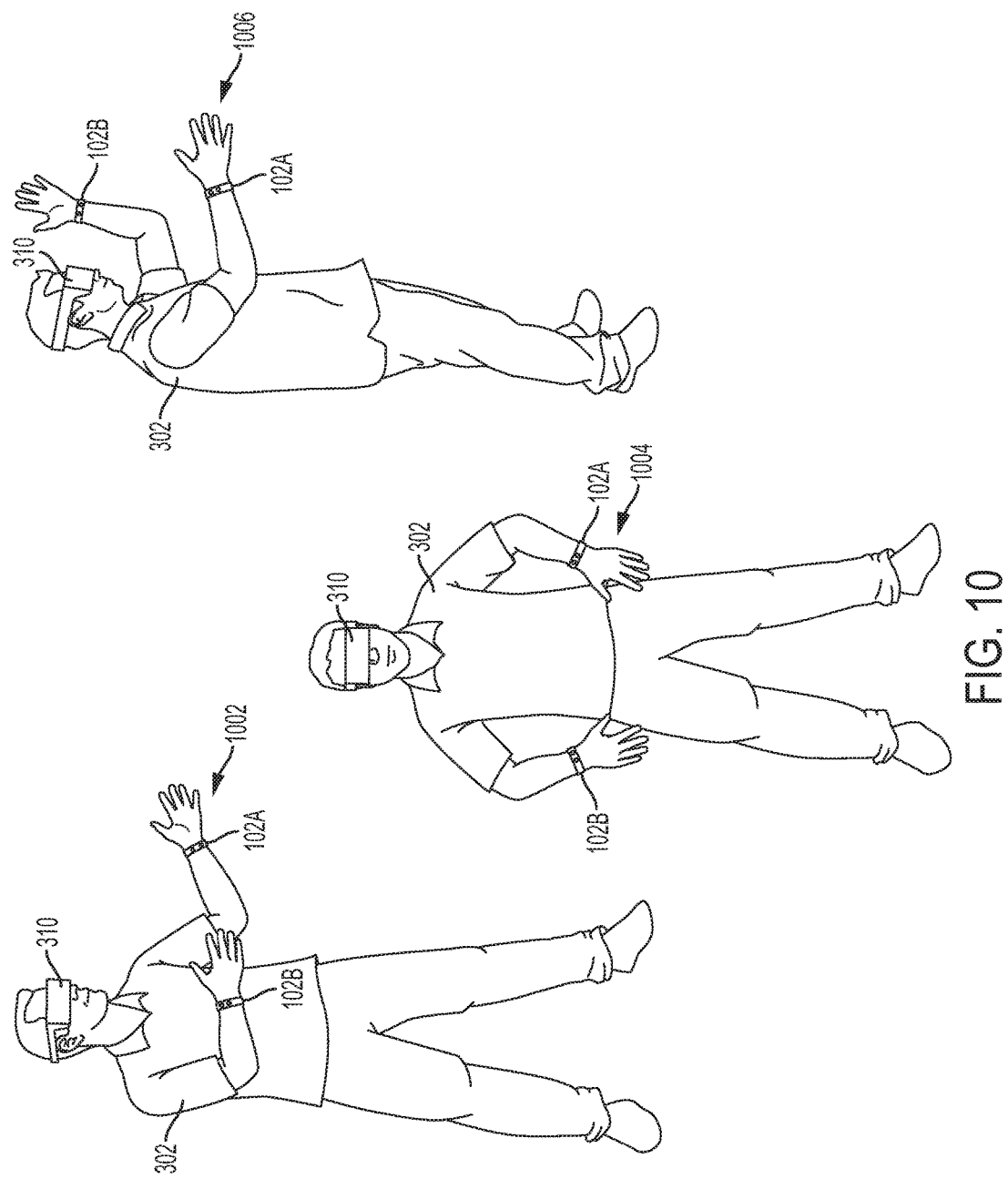
FIG. 10 is a diagram illustrating various gestures performed by the user while wearing wearable devices, in accordance with one embodiment of the present disclosure.

FIG. 10 is a diagram illustrating various gestures performed by the user 302 while wearing the wearable devices 102A and 102B. The gestures are those performed by a traffic cop. For example, one gesture 1002 performed using both hands of the user 302 indicates that virtual traffic, e.g., cars, trucks, rickshaws, bicycles, motorbikes, etc., travel in a direction pointed to by the hands of the user 302. The virtual traffic is displayed on a display screen of the HMD 310. As another example, another gesture 1004 also performed using both hands of the user 302 indicates that the user 302 is about to draw a virtual gun, which is displayed on a display screen of the HMD 310. As yet another example, a gesture 1006 performed using both hands of the user 302 indicates a block motion during a kung fu virtual game, which is displayed on a display screen of the HMD 310.

Figure 11:
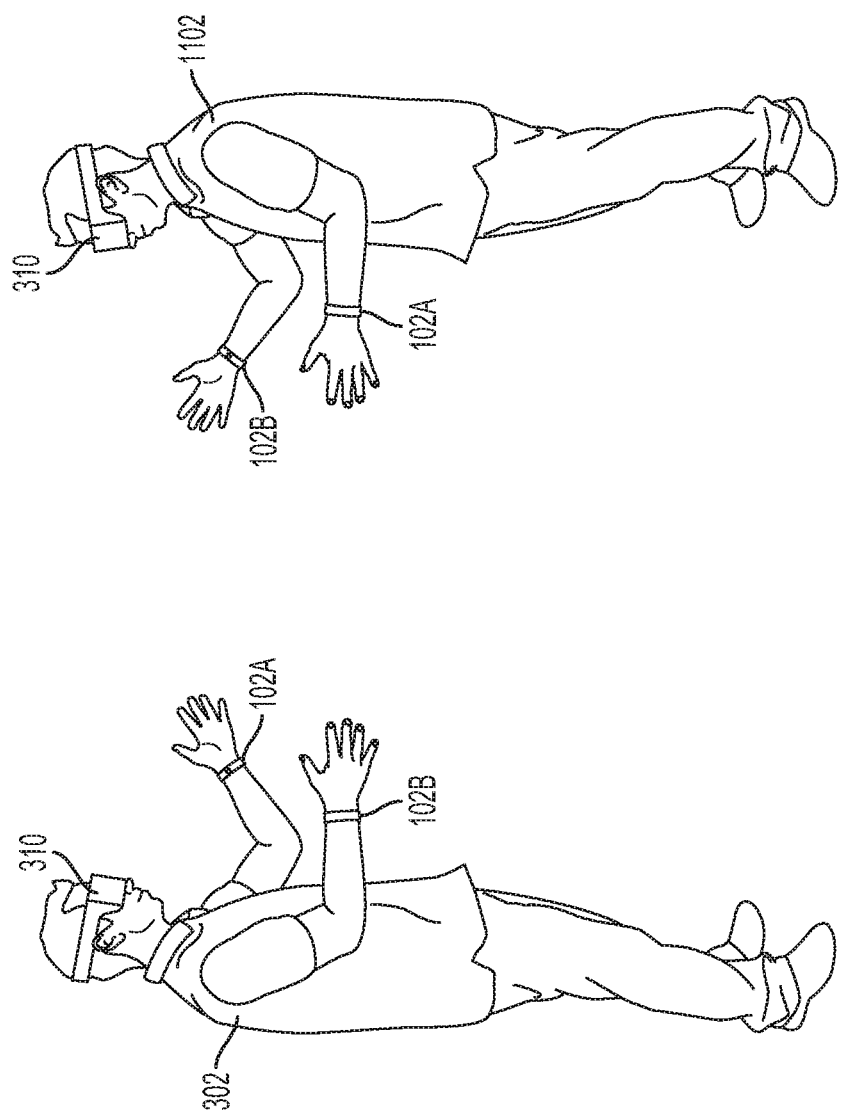
FIG. 11 is a diagram to illustrate two users wearing HMDs and wearable devices to play games with each other, in accordance with one embodiment of the present disclosure.

FIG. 11 is a diagram to illustrate two users wearing HMDs 112 and wearable devices 102A and 102B to play games with each other. For example, a virtual hand of the user 302 on the left is shown within a game in which a virtual hand of a user 1102 on the right is shown. As another example, a virtual head of the user 302 on the left is shown within a game in which a virtual head of the user 1102 on the right is shown.

In one embodiment, the user 302 views an avatar of the user 1102 in a virtual environment that is displayed on a display screen of the HMD 310 worn by the user 302. Moreover, the user 1102 views an avatar of the user 302 in the same virtual environment that is displayed on a display screen of the HMD 310 worn by the user 1102.

In an embodiment, the users 302 and 1102 are located at the same geographic location or are located remote from each other. For example, the user 310 is interacting with an avatar of the user 1102 while the user 310 is located at his house in Texas and the user 1102 is interacting with an avatar of the user 310 while the user 1102 is located at his house in California. As another example, both the users 310 and 1102 are located in a room and interacting with each other via a virtual environment that is displayed on HMDs 310 worn by the users 302 and 1102.

Figure 12:
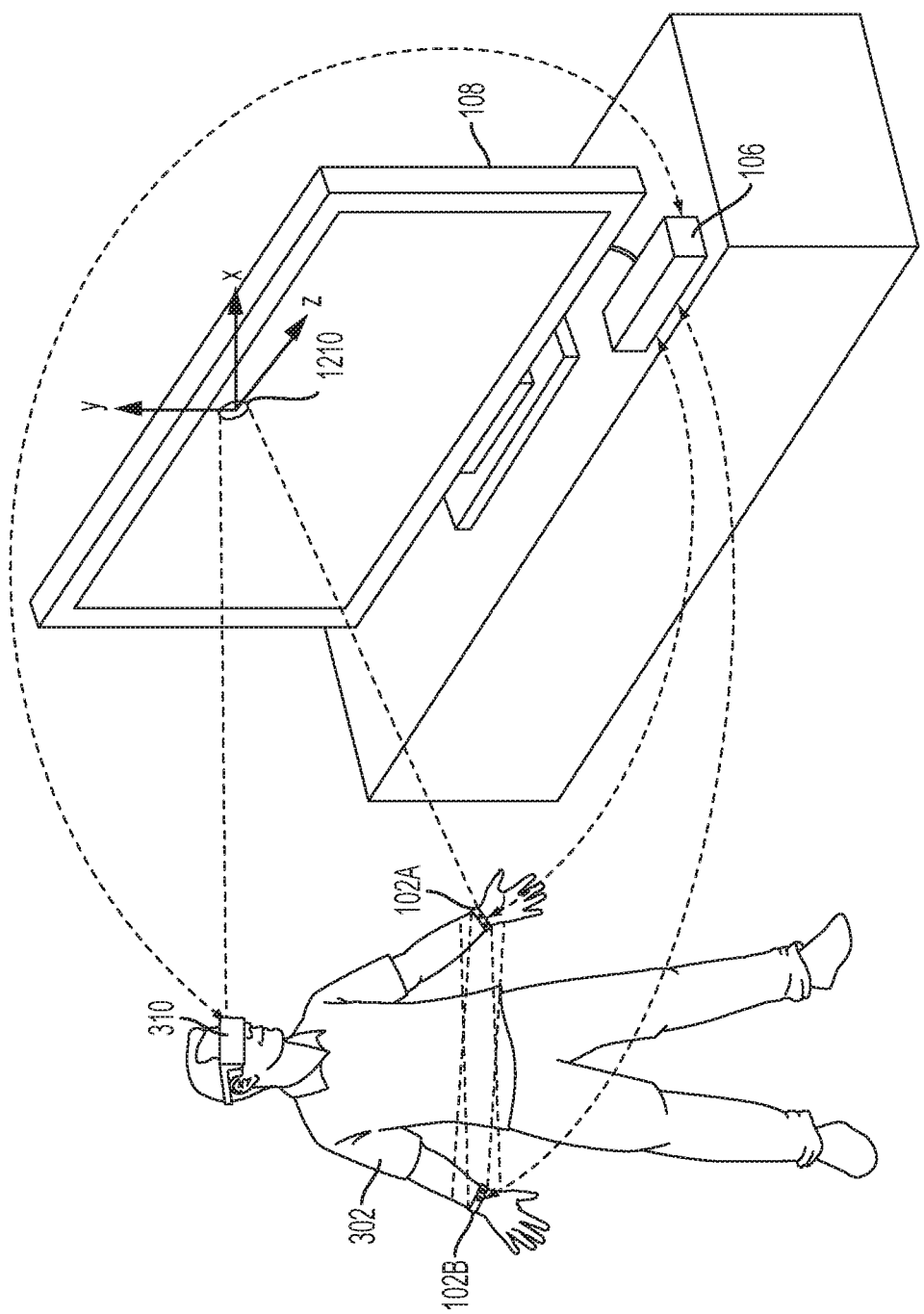
FIG. 12 is a diagram of a system in which a camera of a television is used to determine a position and/or orientation of an item with respect to an xyz co-ordinate system, in accordance with one embodiment of the present disclosure.

FIG. 12 is a diagram of an embodiment of a system in which a camera 1210 of the television 108 is used to determine a position and/or orientation of an item with respect to the xyz co-ordinate system. The camera 1210 of the television 108 generates image data of the head of the user and of an item, e.g., the wearable devices 102A and 102B worn by the user 302, hands of the user 302, fingers of the user 302, etc. The image data is sent from the camera 1210 to the game processor of the game console 106 using a wireless or a wired communication protocol. The game processor of the game console 106 determines a position and/or an orientation of the head of the user 302 with respect to a reference point of the xyz co-ordinate system and determines a position and/or orientation of an item associated with the user 302 with respect to the reference point.

The position and/or orientation of an item is used by the game processor of the game console 106 to identify data regarding a state of a virtual object to be displayed on the HMD 310. It should be noted that a virtual object corresponds to a position and/or orientation of an item. For example, a game memory device of the game console 106 stores a correspondence, e.g., an association, a mapping, a link, etc., between a virtual object and an item. The game processor of the game console 106 accesses the correspondence between the virtual object and the item, and is programmed to affect a state of the virtual object based on a position and/or orientation of the item, e.g., wearable device, fingers, hand, palm, foot, etc.

It should be noted that image data generated by the camera 1210 is from a reference point, e.g., origin (0, 0, 0), etc., of the xyz co-ordinate system, and the reference point is located at a point on the television 108, e.g., a point on a lens of the camera 1210, etc.

In an embodiment, a position and orientation of an item that is determined from image data captured using the camera 1210 is used to confirm or deny an accuracy of a position and orientation of an item that is determined from image data captured using a camera of a wearable device in a manner similar to that described above in which image data captured using the camera 512 (FIG. 5) of the HMD 510 (FIG. 5) is used to confirm or deny an accuracy of a position and orientation of the item determined from image data captured using the camera of the wearable device. Upon confirming the accuracy, the game processor of the game console 106 identifies from the position and/or orientation of an item determined from image data captured using the camera 1210 or using a camera of a wearable device data regarding a state of a virtual object to be displayed on a display screen of the HMD 310 or on a display screen of the television 108. The game processor sends via a communication device of the game console 106 and a communication device of the HMD 310, data regarding the state of a virtual object to the HMD 310 for display. In one embodiment, the game processor sends via a communication device of the game console 106 and a communication device of the television 108, data regarding a state of a virtual object to a processor of the television 108 for display.

Upon determining that a position and/or orientation of the item determined from the image data captured using the camera of the wearable device 102A is not accurate, the game processor of the game console 106 waits until the position and/or orientation is determined to be accurate from additional image data that is captured using a camera of a wearable device and from additional image data that is captured using the camera 1210.

In one embodiment, upon determining that a position and/or orientation of the item determined from the image data captured using the camera of the wearable device 102A is not accurate, instead of using a position and/or orientation of an item determined from image data captured using a camera of a wearable device, the game processor of the game console 106 uses a position and/or orientation of an item determined from image data captured using the camera 1210 to identify data regarding a state of a virtual object. The data regarding identified state is provided to the HMD 310 or to the television 108 to display a virtual object having the state.

Figure 13:
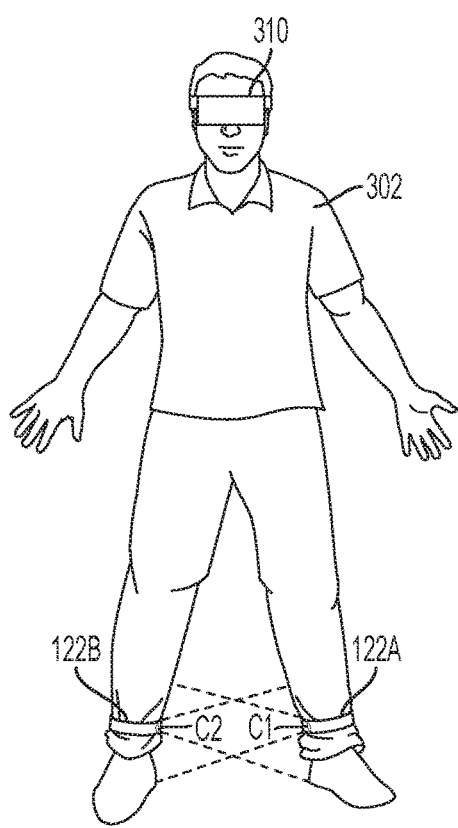
FIG. 13 is a diagram of a system in which ankle devices are worn around an ankle of a user, in accordance with one embodiment of the present disclosure.

FIG. 13 is a diagram of an embodiment of a system in which ankle devices 122A and 122B are worn around an ankle of the user. The ankle device 122A is an example of the wearable device 112A and the ankle device 122B is an example of the wearable device 112B. For example, the ankle device 122A has the same shape and performs the same function as that of the wearable device 112A except that the ankle device 112A has a bigger diameter than that of the wearable device 112A to fit an ankle of the user 302 instead of a wrist of the user 302. As another example, the ankle device 122B has the same shape and performs the same function as that of the wearable device 112B except that the ankle device 112B has a bigger diameter than that of the wearable device 112B to fit an ankle of the user 302 instead of a wrist of the user 302.

The ankle device 122A includes one or more cameras that generate image data from a view of the right leg of the user 302. The image data is used by the game processor of the game console 106 to calculate a relative position and/or relative orientation of the right leg with respect to the left leg and/or relative positions and/or relative orientations of fingers of the right foot with respect to fingers of the left foot and/or relative position and/or relative orientation of the right foot with respect to the left foot. Moreover, the ankle device 122B one or more cameras that generate image data from a view of the left leg of the user 302. The image data is used by the game processor of the game console 106 to calculate a relative position and/or relative orientation of the left leg with respect to the right leg and/or relative positions and/or relative orientations of fingers of the left foot with respect to fingers of the right foot and/or relative position and/or relative orientation of the left foot with respect to the right foot.

It should be noted that image data captured using a camera of the ankle device 122A is used to determine a position and/or orientation of an item, e.g., the right leg, fingers of the right foot, etc., from a reference point, e.g., an origin (0, 0, 0), etc., of the xyz co-ordinate system and the reference point is on the camera. Similarly, image data captured using a camera of the ankle device 122B is used to determine a position and/or orientation of an item, e.g., the right leg, fingers of the right foot, etc., from a reference point, e.g., an origin (0, 0, 0), etc., of the xyz co-ordinate system and the reference point is on the camera.

Figure 14:
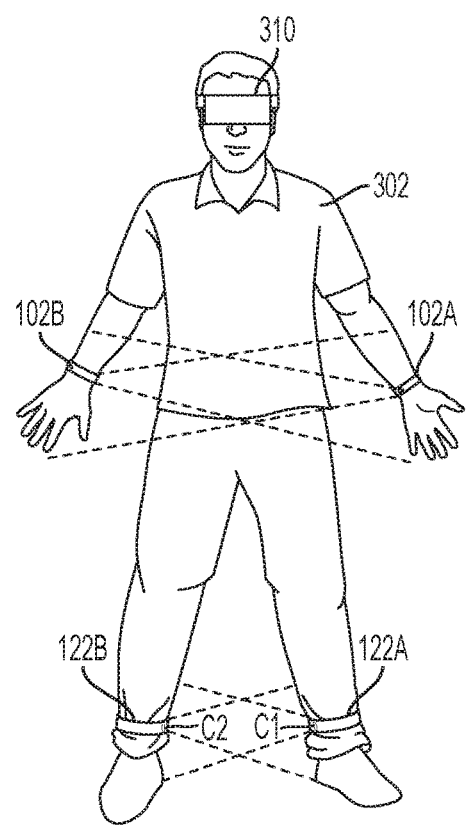
FIG. 14 is a diagram of a system in which a user is wearing wearable devices around his/her wrist and is wearing ankle devices around his/her ankles, in accordance with one embodiment of the present disclosure.

FIG. 14 is a diagram of an embodiment of a system in which the user is wearing wearable devices 102A and 102B around his/her wrist and is wearing ankle devices 122A and 122B around his/her ankles. The wearable devices 102A and 102B communicate with the HMD 310 to provide image data to the HMD 310 via a wired or a wireless medium and/or communicate with the game console 106 to provide image data to the HMD game console 310 via a wired or a wireless medium. The ankle devices 122A and 122B communicate with the HMD 310 to provide image data to the HMD 310 via a wired or a wireless medium and/or communicate with the game console 106 to provide image data to the HMD game console 310 via a wired or a wireless medium.

Figure 15:
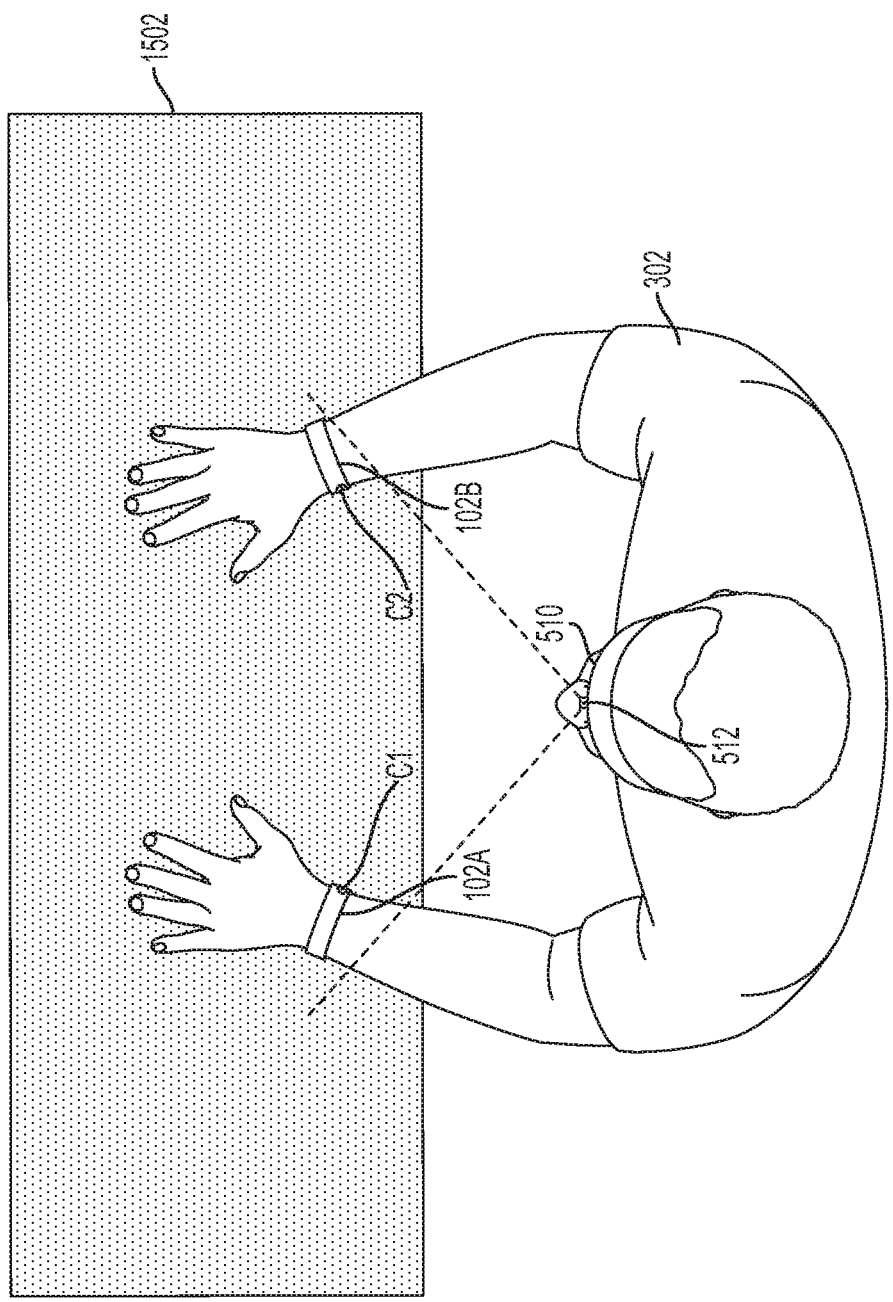
FIG. 15 is a diagram of a system in which a user is using a pad device with wearable devices, in accordance with one embodiment of the present disclosure.

FIG. 15 is a diagram of an embodiment of a system in which the user is using a pad device 1502, e.g., a mat, a surface, a board, a wooden block, etc., with the wearable devices 102A and 102B. The pad device 1502 provides a colored background, e.g., a white background, a green background, a blue background, etc., against which the wearable devices 102A and 102B are visible to the camera 512 of the HMD 510. For example, the pad device 1502 is of a color and the wearable devices 102A and 102B have a color that stands out against the color of the pad device 1502.

The camera 512 of the HMD 510 captures image data of the wearable devices 102A and 102B, and of the pad device 1502. The image data is communicated from the wearable devices 102A and 102B to the game console 106 to determine positions and orientations of the wearable devices 102A and 102B with respect a reference co-ordinate of the xyz co-ordinate system. The reference co-ordinate is located at a lens of the camera 512.

In some embodiments, the wearable device 102A is of a different color than that of the wearable device 102B.

In one embodiment, the pad device 1502 excludes electronics, e.g., a display screen, a processor, a sensor, a camera, etc.

In an embodiment, the wearable device 102A is of a different color or different pattern than the wearable device 102B and the pad 1502. For example, the wearable device 102A is of a yellow color or yellow-colored pattern, the wearable device 102B is of a purple color or purple-colored pattern, and the pad device 1502 is of a green color or green-colored pattern. Image data generated by the camera 512 facilitates a game processor of the game console 106 in distinguishing the wearable device 102A from the wearable device 102B. The camera 512 is able to generate image data that facilitates the game processor in distinguishing the yellow color from the purple color when both the colors are placed against a background color of green of the pad device 1502. The game processor identifies from a game memory device that the yellow color in image data corresponds, e.g., maps, associates, etc., to the left hand of the user 302, the purple color in image data corresponds to the right hand of the user 302. The game processor determines that movement of the wearable device 102A provides movement of the left hand and movement of the wearable device 102B provides movement of the right hand.

In an embodiment, the pad 1502 is passive, e.g., excludes any electronics, e.g., sensors, emitters, battery, cameras, etc.

In one embodiment, instead of a passive pad, an active pad, e.g., a tablet, a phablet, etc., is used to display a colored screen to provide a background against the wearable devices 102A and 102B.

Figure 16:
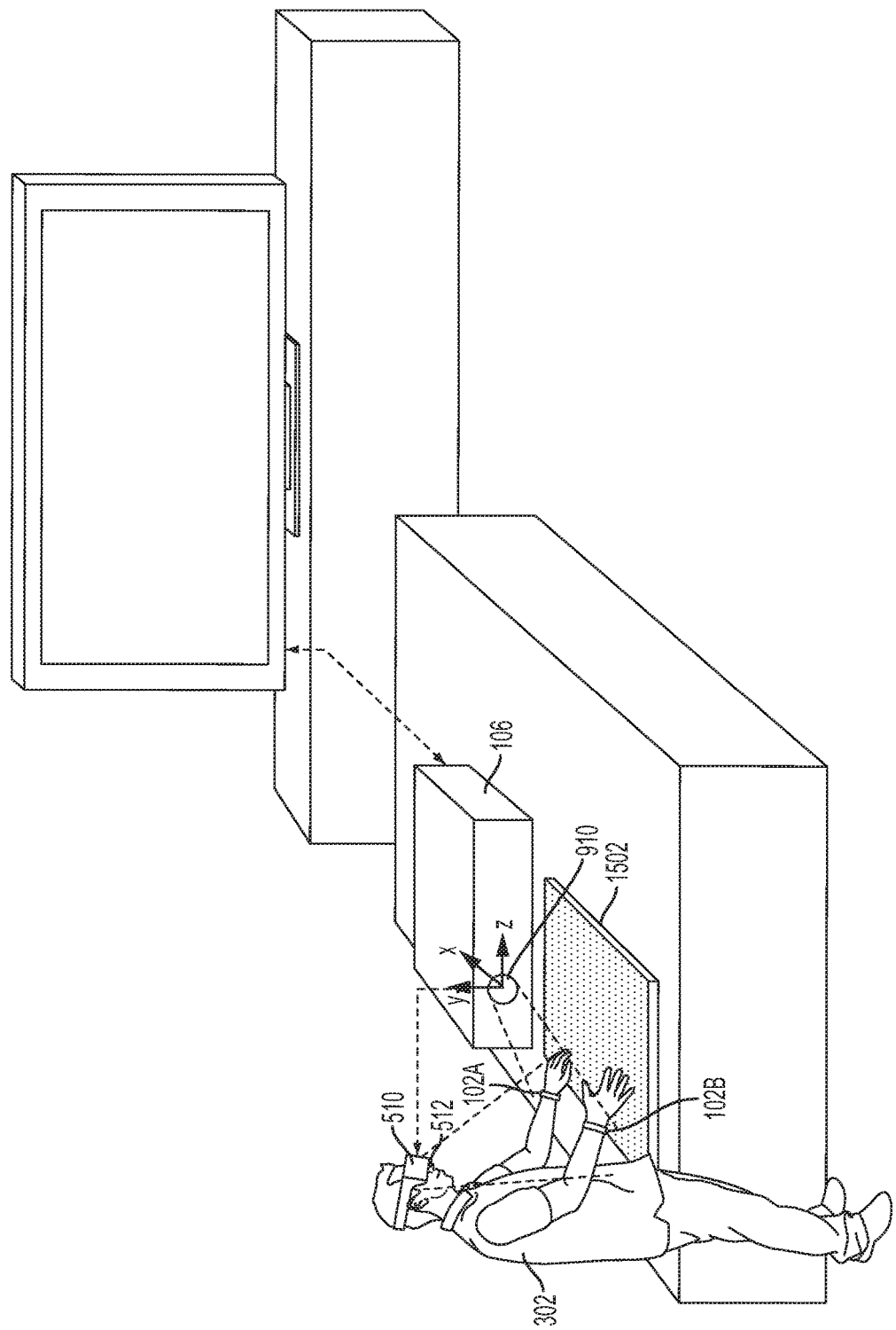
FIG. 16 is a diagram of a system in which a pad device is overlaid on a surface, in accordance with one embodiment of the present disclosure.

FIG. 16 is a diagram of an embodiment of a system in which the pad device 1502 is overlaid on a surface, e.g., a desk, a table, a chair, etc, that is supported on a floor. The camera 512 of the HMD 510 or of the game console 106 views the wearable devices 102A and 102B against the pad device 124 to generate image data. The image data is used to determine a relative position and/or a relative orientation of the left hand of the user with respect to the right hand of the user 302.

Figure 17:
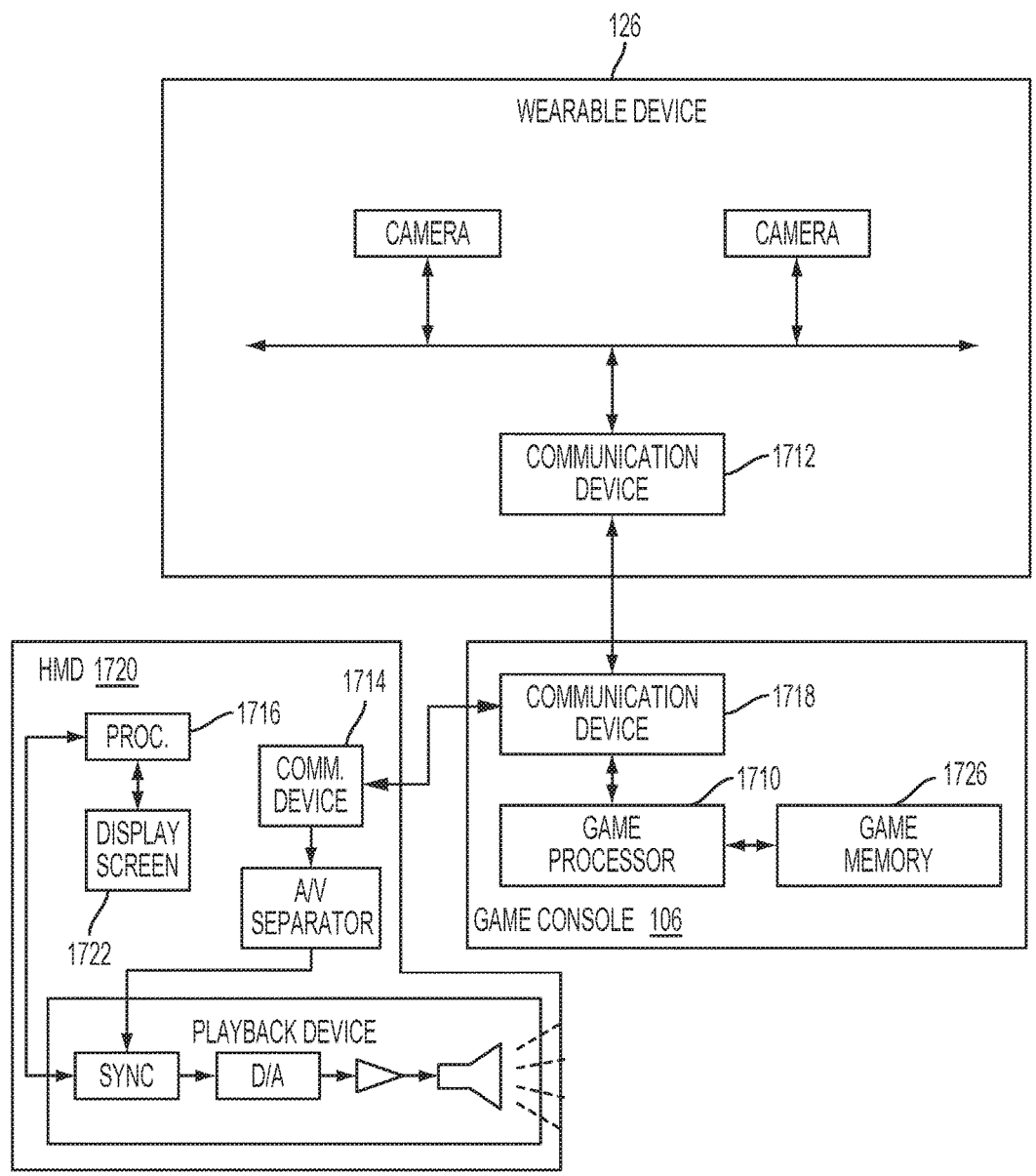
FIG. 17 is a block diagram of a wearable device, in accordance with one embodiment of the present disclosure.

FIG. 17 is a block diagram of an embodiment of a wearable device 126, e.g., a wearable device, an ankle device, etc. The wearable device 126 is an example of the wearable device 102A (FIG. 1A), or the wearable device 102B (FIG. 1A), or the wearable device 103A (FIG. 2A), or the wearable device 103B (FIG. 2A), or the wearable device 104A (FIG. 3), or the wearable device 104B (FIG. 3), or the wearable device 116 (FIG. 7), or the wearable device 118 (FIG. 7), or the wearable device 120A (FIG. 8), or the wearable device 120B (FIG. 8), or the wearable device 120C (FIG. 8), or the wearable device 122A (FIG. 13), or the wearable device 122B (FIG. 13). The wearable device 126 includes a number of cameras and a communication device 1712. Examples of a communication device includes a communication device that uses a wired communication protocol or a wireless communication protocol to communicate information with another communication device. For example, the communication device 1712 uses the wireless communication protocol, e.g., a Wi-Fi protocol, Bluetooth, etc., to communicate with another communication device. As another example, the communication device 1712 uses a wired communication protocol, e.g., a serial transfer protocol, a parallel transfer protocol, a universal serial bus (USB) protocol, etc., to communicate with another communication device.

One or more cameras of the wearable device 126 that are worn on the right arm of the user 302 capture image data, e.g., one or more images, etc., of an item, e.g., a wearable device that is worn on the left arm of the user 302, fingers of the left hand of the user 302, the left hand of the user 302, finger joints of fingers of the left hand, etc., to generate image data. For example, a first camera of the wearable device 126 captures images of the left hand when the left hand is at a first position and/or a first orientation and a second camera of the wearable device 126 captures images of the left hand when the left hand is at a second position and/or second orientation. A stream, e.g., data packets, digitally encoded coherent signals, etc., of the image data of an item is communicated from the communication device 1712 using a wired or a wireless communication protocol to a communication device 1718 of the game console 106. For example, the image data is embedded as a payload into one or more packets, and a header is included within a packet, to communicate the image data in the form of packetized signals. As another example, the communication device 1712 applies a wireless communication protocol to generate wireless signals, which are a stream of image data. As yet another example, the communication device 1712 applies a wired communication protocol to generate wired signals, which are a stream of image data.

Similarly, a communication device of another wearable device, e.g., a wearable device other than the wearable device 126, etc., that is worn on the left arm of the user 302 generates and sends a stream of image data, e.g., wireless signals, wired signals, etc., to the communication device 1718. The stream of image data that is generated by the other wearable device includes image data of the wearable device 126 and/or of fingers of the right hand and/or of the right hand and/or of finger joints of the right hand and/or of a wearable device that is worn on the right arm of the user 302.

The communication device 1718 of the game console 106 receives the streams of image data from the communication device 1712 and the communication device of the other wearable device worn on the left arm of the user, and applies a wireless communication protocol to extract the image data from the wireless signals or applies a wired communication protocol to extract the image data from the wired communication signals. For example, the communication device 1718 of the game console 106 rearranges packets of the image data in an order in which the image data is generated from a camera of the wearable device 126.

The communication device 1718 provides the image data that includes positions and orientations of items, e.g., the wearable devices worn on the right and left arms, and/or the right and left hands, and/or fingers of the right and left hands, and/or finger joints of the right and left hands of the user 302, etc., to a game processor 1710 of the game console 106. The game processor 1710 determines, e.g., identifies, etc., a position and orientation of an item, e.g., the other wearable device worn on the right arm of the user 302 and/or of the right hand and/or of fingers of the right hand and/or finger joints of one or more fingers of the right hand from the image data of the wearable device 126 that is worn on the left arm of the user 302, etc. For example, the game processor 1710 extracts a position, e.g., (x, y, z) co-ordinate, etc., of the wearable device 126 and/or a finger of the right hand and/or a finger joint of the right hand and/or the right hand from image data of a portion of the right arm. The image data includes a position and orientation of a portion of the right arm from a reference point, e.g., an origin (0, 0, 0), etc., of an xyz co-ordinate system. The reference point is located at a camera that captures image data.

The game processor 1710 identifies from image data, a position, e.g., an (x, y, z) co-ordinate, etc., of an item with respect to the xyz co-ordinate system of the real-world environment. Examples of an item include a finger joint of a finger, a finger of an arm, a wearable device, a hand, a foot, a portion of a leg, a palm, a portion of a palm, etc. As an example, a position of an item from a reference co-ordinate, e.g., origin (0, 0, 0), etc., of the xyz co-ordinate system includes a distance of a point on the item, shown in the image data, along the x-axis of the xyz co-ordinate system from the reference co-ordinate, a distance of the point along the y-axis of the xyz co-ordinate system from the reference co-ordinate, and a distance of the point along the z-axis of the xyz co-ordinate system from the reference co-ordinate. It should be noted that the xyz co-ordinate system is located at a camera that captures image data of the item. For example, when the camera of the wearable device 126 captures image data of a hand of the user 302, a reference point, e.g., origin, etc., is located at the camera, e.g., a lens of the camera, etc., and a position of the hand is identified with respect to the reference point.

Similarly, the game processor 1710 identifies from image data an orientation of an item with respect to the xyz co-ordinate system of the real-world environment. As an example, an orientation of an item in an image includes an angle formed by an axis of the item in the image with respect to the x-axis of the xyz co-ordinate system, an angle formed by the axis of the item in the image with respect to the y-axis of the xyz co-ordinate system, and an angle formed by the axis of the item in the image with respect to the z-axis of the xyz co-ordinate system.

In one embodiment, an axis of an item extends along a length of the item. For example, an axis of a hand extends along a length of the hand and an axis of a foot extends along a length of the foot.

In an embodiment, an item shown in an image is referred to herein as a virtual object.

The game processor 1710 further identifies from a game memory device 1726 data regarding a state, e.g., position, color, texture, shade, visual effect, audio effect, sound, outline, boundary, shape, etc., of a virtual object to be displayed in a virtual environment corresponding to the position of an item. For example, the game processor 1710 identifies from the memory device 1726 a mapping between a position of an item and data regarding a state of a virtual object. As another example, the game processor 1710 determines, from the memory device 1726, a mapping between a position of a hand of the user 302 and a position of a virtual hand that represents the hand of the user 302. To illustrate, when the position of a finger of the user 302 is at a distance (x, y, z) from a reference point of the xyz co-ordinate system, a position of a virtual object is at a distance (X, Y, Z) from a reference point of an XYZ co-ordinate system. In this example, the distance (X, Y, Z) in an image is proportional in each of X, Y, and Z dimension to the distance (x, y, z) in the real-world environment.

It should be noted that in one embodiment, the XYZ co-ordinate system is a virtual co-ordinate system that is used to determine a position and orientation of a virtual object. The xyz co-ordinate system is a co-ordinate system that is used to determine a position and orientation of an item in the real-world environment.

It should be noted that a virtual object whose state is changed based on a position of an item is programmed in the game processor 1710 as being associated with the item. For example, it is programmed in the game processor 1710 that a finger of the user 302 is associated with a virtual trigger to allow the finger to control the virtual trigger. As another example, it is programmed in the game processor 1710 that a right hand or a left hand of the user 302 is associated with a virtual ball to facilitate the user 302 to change a position of a virtual ball by using his/her hand.

Similarly, the game processor 1710 further identifies from the game memory device 1726 data regarding a state of a virtual object to be displayed in a virtual environment corresponding to the orientation of an item that corresponds to the virtual object. For example, the game processor 1710 identifies from the memory device 1726 a mapping between an orientation of an item and a state of a virtual object. As another example, the game processor 1710 determines from the memory device 1726 a mapping between an orientation of a hand of the user 302 and an orientation of a virtual hand that represents the hand of the user 302. As yet another example, when an orientation of a finger of the user 302 forms a first angle with respect to the x-axis, a second angle with respect to the y-axis, and a third angle with respect to the z-axis, the game processor 1710 identifies from the memory device 1726, an orientation of a virtual object as forming a fourth angle with respect to the X-axis, an orientation of the virtual object as forming a fifth angle with respect to the Y-axis, and an orientation of the virtual object as forming a sixth angle with respect to the Z-axis. It should be noted that the fourth angle is proportional to the first angle, the fifth angle is proportional to the second angle, and the sixth angle is proportional to the third angle.

The game processor 1710 provides identified data regarding a state of a virtual object to the communication device 1718. The communication device 1718 applies a wired communication protocol or a wireless communication protocol to the identified data regarding a state of a virtual object to generate and send wired or wireless signals.

A communication device 1714 of an HMD 1720 receives the wired signals from the communication device 1718 and applies a wired communication protocol to the wired signals to extract identified data regarding a state of a virtual object from the wired signals. Similarly, the communication device 1714 of the HMD 1720 applies a wireless communication protocol to the wireless signal to extract identified data regarding a state of a virtual object from the wireless signals. The HMD 1720 is an example of the HMD 310 or the HMD 510.

The communication device 1714 provides data regarding a state that is extracted to an audio/video (A/V) separator. The A/V separator separates audio data from image data, both of which are included within the data regarding a state, sends the image data to the processor 1716 and sends the audio data to a synchronizer. The synchronizer synchronizes a playback of sound with that of a display of a virtual object. For example, the synchronizer plays sound at the same time as a virtual object is displayed at a position and/or an orientation and/or as having a color and/or as having a shape and/or as having a texture. The synchronizer sends the synchronized audio data to a digital to analog converter that converts the audio data from a digital format into an analog format. The analog audio data is amplified by an amplifier. The amplified analog audio data is converted into sound by one or more speakers.

The processor 1716 of the HMD 1720 renders image data regarding a state of a virtual object to display the state of the virtual object on a display screen 1122. For example, the processor 1720 displays a virtual object as having a color, a shape, a texture, a position, an orientation, etc., in a virtual environment. Examples of a display screen include a liquid crystal display (LCD) screen, an LED display screen, a plasma display screen, etc.

Examples of a memory device include a hard drive, a network attached storage (NAS), a read-only memory (ROM), a random-access memory (RAM), a compact disc-ROMs (CD-ROMs), a CD-recordable (CD-R), a CD-rewritable (CD-RW), a magnetic tape, and other optical or non-optical data storage device.

In one embodiment, the game processor 1710 of the game console 106 receives image data that is captured by a camera of a television or a camera of an HMD or an independently-located camera, e.g., the camera 402 (FIG. 4), etc., and determines from the image data a position and/or orientation of an item in the real-world environment.

In an embodiment, a camera of a wearable device that is worn on a right wrist of the user captures image data representing a portion of a left arm of the user. The image data is used by the game processor to determine a position and orientation of the portion of the left arm of the user. The position and/or orientation are used to identify a state of a portion of a virtual left arm of the user. The portion of the virtual left arm is displayed on a display screen of an HMD. As an example, as the user moves his/her left arm to be within a field-of-view of a camera worn on the right wrist of the user, the portion of the virtual left arm enters a virtual environment displayed on the display screen of the HMD. Similarly, in this embodiment, a camera of a wearable device that is worn on a left wrist of the user captures image data regarding a portion of a right arm of the user. The image data captured by the wearable device worn on the left wrist is used by the game processor to determine a position and orientation of the portion of the right arm of the user. The position and/or orientation of the right arm of the user are used to identify a state of a portion of a virtual right arm of the user. The portion of the virtual right arm is displayed on the display screen of the HMD. For example, as the user moves his/her right arm to be within a field-of-view of a camera worn on the left wrist of the user, the portion of the virtual right arm enters a virtual environment displayed on the display screen of the HMD.

In an embodiment, one or more cameras of the wearable device 126 capture image data and/or streaming of image data from one communication device to another communication device occurs during a session of presenting a virtual environment, e.g., a virtual reality scene, an augmented reality scene, etc., in an HMD. For example, while a user is playing a game using an HMD, cameras of the wearable device 126 worn on a left wrist of the user and cameras of another wearable device worn on the right wrist of the user capture image data. As another example, while a user is interacting with a virtual environment that is displayed in an HMD, image data that is captured using cameras of the wearable device 126 is streamed from the communication device 1712 of the wearable device 126 to the communication device 1718 of the game console 106

In an embodiment, a session of a virtual environment is presented on a display screen of an HMD when the user 302 places the HMD on his/her head to cover his/her eyes.

In one embodiment, a session of a virtual environment is presented on a display screen when user information, e.g., username, user password, etc., assigned to the user 302 is authenticated by an authentication server that is connected to a communication device of the game console 106. The user 302 provides the user information using an input device, e.g., a game controller, a keypad, a keyboard, a mouse, etc., to the game processor 1710 of the game console 106. The game processor 1710 sends the user information via a network device, e.g., a network interface controller, a network interface card, a modem, etc., of the game console 106 and a computer network, e.g., the Internet, an Intranet, a combination thereof, etc., to the authentication server. The authentication server determines whether the user information is authentic and provides a result of the authentication to the game processor 1710. Upon receiving the indication that the user information is authentic, the game processor 1710 provides state data of a virtual environment via the communication device 1718 and the communication device 1714 to the processor 1716. The processor 1716 renders the state data to initiate a session of a virtual environment during which the virtual environment is displayed to the user 302 via the display screen 1722 of the HMD 1720.

In one embodiment, multiple communication devices, e.g., communication devices 1718 and 1714, communication devices 1712 and 1718, etc., are interfaced with each other when the communication devices are capable of communicating data, e.g., image data, audio data, etc., with each other.

In an embodiment, the game processor 1710 receives image data used to display multiple images to identify changes in positions of fingers of a hand of the user 302. For example, the game processor 1710 identifies a first position of a finger from a first image and a second position of the finger from a second image. The game processor 1710 identifies changes in positions of the finger as a change from the first position to the second position. The second position occurs in time after the first position occurs. It should be noted that the first and second images are captured by the same camera of the wearable device 126 or by multiple cameras of the wearable device 126.

In one embodiment, the wearable device 126 includes multiple inertial sensors, e.g., gyroscopes, magnetometers, accelerometers, etc., that generate motion data, e.g., orientation of a hand of the user, magnetic fields, changes in rotational velocity, acceleration of the hand, etc. The motion data is communicated from the communication device 1712 of the wearable device 126 to the communication device 1718 of the game console 106 in a form of a stream, e.g., wireless signals generated after applying a wireless communication protocol to the motion data, wired signals generated after applying a wired communication protocol to the motion data, etc. The communication device 1718 of the game console 106 extracts the motion data by applying a wired communication protocol to the wired signals or by applying a wireless communication protocol to the wireless signals. The game processor 1710 receives the motion data from the communication device 1718. The game processor 1710 determines one or more positions and/or one or more orientations of a hand of the user from the motion data.

In an embodiment, upon determining that image data captured using a camera of the wearable device 126 does not include image data of a hand of the user, the game processor 1710 uses motion data to determine a position and/or orientation of the hand of the user.

In one embodiment, the game processor 1710 uses both motion data and image data to determine a position and/or orientation of a hand of the user. For example, the game processor 1710 generates a statistical value, e.g., an average, etc., of a position determined from motion data generated by a wearable device and a position determined from image data including an image of the wearable device to calculate a position of the wearable device. The calculated position is used to identify a state of a virtual object. As another example, the game processor 1710 generates a statistical value, e.g., an average, etc., of an orientation determined from motion data generated by a wearable device and an orientation determined from image data including an image of the wearable device to calculate an orientation of the wearable device. The calculated orientation is used to identify a state of a virtual object.

In one embodiment, a camera of the wearable device 126 detects light that is emitted from a light emitter of another wearable device, e.g., wearable device worn on an arm other than an arm on which the wearable device 126 is worn, etc., to generate electrical signal data. The electrical signal data is received by the game processor 1710 in a manner similar to that described above and is processed by the game processor 1710 to determine an orientation of an arm of the user on which the other wearable device is worn. For example, upon determining that the light is of a blue color, the game processor 1710 identifies based on a correspondence between the color of light and an orientation of the hand that the hand is oriented so that the first lateral side of the hand faces the camera of the wearable device 126. As another example, upon determining that the light is of a green color, the game processor 1710 identifies based on a correspondence between the color of light and an orientation of the hand that the hand is oriented so that the dorsal side of the hand faces the camera of the wearable device 126. A correspondence, e.g., an association, a link, a mapping, etc., between a side of a hand of the user and a color of light is stored in the game memory device 1726.

In an embodiment, instead of using a color of light to determine an orientation of a hand of the user, an intensity of light or a shade of light is used to determine the orientation. For example, the light emitter LES13 (FIG. 1C) emits light having a greater intensity than light emitted by the light emitter LES1 (FIG. 1C). It should be noted that a color of light and an intensity of the light are examples of characteristics of the light.

In one embodiment, both arms of the user 302 move synchronously or substantially synchronously with each other. For example, both arms move in the same direction, e.g., up, down, left, right, etc., or substantially in the same direction. When both arms move synchronously or substantially synchronously with each other, a reference camera, e.g., a camera of the game console 106, a camera of the HMD 510 (FIG. 5), etc., is used to capture an image of hands of the user 302. The image data captured using the reference camera is communicated, using the wired communication protocol or the wireless communication protocol, from a communication device of the reference camera to the communication device 1718 of the game console 106. The communication device 1718 applies the wired communication protocol or the wireless communication protocol to extract and provide the image data to the game processor 1710. The game processor 1710 receives the image data. Moreover, the game processor 1710 receives image data from cameras of wearable devices worn on left and right arms of the user 302. For example, the game processor 1710 receives image data that includes positions and orientations of the right hand from the wearable device 102A (FIG. 1A) and receives image data that includes positions and orientations of the left hand from the wearable device 102B (FIG. 1A). The game processor 1710 determines whether position and/or orientation of both hands of the user 302 determined from image data captured by the cameras of the wearable devices changes during a pre-determined time period. For example, the game processor 1710 determines whether position and/or orientation of the left hand changes in image data captured using a camera of the wearable device 102B and determines whether position and/or orientation of the right hand changes in image data captured using a camera of the wearable device 102A. The game processor 1710 further determines whether position and/or orientation of both hands of the user 302 determined from image data captured by the reference camera changes during the pre-determined time period. Upon determining that the position and/or orientation of both hands determined from image data captured by the cameras of the wearable devices does not change during the pre-determined time period and position and/or orientation of both hands of the user 302 determined from image data captured by the reference camera changes during the pre-determined time period, the game processor 1710 determines that the position and/or orientation of both hands changes with respect to a reference point, e.g., an origin (0, 0, 0) of the xyz co-ordinate system, etc., located at a location of the reference camera.

In one embodiment, upon determining that the position and/or orientation of both hands determined from image data captured by the cameras of the wearable devices does not change during the pre-determined time period and position and/or orientation of both hands of the user 302 determined from image data captured by the reference camera changes during the pre-determined time period, the game processor 1710 determines to apply the position and/or orientation of both hands that are determined from the image data captured using the reference camera to further identify a state of a virtual object instead of applying image data captured using the cameras of the wearable devices.

In one embodiment, the game processor 1710 determines from image data captured using a camera, e.g., a camera of a wearable device, a camera of a game console, a camera of an HMD, an independently-located camera, etc., whether a difference in two consecutively-determined positions is greater than a pre-determined threshold. For example, when a hand of the user keeps moving in and out of a field-of-view of a camera, the difference in two consecutively-determined positions is greater than the pre-determined threshold. In this example, the hand keeps moving in and out of the field-of-view of the camera when a wearable device that includes the camera slides around a wrist on which the wearable device is worn and/or when the user moves his/her hand of an arm on which the camera is located and/or when the user moving his/her other hand and/or when an object is creating an obstruction between the camera and the other hand. Upon determining that the difference is greater than the pre-determined threshold, the game processor 1710 interpolates positions between the two consecutively-determined positions. For example, the game processor 1710 determines a speed of movement of a hand of the user 302 from positions of the hand of the user 302 and time period between the positions, and determines from the speed and time passed between one of the positions and a position occurring between the two consecutively-determined positions the position between the two consecutively-determined positions. As another example, the game processor 1710 connects the two consecutively-determined positions to generate positions between the consecutively-determined positions. The interpolation creates image stabilization of images of a virtual object that is displayed as having positions that correspond to positions of the hand that is represented by the virtual object.

In one embodiment, the communication device 1712 of the wearable device 126, e.g. a first wearable device, etc., that is worn on a wrist of a user receives wired or wireless signals that include first image data from a communication device of a second wearable device that is worn on another wrist of the user. The first image data is captured by a camera of the second wearable device. The communication device 1712 also receives second image data captured by a camera of the first wearable device and applies a communication protocol, e.g., the wired protocol, the wireless protocol, etc., to the first and second image data to generate signals and to communicate the signals to the communication device 1718 of the game console 106. The communication device 1712 further identifies within the signals that the first image data is received from the second wearable device and the second image data is obtained from the first wearable device. The communication device 1718 receives the signals from the communication device 1712 and applies the communication protocol to extract the first and second image data for provision to the game processor 1710. The game processor 1710 distinguishes between the first and second image data using the identification of the first image data and the identification of the second image data.

Figure 18A:
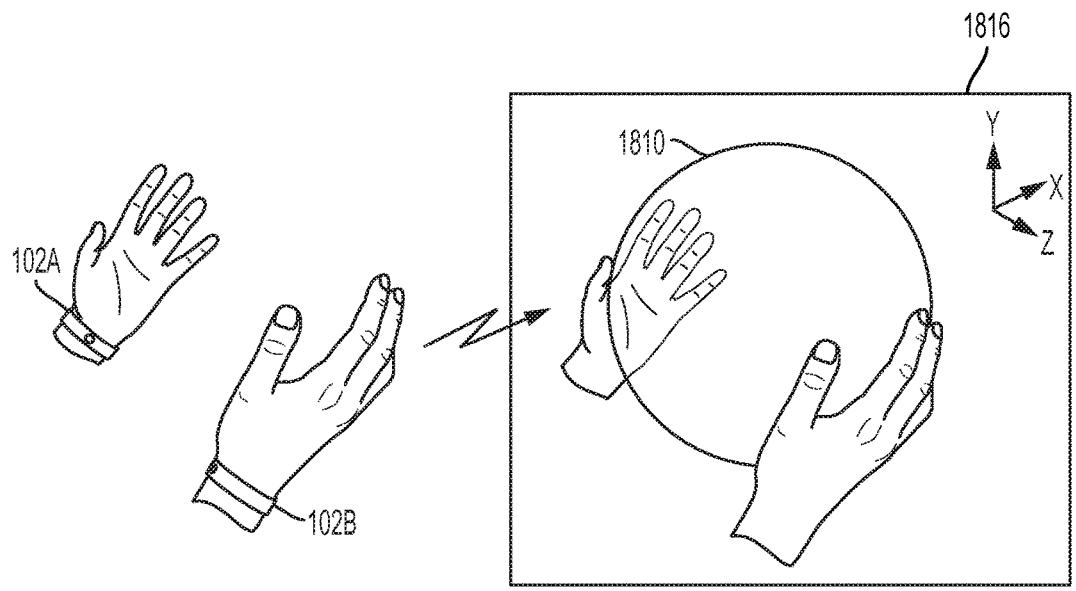
FIG. 18A is a diagram of an image of a virtual environment that is displayed on an HMD to illustrate that both hands of a user are used to control a virtual object that is within an image, in accordance with one embodiment of the present disclosure.

FIG. 18A is a diagram of an embodiment of an image 1816 of a virtual environment that is displayed on an HMD, e.g., the HMD 310, the HMD 510, etc., to illustrate that one or both hands of the user 302 are used to control a virtual object 1810, e.g., a volleyball, a soccer ball, a basketball, a bowling ball, etc., that is displayed within the image 1816. The game processor of the game console 106 associates, e.g., links, maps, etc., the virtual object 1810 with position and/or orientation of one or both hands of the user 302. For example, when one or both hands move with respect to the xyz co-ordinate system associated with the real-world environment, the game processor of the game console 106 moves the virtual object 1810 with respect to the XYZ co-ordinate system.

It should be noted that the game processor of the game console 106 identifies a position of the virtual object 1810 as being proportional to a position of one or both hands of the user 302. For example, when one or both hands move closer to a reference point of an xyz co-ordinate system of the real-world environment to be located at a distance (x, y, z) from the reference point, the virtual object 1810 moves closer to a reference point of the XYZ co-ordinate system to be located at a distance (X, Y, Z) from the reference point of the XYZ co-ordinate system. The distance (X, Y, Z) is proportional to the distance (x, y, z). Similarly, the game processor of the game console 106 identifies an orientation of the virtual object 1810 as being proportional to an orientation of one or both hands of the user 302. For example, when both hands are at an angle with respect to an x-axis of an xyz co-ordinate system, an angle with respect to the y-axis of the xyz co-ordinate system, and at an angle with respect to the z-axis of the xyz co-ordinate system, the virtual object 1810 is located at an angle with respect to the X-axis of the XYZ co-ordinate system, an angle with respect to the Y-axis of the XYZ co-ordinate system, and at an angle with respect to the Z-axis of the XYZ co-ordinate system. The angle with respect to the X-axis of the XYZ co-ordinate system is proportional to the angle with respect to the x-axis of the xyz co-ordinate system, the angle with respect to the Y-axis of the XYZ co-ordinate system is proportional to the angle with respect to the y-axis of the xyz co-ordinate system, and the angle with respect to the Z-axis of the XYZ co-ordinate system is proportional to the angle with respect to the z-axis of the xyz co-ordinate system.

In one embodiment, a position of both hands of the user 302 with respect to a reference point of the xyz co-ordinate system is identified by the game processor of the game console 106 to be the same as a position of a point between the two hands that is equidistant from the two hands. Moreover, in this embodiment, an orientation of both hands of the user 302 with respect to the xyz co-ordinate system is identified by the game processor of the game console 106 to be the same as an orientation of an axis that is equidistant between axes of the two hands.

Figure 18B:
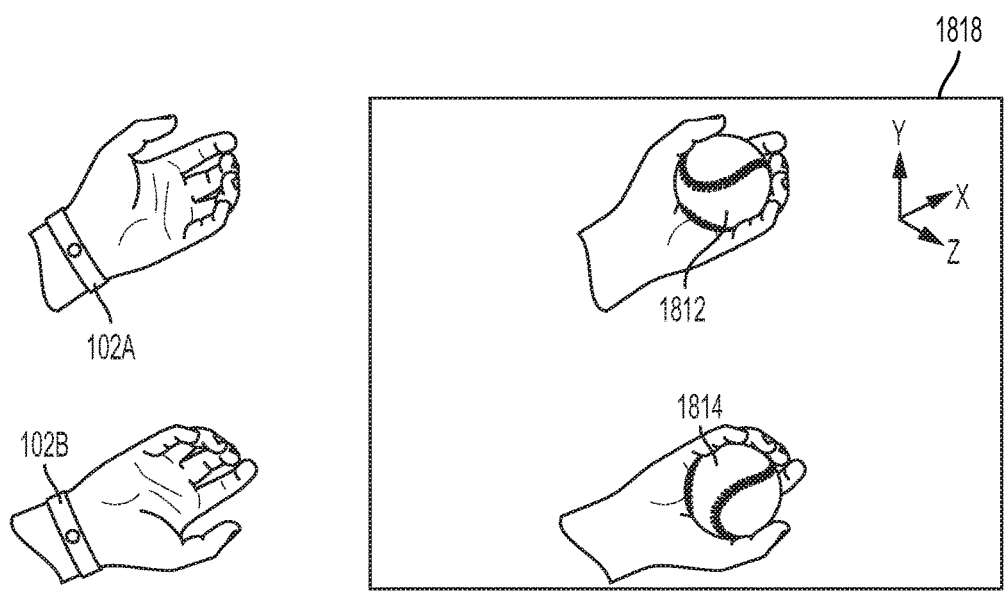
FIG. 18B is a diagram of an image of a virtual environment that is displayed on an HMD to illustrate that one hand of a user is used to control a virtual object and another hand of the user is used to control another virtual object, in accordance with one embodiment of the present disclosure.

FIG. 18B is a diagram of an embodiment of an image 1818 of a virtual environment that is displayed on an HMD, e.g., the HMD 310, the HMD 510, etc., to illustrate that one hand, e.g., right hand, left hand, etc., of the user 302 is used to control a virtual object 1812, e.g., a tennis ball, a weight-lifting exercise ball, a baseball, a cricket ball, etc., and another hand of the user 302 is used to control another virtual object 1814, e.g., a tennis ball, a weight-lifting exercise ball, a baseball, a cricket ball, etc., within an image 1818. The game processor of the game console 106 associates, e.g., links, maps, etc., the virtual object 1812 with position and/or orientation of the left hand of the user 302 and associates the virtual object 1814 with the right hand of the user 302. For example, when the left hand is moved with respect to a reference point of the xyz co-ordinate system, the game processor of the game console 106 moves the virtual object 1812 with respect to a reference point of the XYZ co-ordinate system and when the right hand is moved with respect to the reference point of the xyz co-ordinate system, the game processor of the game console 106 moves the virtual object 1814 with respect to the reference point of the XYZ co-ordinate system. As another example, the movement of the left hand of the user 302 does not affect movement of the virtual object 1814 and the movement of the right hand of the user 302 does not affect movement of the virtual object 1812.

Figure 19:
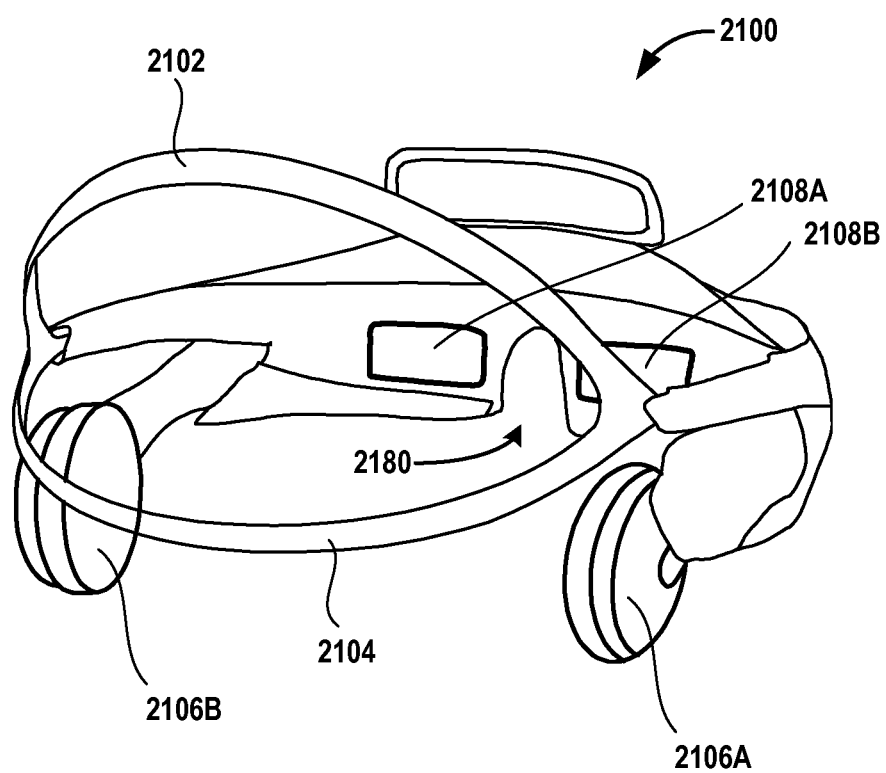
FIG. 19 is an isometric view of an HMD, in accordance with one embodiment of the present disclosure.

FIG. 19 is an isometric view of an HMD 2100, which is an example of the HMD 310 (FIG. 3). The HMD 2100 includes bands 2102 and 2104 that go to the back of the head of the user 302 when worn by the user 302. Moreover, the HMD 2100 includes earphones 2106A and 2106B, e.g., speakers, etc., that emanate sound associated with a virtual environment, e.g., a game environment, a virtual tour environment, etc., that is played by execution of a computer program, e.g., a game program, a virtual environment generation program, etc. The HMD 2100 includes lenses 2108A and 2108B that allows the user 302 to view a virtual environment that is displayed on a display screen of the HMD 2100. A groove 2180 rests on a nose of the user 302 to support the HMD 2100 on the nose.

In some embodiments, an HMD 2100 is worn by the user 302 in a manner similar to which sunglasses, glasses, or reading glasses are worn by the user 302.

Figure 20:
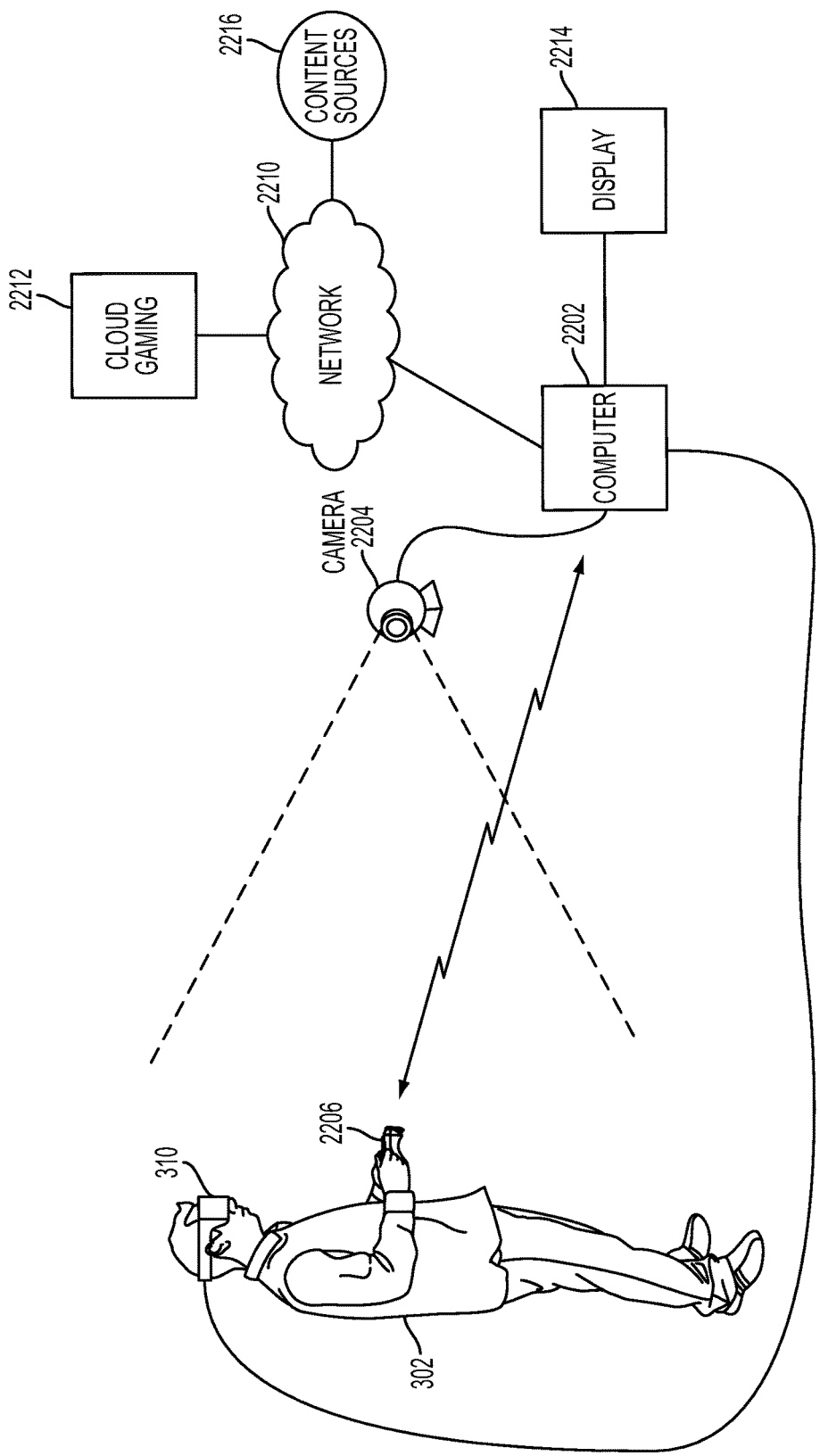
FIG. 20 is a diagram of a system to illustrate an interaction of a user with a virtual environment by using an HMD and a hand-held controller, in accordance with one embodiment of the present disclosure.

FIG. 20 illustrates a system for interactive game play of a video game, in accordance with an embodiment described in the present disclosure. The user 302 is shown wearing the HMD 310. The HMD 310 is worn in a manner similar to glasses, goggles, or a helmet, and is configured to display a video game or other content to the user 302. The HMD 310 provides an immersive experience to the user by virtue of its provision of display mechanisms (e.g., optics and display screens) in close proximity to the user's eyes and the format of content that is delivered to the HMD 310. In one example, the HMD 310 provides display regions to each of the user's eyes which occupy large portions or even the entirety of the field of view of the user 302.

In one embodiment, the HMD 310 is connected to a computer 2202. The connection to computer 2202 can be wired or wireless. The computer 2202, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 310 can connect directly to the Internet, which may allow for cloud gaming without the need for a separate local computer. In one embodiment, the computer 2202 is configured to execute a video game (and other digital content), and output the video and audio from the video game for rendering by the HMD 310. The computer 2202 is also sometimes referred to herein as a client system, which in one example is a video game console.

The computer 2202 may, in some embodiments, is a local or remote computer, and the computer runs emulation software. In a cloud gaming embodiment, the computer 2202 is remote and may be represented by a plurality of computing services that may be virtualized in data centers, where game systems/logic is virtualized and distributed to the user 302 over a computer network.

The user 302 operates a hand-held controller 2206 to provide input for a virtual environment. In one example, a camera 2204 is configured to capture image of the real-world environment in which the user 302 is located. These captured images are analyzed to determine a location and movements of the user 302, the HMD 310, and the controller 2206. In one embodiment, the controller 2206 includes a light (or lights) which are tracked to determine its location and orientation. Additionally, as described in further detail below, in one embodiment, the HMD 310 includes one or more lights, which are tracked as markers to determine the location and orientation of the HMD 310 in substantial real-time during a display of a virtual environment.

The camera 2204, in one embodiment, includes one or more microphones to capture sound from the real-world environment. Sound captured by a microphone array is processed to identify the location of a sound source. Sound from an identified location is selectively utilized or processed to exclusion of other sounds not from the identified location. Furthermore, in one embodiment, the camera 2204 is configured to include multiple image capture devices (e.g. stereoscopic pair of cameras), an IR camera, a depth camera, and combinations thereof.

In some embodiments, computer 2202 executes games locally on the processing hardware of the computer 2202. The games or content is obtained in any form, such as physical media form (e.g., digital discs, tapes, cards, thumb drives, solid state chips or cards, etc.) or by way of download from a computer network 2210, e.g., the Internet, an Intranet, a local area network, a wide area network, etc. In an embodiment, the computer 2202 functions as a client in communication over the computer network 2210 with a cloud gaming provider 2212. The cloud gaming provider 2212 maintains and executes the video game being played by the user 302. The computer 2202 transmits inputs from the HMD 310, the controller 2206, and the camera 2204, to the cloud gaming provider 2212, which processes the inputs to affect the game state of the video game being executed. The output from the executing video game, such as video data, audio data, and haptic feedback data, is transmitted to the computer 2202. The computer 2202 further processes the data before transmission or directly transmits the data to the relevant devices. For example, video and audio streams are provided to the HMD 310, whereas a vibration feedback command is provided to the controller 2206.

In one embodiment, the HMD 310, controller 2206, and camera 2204, are networked devices that connect to the computer network 2210 to communicate with the cloud gaming provider 2212. For example, the computer 2202 may be a local network device, such as a router, that does not otherwise perform video game processing, but facilitates passage of network traffic. The connections to the computer network 2210 by the HMD 310, controller 2206, and camera 2204 are wired or wireless. In some embodiments, content executed on the HMD 310 or displayable on a display device 2214, is obtained from any of content sources 2216. Example content sources can include, for instance, internet websites that provide downloadable content and/or streaming content. In some examples, the content can include any type of multimedia content, such as movies, games, static/dynamic content, pictures, social media content, social media websites, virtual tour content, cartoon content, etc.

In one embodiment, the user 302 is playing a game on the HMD 310, where such content is immersive 3D interactive content. The content on the HMD 310, while the player is playing, is shared to the display device 2214. In one embodiment, the content shared to the display device 2214 allows other users proximate to the user 302 or remote to watch along with game play of the user 302. In still further embodiments, another player viewing the game play of user 302 on the display device 2214 participates interactively with user 302. For example, a user viewing the game play on the display device 2214 controls characters in the game scene, provides feedback, provides social interaction, and/or provides comments (via text, via voice, via actions, via gestures, etc.,) which enables the user who is not wearing the HMD 310 to socially interact with the user 302.

Figure 21:
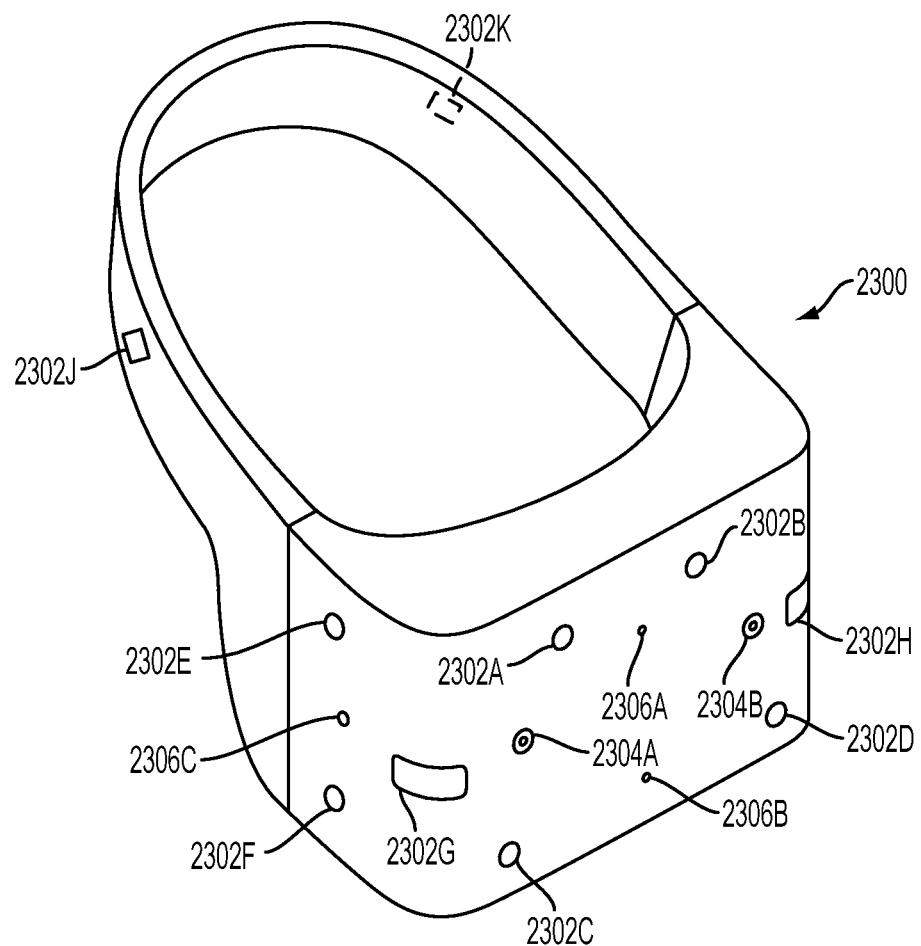
FIG. 21 is an isometric view of another HMD, in accordance with one embodiment of the present disclosure

FIG. 21 illustrates a head-mounted display (HMD) 2300, in accordance with an embodiment described in the present disclosure. The HMD 2300 is an example of the HMD 510 (FIG. 5). As shown, the HMD 2300 includes a plurality of lights 2302A-H, J and K (e.g., where 2302K and 2302J are located toward the rear or backside of the HMD headband). Each of these lights are configured to have specific shapes and/or positions, and are configured to have the same or different colors. The lights 2302A, 2302B, 2302C, and 2302D are arranged on the front surface of the HMD 2300. The lights 2302E and 2302F are arranged on a side surface of the HMD 2300. And the lights 2302G and 2302H are arranged at corners of the HMD 2300, so as to span the front surface and a side surface of the HMD 2300. It will be appreciated that the lights are identified in captured images of an interactive environment in which a user uses the HMD 2300.

Based on identification and tracking of the lights, the location and orientation of the HMD 2300 in the interactive environment is determined. It will further be appreciated that some of the lights are or are not visible depending upon the particular orientation of the HMD 2300 relative to an image capture device, e.g., a camera, etc. Also, different portions of lights (e.g. lights 2302G and 2302H) are exposed for image capture depending upon the orientation of the HMD 2300 relative to the image capture device. In some embodiments, inertial sensors are disposed in the HMD 2300, which provide feedback regarding positioning, without the need for lights. In some embodiments, the lights and inertial sensors work together, to enable mixing and selection of position/motion data.

In one embodiment, the lights are configured to indicate a current status of the HMD 2300 to others users in the real-world environment. For example, some or all of the lights are configured to have a color arrangement, an intensity arrangement, be configured to blink, have a certain on/off configuration, or other arrangement indicating a current status of the HMD 2300. By way of example, the lights are configured to display different configurations during active game play of a video game (generally game play occurring during an active timeline or within a scene of the game) versus other non-active game play aspects of a video game, such as navigating menu interfaces or configuring game settings (during which the game timeline or scene is inactive or paused).

In an embodiment, the lights are also configured to indicate relative intensity levels of game play. For example, the intensity of lights, or a rate of blinking, increases when the intensity of game play increases.

The HMD 2300, in one embodiment, additionally includes one or more microphones. In the illustrated embodiment, the HMD 2300 includes microphones 2304A and 2304B located on the front surface of the HMD 2300, and a microphone located on a side surface of the HMD 2300. By utilizing an array of microphones, sound from each of the microphones is processed to determine a location of the sound's source. This information is utilized in various ways, including exclusion of unwanted sound sources, association of a sound source with a visual identification, etc.

The HMD 2300 includes one or more image capture devices. In the illustrated embodiment, the HMD 2300 is shown to include image captured devices 2306A and 2306B. In an embodiment, by utilizing a stereoscopic pair of image capture devices, three-dimensional (3D) images and video of the real-world environment is captured from the perspective of the HMD 2300. Such video is presented to the user 302 to provide the user with a "video see-through" ability while wearing the HMD 2300. That is, though the user cannot see through the HMD 2300 in a strict sense, the video captured by the image capture devices 2306A and 2306B nonetheless provides a functional equivalent of being able to see the real-world environment external to the HMD 2300 as if looking through the HMD 2300.

Such video, in one embodiment, is augmented with virtual elements to provide an augmented reality experience, or is combined or blended with virtual elements in other ways. Though in the illustrated embodiment, two cameras are shown on the front surface of the HMD 2300, it will be appreciated that there may be any number of externally facing cameras or a single camera can be installed on the HMD 2300, and oriented in any direction. For example, in another embodiment, there may be cameras mounted on the sides of the HMD 2300 to provide additional panoramic image capture of the environment.

Figure 22:
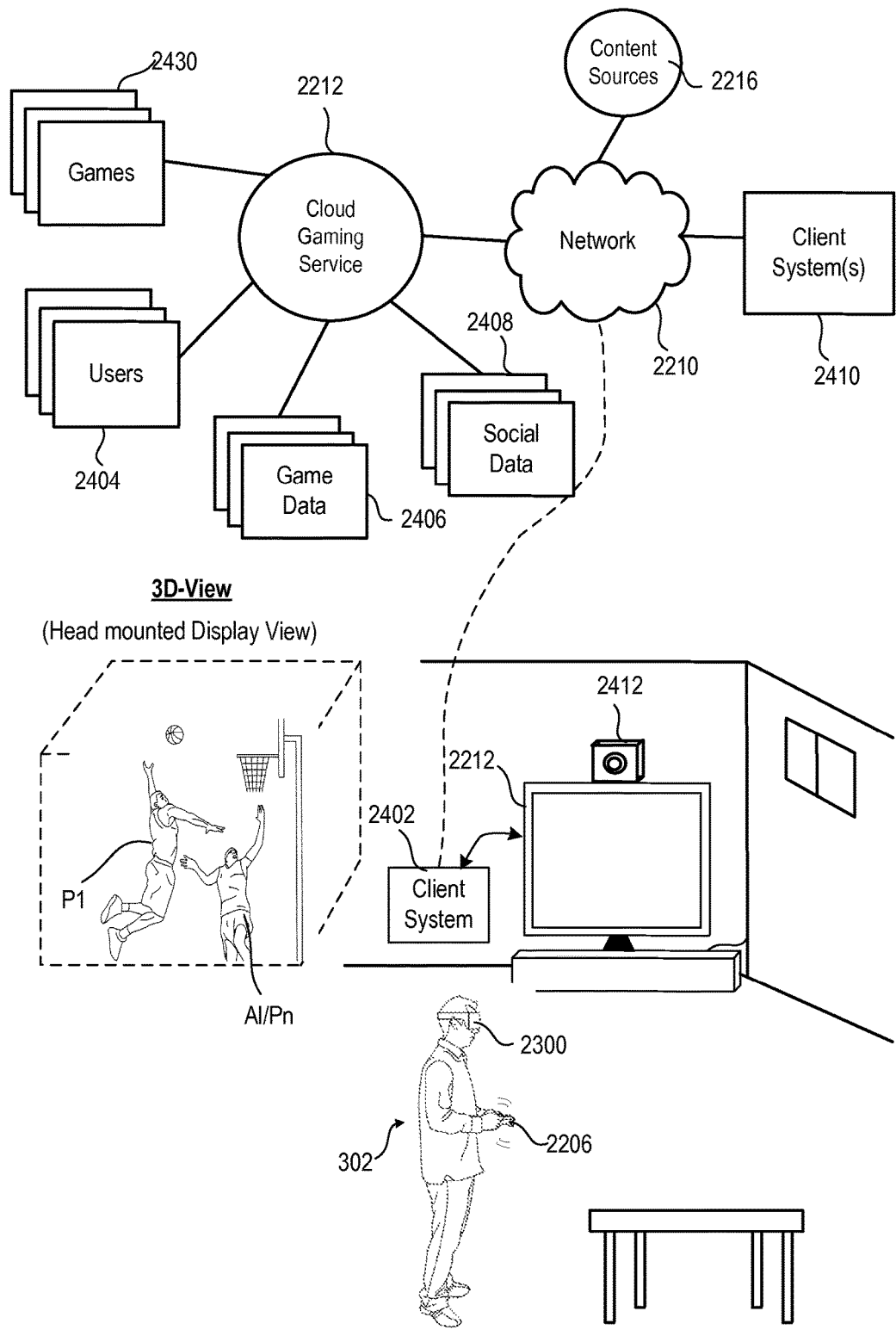
FIG. 22 is a diagram used to illustrate access of a virtual environment via a computer network, in accordance with one embodiment of the present disclosure.

FIG. 22 illustrates one example of game play using a client system 2402 that is capable of rendering the video game content to the HMD 2300 of the user 302. In this illustration, a state of a virtual object, e.g., game content, etc., provided to the HMD 2300 is in a rich interactive 3-D space. As discussed above, a state of a virtual object is downloaded to the client system 2402 or is executed in one embodiment by a cloud processing system. Cloud gaming service 2212 includes a database of users 2404, which are allowed to access particular games 2430, share experiences with other friends, post comments, and manage their account information.

The cloud gaming service 2212 stores game data 2406 for specific users, which may be usable during game play, future game play, sharing to a social media network, or used for storing trophies, awards, status, ranking, etc. Social data 2408 is managed by cloud gaming service 2212. In one embodiment, the social data 2408 is managed by a separate social media network, which is interfaced with cloud gaming service 2212 over the computer network 2210. Over the computer network 2210, any number of client systems 2410 are connected for access to the content and interaction with other users.

Figure 24:
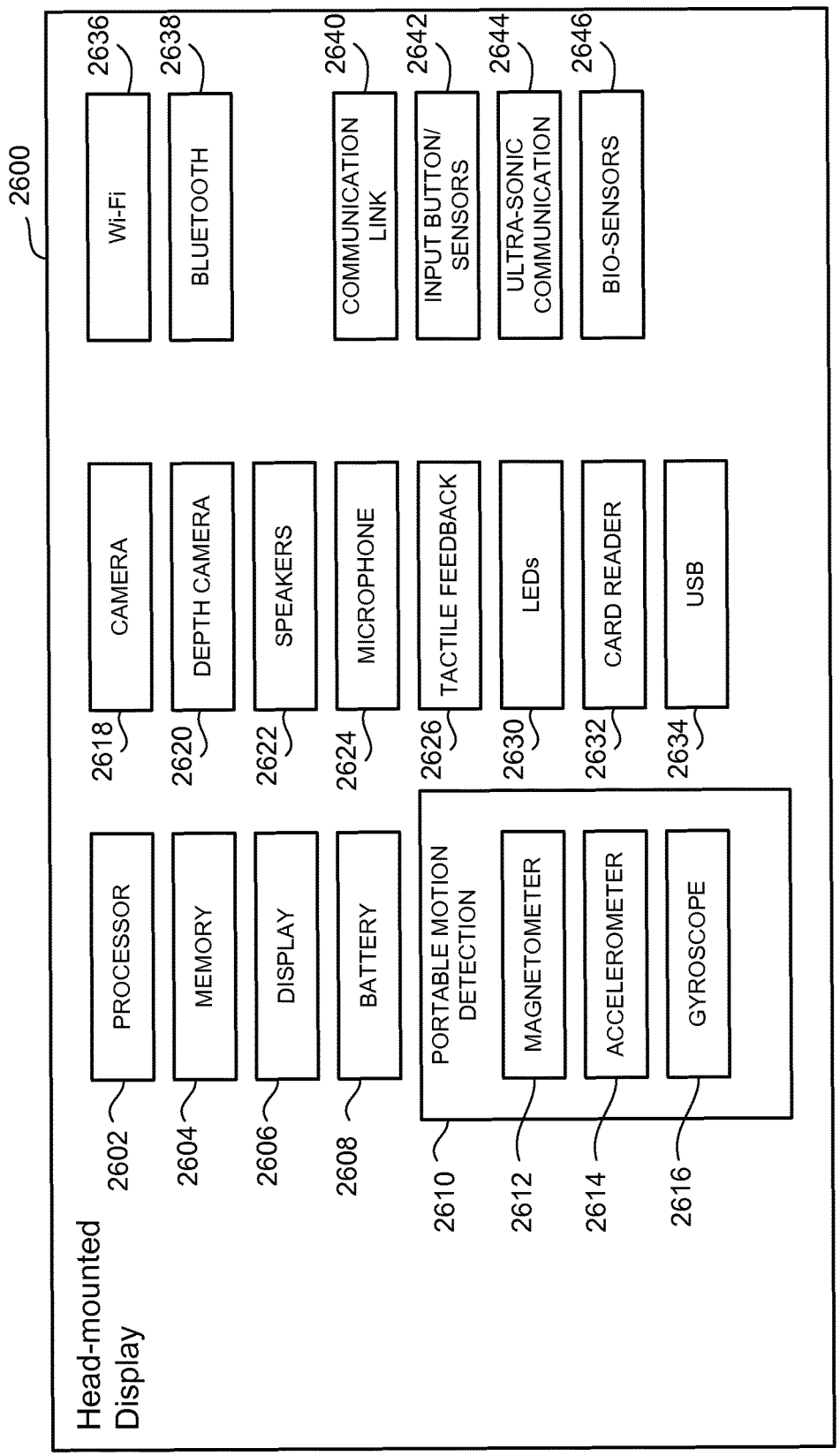
FIG. 24 is a diagram to illustrate example components of an HMD, in accordance with one embodiment of the present disclosure.

Continuing with the example of FIG. 24, the three-dimensional interactive scene viewed in the HMD 2300 includes game play, such as the characters illustrated in the 3-D view, or another virtual environment. One character, e.g. P1, etc., is controlled by the user 302 that is wearing the HMD 2300. This example shows a basketball scene between two players, wherein the HMD user 302 is dunking a ball on another character in the 3-D view. The other character can be an AI (artificial intelligence) character of the game, or can be controlled by another player or players (Pn). User 302, who is wearing the HMD 2300, is shown moving about in a space of use, where the HMD 2300 moves around based on the user's head movements and body positions. A camera 2412 is shown positioned over a display screen in the room, however, for HMD use, the camera 2412 can be placed in any location that can capture images of the HMD 2300. As such, the user 302 is shown turned at about 90 degrees from the camera 2412 and a display device 2212, as content rendered in the HMD 2300 can be dependent on the direction that the HMD 2300 is positioned, from the perspective of the camera 2412. Of course, during HMD use, the user 302 will be moving about, turning his head, looking in various directions, as is needed to take advantage of the dynamic virtual scenes rendered by the HMD 2300.

Figure 23:
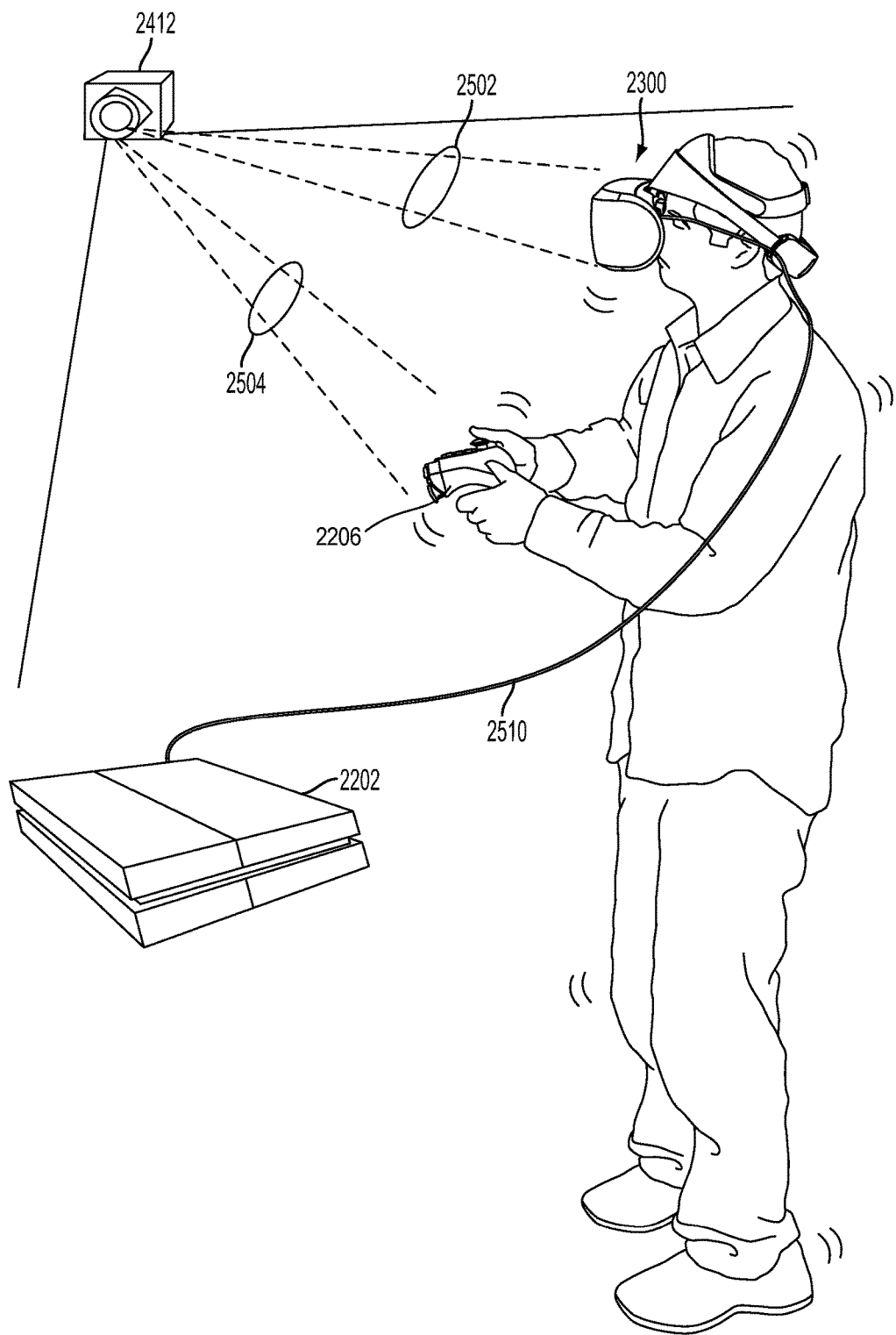
FIG. 23 illustrates a user wearing an HMD to access a virtual environment, in accordance with one embodiment of the present disclosure.

FIG. 23 illustrates a user wearing the HMD 2300, during use, in accordance with one embodiment. In this example, it is shown that the HMD 2300 is tracked 2502 using image data obtained from captured video frames by the camera 2412. Additionally, it is shown that the hand-held controller 2206 is also be tracked 2504 using image data obtained from captured video frames by the camera 2412. Also shown is the configuration where the HMD 2300 is connected to the computing system 2202 via a cable 2510. In one embodiment, the HMD 2300 obtains power from the same cable or can connect to another cable. In still another embodiment, the HMD 2300 has a battery that is rechargeable, so as to avoid extra power cords.

With reference to FIG. 24, a diagram is shown illustrating example components of a HMD 2600, in accordance with an embodiment described in the present disclosure. The HMD 2600 is an example of the HMD 510 (FIG. 5). When the HMD 2600 excludes any cameras, the HMD 2600 is an example of the HMD 310 (FIG. 3). It should be understood that more or less components can be included or excluded from the HMD 2600, depending on the configuration and functions enabled. The HMD 2600 includes a processor 2602 for executing program instructions. A memory 2604 is provided for storage purposes, and in one embodiment, includes both volatile and non-volatile memory. A display 2606 is included which provides a visual interface that the user 302 views.

The display 2606 is defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described herein, in one embodiment, the second screen is provided with second screen content of the HMD 2600 by using the output for one eye, and then formatting the content for display in a 2D format. The one eye, in one embodiment, can be the left-eye video feed, but in other embodiments it can be the right-eye video feed.

A battery 2608 is provided as a power source for the HMD 2600. In other embodiments, the power source includes an outlet connection to power. In other embodiments, an outlet connection to power and the battery 2608 are provided. A motion detection module 2610 includes any of various kinds of motion sensitive hardware, such as a magnetometer 2612, an accelerometer 2614, and a gyroscope 2616.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers are used to provide the direction of gravity, which gives an absolute reference for two angles (world-space pitch and world-space roll).

A magnetometer measures the strength and direction of the magnetic field in the vicinity of an HMD. In one embodiment, three magnetometers are used within an HMD, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, accelerometer 2614 is used together with magnetometer 2612 to obtain the inclination and azimuth of the HMD 2600.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which can be done using other available information, such as positional/orientation determination based on visual tracking of an object, accelerometer, magnetometer, etc.

A camera 2618 is provided for capturing images and image streams of the real-world environment. In one embodiment, more than one camera (optionally) is included in the HMD 2600, including a camera that is rear-facing (directed away from the user 302 when the user 302 is viewing the display of the HMD 2600), and a camera that is front-facing (directed towards the user 302 when the user is viewing the display of the HMD 2600). Additionally, in an embodiment, a depth camera 2620 is included in the HMD 2600 for sensing depth information of objects in the real-world environment.

The HMD 2600 includes speakers 2622 for providing audio output. Also, in one embodiment, a microphone 2624 is included for capturing audio from the real-world environment, including sounds from the ambient environment, speech made by the user 302, etc. In an embodiment, the HMD 2600 includes tactile feedback module 2626 for providing tactile feedback to the user 302. In one embodiment, the tactile feedback module 2626 is capable of causing movement and/or vibration of the HMD 2600 so as to provide tactile feedback to the user 302.

LEDs 2630 are provided as visual indicators of statuses of the HMD 2600. For example, an LED indicates battery level, power on, etc. A card reader 2632 is provided to enable the HMD 2600 to read and write information to and from a memory card. A USB interface 2634 is included as one example of an interface for enabling connection of peripheral devices, or connection to other devices, such as other portable devices, computers, etc. In various embodiments of the HMD 2600, any of various kinds of interfaces may be included to enable greater connectivity of the HMD 2600.

In an embodiment, a Wi-Fi module 2636 is included for enabling connection to the computer network via wireless networking technologies. Also, in one embodiment, the HMD 2600 includes a Bluetooth module 2638 for enabling wireless connection to other devices. A communications link 2640 is included for connection to other devices. In one embodiment, the communications link 2640 utilizes infrared transmission for wireless communication. In other embodiments, the communications link 2640 utilizes any of various wireless or wired transmission protocols for communication with other devices.

Input buttons/sensors 2642 are included to provide an input interface for the user 302. Any of various kinds of input interfaces may be included, such as buttons, gestures, touchpad, joystick, trackball, etc. In one embodiment, an ultra-sonic communication module 2644 is included in HMD 2600 for facilitating communication with other devices via ultra-sonic technologies.

In an embodiment, bio-sensors 2646 are included to enable detection of physiological data from the user 302. In one embodiment, the bio-sensors 2646 include one or more dry electrodes for detecting bio-electric signals of the user 302 through the user's skin, voice detection, eye retina detection to identify users/profiles, etc.

The foregoing components of HMD 2600 have been described as merely exemplary components that may be included in HMD 2600. In various embodiments described in the present disclosure, the HMD 2600 may or may not include some of the various aforementioned components. Embodiments of the HMD 2600 may additionally include other components not presently described, but known in the art, for purposes of facilitating aspects of the present invention as herein described.

It will be appreciated by those skilled in the art that in various embodiments described in the present disclosure, the aforementioned handheld device is utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players receives or shares a video stream, or a single video stream may include regions of a frame generated specifically for each player, e.g., generated based on each player's point of view. Any number of clients are local (e.g., co-located) or are geographically dispersed. The number of clients included in a game system vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with a video server system to deliver a game viewed through the HMD. In one embodiment, the game console receives the video stream from the video server system and the game console forwards the video stream, or updates to the video stream, to the HMD and/or television for rendering.

Still further, an HMD is used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

Clients may, but are not required to, further include systems configured for modifying received video. For example, a client is configured to perform further rendering, to overlay one video image on another video image, to crop a video image, and/or the like. As another example, clients are configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients includes, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source includes rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 25:
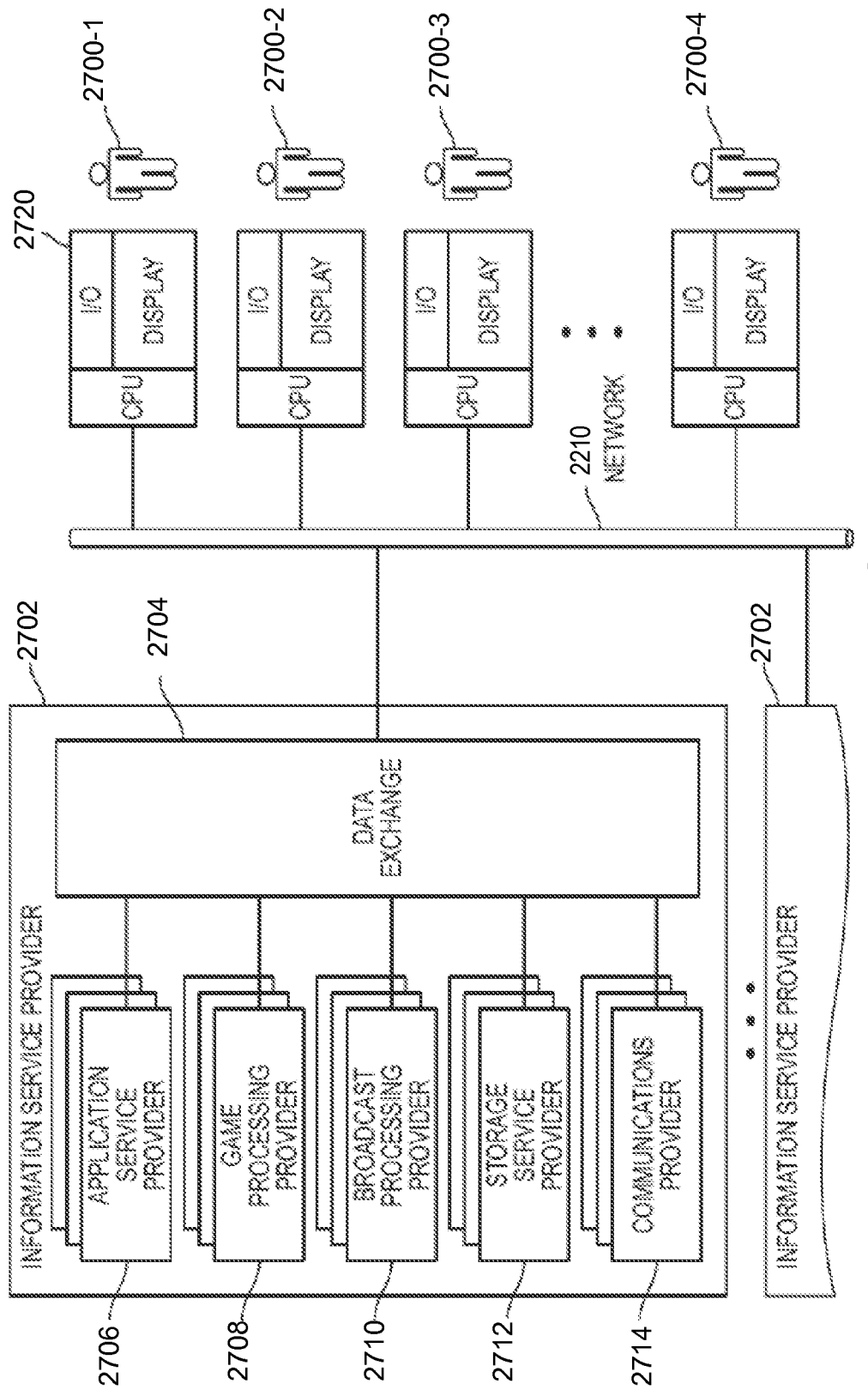
FIG. 25 illustrates an Information Service Provider architecture, in accordance with one embodiment of the present disclosure.

FIG. 25 illustrates an embodiment of an Information Service Provider architecture. Information Service Providers (ISP) 2702 delivers a multitude of information services to users 2700-1, 2700-2, 2700-3, 2700-4, etc., geographically dispersed and connected via the computer network 2210. In one embodiment, an ISP delivers one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user is served by an ISP in near proximity to the user while the user is in her home town, and the user is served by a different ISP when the user travels to a different city. The home-town ISP will transfer the required information and data to the new ISP, such that the user information "follows" the user to the new city making the data closer to the user and easier to access. In another embodiment, a master-server relationship is established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2702 includes Application Service Provider (ASP) 2706, which provides computer-based services to customers over the computer network 2210. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the computer network 2210. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2702 includes a Game Processing Server (GPS) 2708 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2710 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 2712 provides computer storage space and related management services. SSPs also offer periodic backup and archiving. By offering storage as a service, users can order more storage as required. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, a user can access personal files in the home computer, as well as in a mobile phone while the user is on the move.

Communications Provider 2714 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers, in one embodiment, include telecommunications companies, data carriers, wireless communications providers, Internet service providers, cable television operators offering high-speed Internet access, etc.

Data Exchange 2704 interconnects the several modules inside ISP 2702 and connects these modules to users 2700 via the computer network 2210. Data Exchange 2704 covers a small area where all the modules of ISP 2702 are in close proximity, or covers a large geographic area when the different modules are geographically dispersed. For example, Data Exchange 2788 includes a fast Gigabit Ethernet (or faster) within a cabinet of a data center, or an intercontinental virtual area network (VLAN).

Users 2700 access the remote services with client device 2720, which includes at least a CPU, a display and I/O. The client device can be a PC, a mobile phone, a netbook, tablet, gaming system, a PDA, etc. In one embodiment, ISP 2702 recognizes the type of device used by the client and adjusts the communication method employed. In other cases, client devices use a standard communications method, such as html, to access ISP 2702.

It should be noted that although some of the embodiments are described herein with respect to a hand of the user 302, the embodiments apply similarly to another body part of the user 302.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer readable code on a computer readable medium. The computer readable medium is any data storage device that can store data, which can be thereafter be read by a computer system. Examples of the computer readable medium include a hard drive, a NAS, a ROM, a RAM, a CD-ROM, a CD-R, a CD-RW, a magnetic tape, an optical data storage device, a non-optical data storage device, etc. The computer readable medium can include computer readable tangible medium distributed over a network-coupled computer system so that the computer readable code is stored and executed in a distributed fashion.

It should be noted that in some embodiments, any of the embodiments described herein can be combined with any of the remaining embodiments.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method to identify positions of fingers of a hand, the positions being used to render a virtual hand to be displayed in a head mounted display (HMD) when presenting a virtual environment in the HMD, comprising:
   capturing images of a first hand using a plurality of cameras that are part of a wearable device, the wearable device being attached to a wrist of a second hand, the second hand being different from the first hand, the plurality of cameras of the wearable device being disposed around the wearable device so that the plurality of cameras are distributed around the wrist of the second hand;
   repeating capturing of additional images of the first hand, the images and the additional images captured to produce a stream of captured image data during a session of presenting the virtual environment in the HMD; and
   sending the stream of captured image data to a computing device that is interfaced with the HMD, the computing device configured to process the captured image data to identify changes in positions of the fingers of the first hand for rendering the virtual hand in the HMD corresponding to the changes in the positions of the fingers of the first hand.

2. The method of claim 1, wherein the plurality of cameras are disposed to be at angular positions with respect to each other, the angular positions formed with respect to lines that pass through a centroid of the wearable device.

3. The method of claim 1, further comprising capturing images of the first hand of a user using a plurality of cameras that are part of an additional wearable device, the additional wearable device being attached to a wrist of the first hand, the plurality of cameras of the additional wearable device being disposed at angular positions around the additional wearable device so that the plurality of cameras are distributed around the wrist of the first hand.

4. The method of claim 1, further comprising:
   emitting light using a plurality of light emitters that are integrated within the wearable device, the light emitters interleaved with the cameras on a surface of the wearable device; and detecting the light using a plurality of cameras integrated within an additional wearable device to generate images of positions of the wearable device that is attached to the wrist of the second hand, the additional wearable device attached to a wrist of the first hand.

5. The method of claim 1, further comprising:
determining based on one of the images of the first hand whether the first hand is visible in the one of the images; and
turning off the cameras upon determining that the first hand is not visible in the one of the images.

6. The method of claim 1, further comprising:
generating motion data using inertial sensors that are integrated within the wearable device;
sending a stream of the motion data to the computing device, the computing device configured to process the motion data to determine a position of the wearable device, the motion data used to determine the position of the wearable device, wherein the position of the wearable device provides the position of the second hand.

7. The method of claim 1, further comprising:
generating motion data using inertial sensors that are integrated within the wearable device;
sending a stream of the motion data to the computing device, the computing device configured to process the motion data and the captured image data to determine a position and an orientation of the wearable device.

8. The method of claim 1, further comprising:
emitting light in a round robin fashion using a plurality of light emitters that are integrated within the wearable device, wherein each light emitter is located at a pre-determined position around and on the second hand;
detecting the light using a plurality of cameras of an additional wearable device to generate electrical signal data, the additional wearable device for wearing on the first hand of a user;
sending the electrical signal data to the computing device, wherein the computing device is configured to identify an orientation of the second hand from the light and a correspondence between characteristics of light emitted by the light emitters and orientations of the second hand.

9. The method of claim 1, further comprising:
capturing images of the second hand of a user by using a plurality of cameras of an additional wearable device, the additional wearable device for wearing on the first hand of the user;
repeating capturing of additional images of the second hand, the images of the second hand and the additional images of the second hand captured to produce an additional stream of captured image data during the session of presenting the virtual environment in the HMD; and
sending the additional stream of captured image data to the computing device, the computing device configured to process the additional stream of captured image data to identify changes in positions of fingers of the second hand.

10. The method of claim 1, further comprising:
capturing images of the second hand of a user by using a plurality of cameras of an additional wearable device, the additional wearable device for wearing on the first hand of the user;
repeating capturing of additional images of the second hand, the images of the second hand and the additional images of the second hand captured to produce an additional stream of captured image data during the session of presenting the virtual environment in the HMD;
sending the additional stream of captured image data to the computing device, the computing device configured to process the captured image data from the additional stream to identify changes in positions of fingers of the second hand;
receiving a control signal to turn off one of the cameras of the wearable device, the control signal received when a determination is made that the one of the cameras of the wearable device is oriented with respect to the second hand so as to not capture images of the first hand of the user; and
receiving a control signal to turn off one of the cameras of the additional wearable device, the control signal to turn off the one of the cameras of the additional wearable device received when a determination is made that the one of the cameras of the additional wearable device is oriented with respect to the first hand so as to not capture images of the second hand of the user.

11. The method of claim 1, further comprising:
capturing images of the second hand of a user by using a plurality of cameras of an additional wearable device, the additional wearable device for wearing on the first hand of the user;
repeating capturing of additional images of the second hand, the images of the second hand and the additional images of the second hand captured to produce an additional stream of captured image data during the session of presenting the virtual environment in the HMD;
sending the additional stream of captured image data to the computing device, the computing device configured to process the captured image data from the additional stream to identify changes in positions of fingers of the second hand;
capturing additional image data of the first and second wearable devices when the first and second wearable devices are used with a pad device, the pad device placed below the first and second wearable devices, wherein capturing the additional image data of the first and second wearable devices is performed using a camera of the HMD; and
communicating the additional image data of the first and second wearable devices captured using the camera of the HMD to the computing device for identifying positions and orientations of the first and second hands of the user.

12. The method of claim 1,
wherein sending the stream of captured image data to the computing device that is interfaced with the HMD comprises communicating the image data captured using the cameras of the wearable device to a game console for facilitating an identification of the positions and orientations of the fingers of the first hand, wherein additional image data of the wearable device is captured with a camera that is located on the HMD, wherein the additional image data captured using the camera located on the HMD is for use by the game console to determine positions and orientations of the fingers of the first hand.

13. The method of claim 1,
wherein sending the stream of captured image data to the computing device is for facilitating an identification of an orientation of the fingers of the first hand of a user by a game console, the orientation of the fingers of the first hand identified for determining an orientation of display of virtual fingers of a virtual hand in the virtual environment that is displayed in the HMD.

14. The method of claim 1, further comprising:
capturing images of the second hand of a user by using a plurality of cameras of an additional wearable device, the additional wearable device for wearing on the first hand of the user;
repeating capturing of additional images of the second hand, the images of the second hand and the additional images of the second hand captured to produce an additional stream of captured image data during the session of presenting the virtual environment in the HMD;
sending the additional stream of captured image data to the computing device, the computing device configured to process the captured image data from the additional stream to identify changes in positions of fingers of the second hand,
capturing an image of a marker on the wearable device,
capturing an image of a marker on the additional wearable device,
communicating the image of the marker on the wearable device for facilitating an identification of a position of the marker of the wearable device,
communicating the image of the marker on the additional wearable device for facilitating an identification of a position of the marker of the additional wearable device,
wherein the position of the marker on the wearable device with respect to the position of the image of the additional marker is for providing an orientation of the first hand of the user with respect to the second hand of the user.

15. The method of claim 1, wherein the wearable device includes a fiber optic cable, wherein the wearable device includes a light emitter that is attached to the fiber optic cable for emitting light directed into the fiber optic cable.

16. The method of claim 1, wherein the wearable device includes a fiber optic cable having a plurality of openings, wherein the wearable device includes a light emitter that is attached to the fiber optic cable for emitting light directed into the fiber optic cable, wherein each opening emits a portion of the light that travels via the fiber optic cable, wherein each opening is a marker.

17. The method of claim 1, wherein the wearable device is configured to be worn around the wrist of a user in a manner similar to wearing a bracelet or wearing a watch or a wristband.

18. The method of claim 1, wherein additional image data of the wearable device is captured using a camera located within the game console, wherein the additional image data captured using the camera located within the game console is used by the game console to confirm or deny an accuracy of the positions of the fingers determined using the captured image data.

19. The method of claim 1, wherein additional image data of the wearable device is captured using a camera located within the HMD, wherein the additional image data captured using the camera located within the HMD is used by the game console to confirm or deny an accuracy of the positions of the fingers determined using the captured image data.

20. The method of claim 1, wherein the cameras of the wearable device are oriented with respect to the wearable device to capture image data of the second hand.

21. A method for identifying positions of hands of a user interacting with a virtual environment displayed in a head mounted display (HMD), comprising:
capturing images of a first hand of the user using a plurality of cameras that are part of a first wearable device, the first wearable device being attachable to a wrist of the first hand, the plurality of cameras of the first wearable device being disposed at angular positions around the first wearable device;
capturing images of a second hand of the user using a plurality of cameras that are part of a second wearable device, the second wearable device being attachable to a wrist of the second hand, the plurality of cameras of the second wearable device being disposed at angular positions around the second wearable device;
continuing the capturing of the images from the plurality of cameras of the first and second wearable devices during a session of interactivity with the virtual environment displayed in the HMD, the images captured by the first wearable device include images of the second wearable device and images captured by the second wearable device include images of the first wearable device;
capturing additional images of the first wearable device and the second wearable device using a reference camera;
sending the images from the first wearable device, the images from the second wearable device, and the additional images from the reference camera to a computing device that is interfaced with the HMD, the computing device configured to process the images from the first wearable device to identify positions of the second hand and process the images from the second wearable device to identify positions of the first hand, and the computing device uses the reference camera to provide a reference for the positions of the first and second hands.

22. The method of claim 21, further comprising illuminating at least one light on the first wearable device and at least one light on the second wearable device to provide for identification of the respective wearable devices in the images of the first and second hands captured by the cameras of the first and second wearable devices.

23. The method of claim 21, further comprising illuminating at least one light on the first wearable device and at least one light on the second wearable device to provide for identification of the respective wearable devices in the images of the first and second hands captured by the cameras of the first and second wearable devices, wherein the at least one light on the first wearable device has a state of constant illumination or is blinking or is strobing, wherein the at least one light on the second wearable device has a state of constant illumination or is blinking or is strobing.

24. The method of claim 21, further comprising illuminating at least one light on the first wearable device and at least one light on the second wearable device to provide for identification of the respective wearable devices in the images of the first and second hands captured by the cameras of the first and second wearable devices, wherein the at least one light on the first wearable device has a different wavelength than the at least one light on the second wearable device.

25. A system comprising:
a first wearable device for wearing on a wrist of a first hand of a user, wherein the first wearable device includes a camera for capturing image data of a second hand of the user, the second hand being different from the first hand, wherein the first wearable device includes a communication device for communicating the image data captured using the first wearable device;

a game console coupled to the first wearable device, the game console having a console communication device coupled to the communication device of the wearable device for receiving the image data from the communication device of the wearable device, wherein the game console includes a game processor coupled to the console communication device for identifying a position of the second hand of the user from the image data captured using the first wearable device, wherein the game processor is configured to determine data regarding a state of a virtual object in a virtual environment based on the position of the second hand;

wherein the console communication device is for sending the data regarding the state of the virtual object, and a head-mounted display (HMD) coupled to the game console, the HMD including:

an HMD communication device coupled to the console communication device for receiving the data regarding the state of the virtual object from the console communication device, a processing unit coupled to the HMD communication device for displaying the virtual object having the state on a display screen of the HMD.

26. The system of claim 25, further comprising:

a second wearable device for wearing on the second hand of the user, wherein the second wearable device includes a camera for capturing additional image data of the first hand of the user;

wherein the game processor is for identifying a position of the first hand of the user from the additional image data captured using the camera of the second wearable device, wherein the game processor is configured to determine data regarding a state of an additional virtual object in the virtual environment based on the position of the first hand.

27. The system of claim 25, wherein the state includes a position and orientation of the virtual object, wherein the game processor is configured to determine the position and the orientation of the virtual object with respect to a reference point in the virtual environment as being proportional to the position of the second hand with respect to a reference point in a real-world environment.

28. A system comprising:

a first wearable device configured to be worn on a wrist of a left hand of a user;

a second wearable device configured to be worn on a wrist of a right hand of the user, wherein the first wearable device includes a camera for capturing image data of the second wearable device, wherein the second wearable device includes a camera for capturing image data of the first wearable device, wherein the first wearable device includes a communication device coupled to the camera of the first wearable device for communicating the image data captured using the first wearable device, wherein the second wearable device includes a communication device coupled to the camera of the second wearable device for communicating the image data captured using the second wearable device;

a game console coupled to the first and second wearable devices, wherein the game console has a console communication device coupled to the communication device of the first wearable device for receiving the image data captured by the camera of the first wearable device, wherein the console communication device is coupled to the communication device of the second wearable device for receiving the image data captured by the camera of the second wearable device, wherein the game console includes a game processor coupled to the console communication device for identifying a position of the right hand of the user from the image data captured using the first wearable device, wherein the game processor is for identifying a position of the left hand of the user from the image captured using the second wearable device, wherein the game processor is for identifying a position of a virtual object in a virtual environment based on the position of the left hand and the position of the right hand;

wherein the console communication device is for communicating the position of the virtual object, and a head-mounted display (HMD) including, an HMD communication device coupled to the console communication device for receiving the position of the virtual object from the console communication device; and a processing unit coupled to the HMD communication device for displaying the virtual object having the position of the virtual object on a display screen.

29. The system of claim 28, wherein the game processor is configured to determine the position and an orientation of the virtual object with respect to a reference point in the virtual environment in which the virtual object is included, wherein the position and orientation of the virtual object with respect to the reference point in the virtual environment is determined as being proportional to the position and an orientation of the left hand with respect to a reference point in a real-world environment surrounding the game console, the HMD, and the first and second wearable devices, wherein the position and orientation of the virtual object with respect to the reference point in the virtual environment is determined as being proportional to the position and an orientation of the right hand with respect to the reference point in the real-world environment.

* * * * *